United States Patent [19]

Stafford et al.

[11] Patent Number: 4,467,148
[45] Date of Patent: Aug. 21, 1984

[54] TELEPHONE LINE ANALYZER

[75] Inventors: James A. Stafford, Danbury, Conn.; Richard W. Neiss, Nashua, N.H.; Daniel S. Coolidge, Sandy Hook, Conn.

[73] Assignee: Network Control Corporation, Danbury, Conn.

[21] Appl. No.: 345,142

[22] Filed: Feb. 2, 1982

[51] Int. Cl.$^3$ .............................................. H04B 3/46
[52] U.S. Cl. ......................... 179/175.3 R; 179/175.2 C
[58] Field of Search ................... 179/175.3 R, 175.3 F, 179/175.3 A, 175.2 C; 371/22, 20

[56] References Cited

U.S. PATENT DOCUMENTS 3,822,367  7/1974  Humphrey ................... 179/175.3 R
4,105,995  8/1978  Bothof et al. ............. 179/175.3 R X
4,165,450  8/1979  Throop et al. ............... 179/175.2 C Primary Examiner—Stafford D. Schreyer
Attorney, Agent, or Firm—Mattern, Ware, Stoltz & Fressola

[57] ABSTRACT

A telephone line analyzer provides automatic attenuation measurement of tie trunk lines and other telephone lines through measurement of the electrical level of a tone responder. The analyzer is primarily directed to testing telephone lines interconnected between trunk line selectable computerized private branch exchanges (PBXs) of the same user. The analyzer automatically dials a remote PBX through a desired tie trunk line; activates a remote tone responder; and measures and records the test results. The analyzer may also perform echo return loss measurements.

The analyzer is user programmable and it can be set to initiate line tests at predetermined times so as to minimize interference with the normal telephone line activities of the user.

25 Claims, 20 Drawing Figures

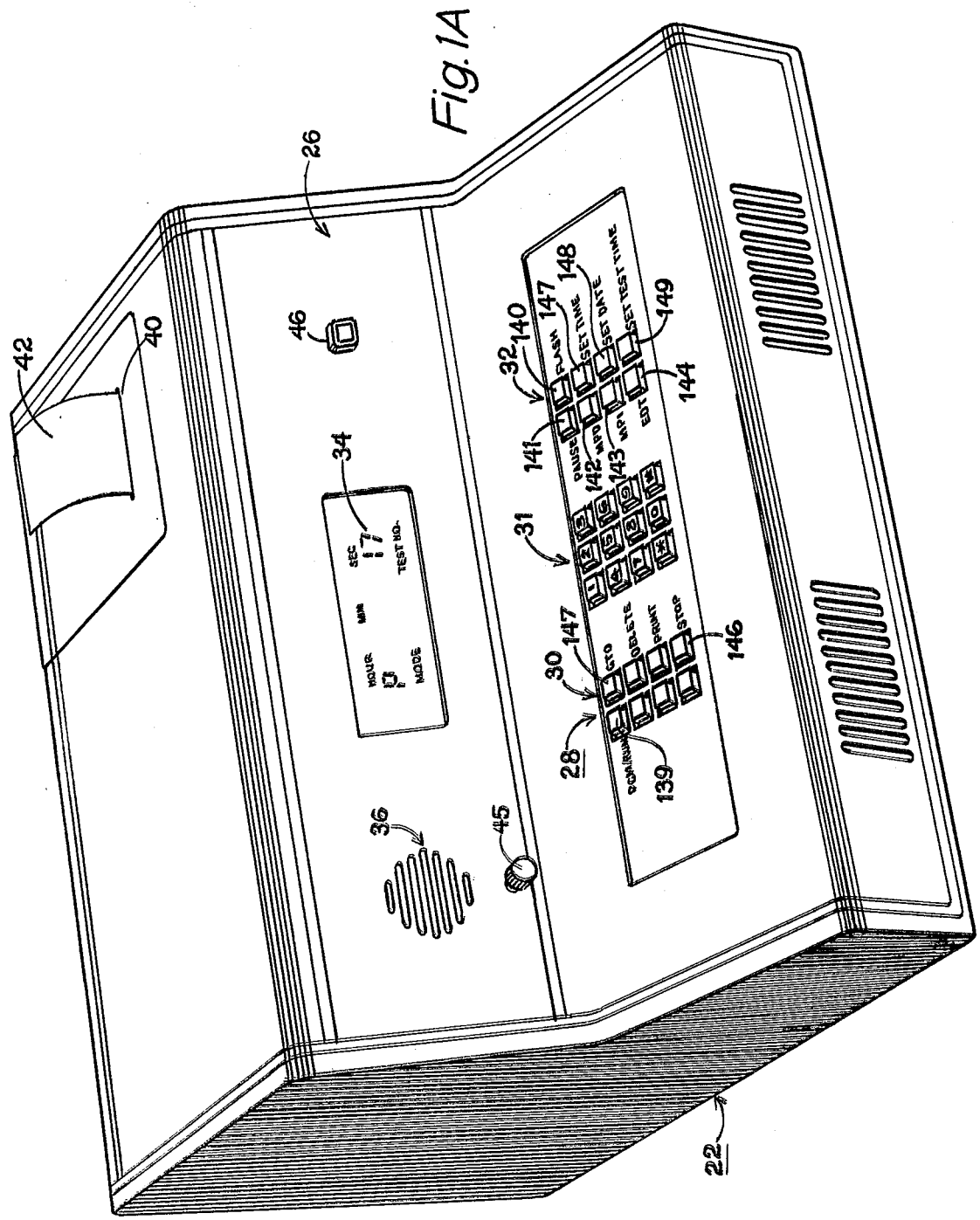

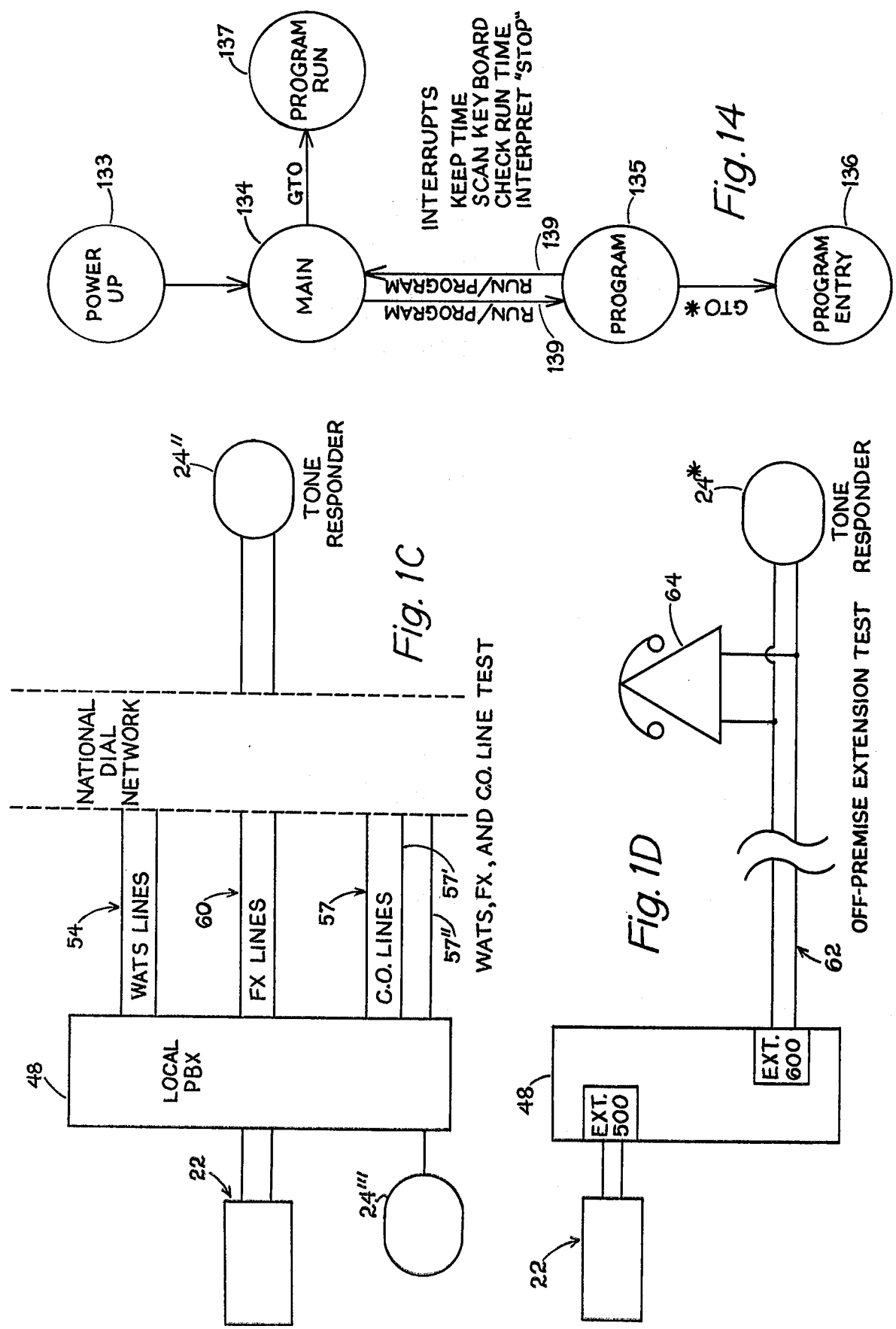

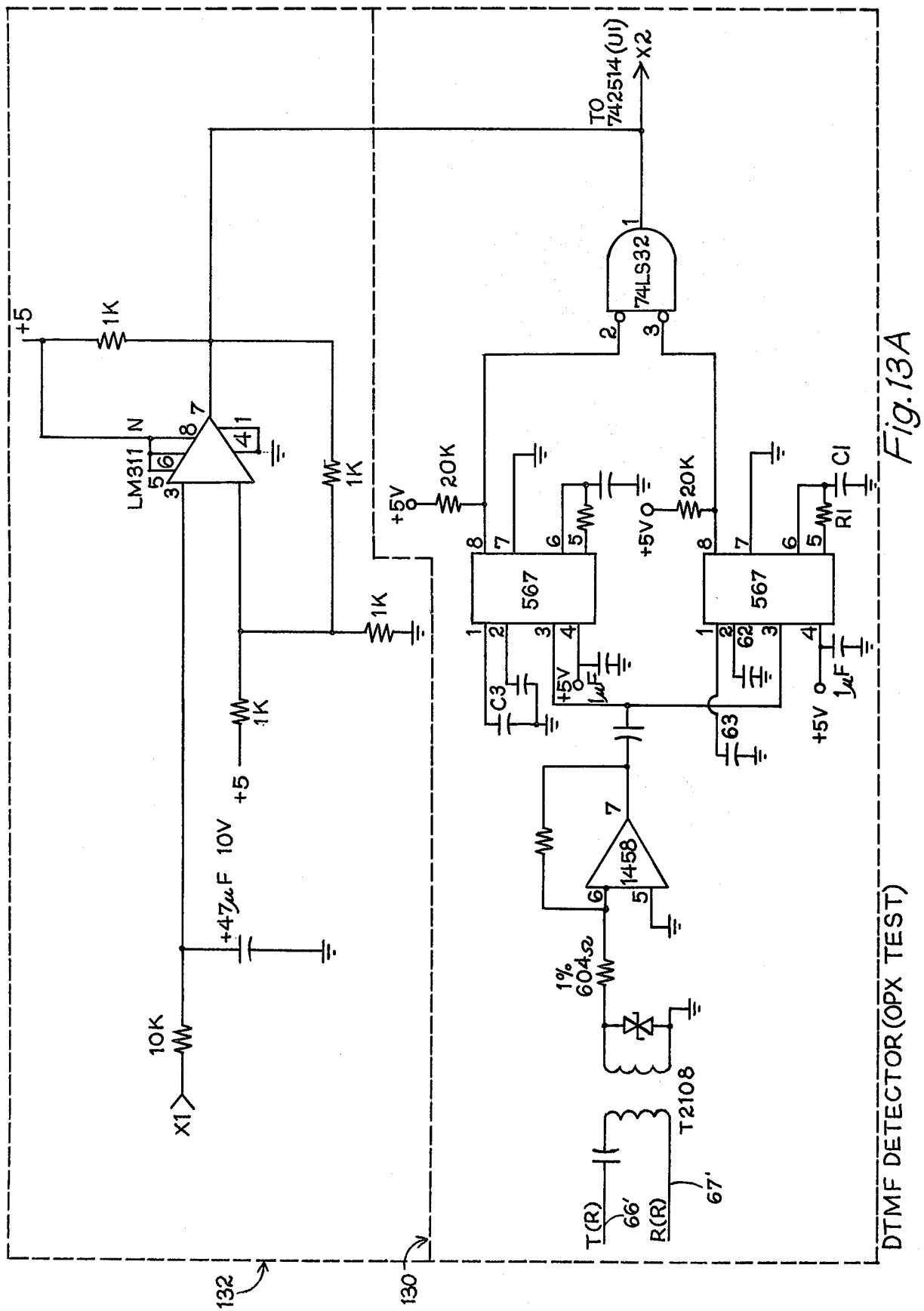
Fig.13A DTMF DETECTOR (OPX TEST)

TELEPHONE LINE ANALYZER

TECHNICAL FIELD

The present invention is directed to telephone line testing and in one respect, such testing between tie trunk lines interconnecting trunk selectable PBXs of a single user. The field also includes telephone line testing of off premise extension lines, foreign exchange lines, and outgoing wide area telephone (WATS) lines.

BACKGROUND ART

Although a number of prior art references are directed to testing local and remote subscriber lines, the references do not disclose or suggest a telephone tie line analyzer which can automatically test all tie trunk lines associated with a particular user at any desired time in a way which is easily programmable. In particular the following prior art references are known:

| U.S. Pat. No. | Inventor | Date of Issue |
|---|---|---|
| 3,674,947 | Chulak | 1972 |
| 3,410,966 | Davies | 1968 |
| 3,571,530 | Davies | 1971 |
| 3,980,839 | Hutcheson | 1976 |
| 3,917,915 | Karras | 1975 |
| 4,021,624 | Kelly et al | 1977 |
| 4,029,913 | Gunderson | 1977 |
| 4,054,760 | Morgen | 1977 |
| 4,185,174 | Beyhurst et al | 1980 |
| 4,196,321 | Bosik | 1980 |
| 4,208,552 | Castriotta et al | 1980 |
| 4,255,625 | Walton et al | 1981 |
| 4,258,236 | Conklin et al | 1981 |

U.S. Pat. No. 4,258,236, Conklin et al is of interest since it describes the type of service provided by telephone companies to test customer leased telephone lines. Each customer leased dedicated tie trunk line connects two locations of the customer and is classified as a voice grade four wire service; the four wires being a receive pair (tip and ring) and a transmit pair (tip and ring). These four wires pass through at least one telephone company central office and at each customer location, terminate in a so-called terminating unit where connection to customer installed equipment such as a computerized private branch exchange (PBX) is made.

To test these lines, the telephone company usually provides a loop-back test circuit in each terminating unit. These test circuits upon receipt of a 2713 Hz signal simultaneously disconnect the customer installed equipment from the terminating unit and respectively connect the receive and transmit tip wires together and the ring wires together through a loop-back amplifier. The 2713 Hz tone is generated at the telephone company central office.

This receipt of a loop-back 2713 Hz signal at the central office provides a continuity check of the four wire line. In addition a milliwatt test signal source at 1004 Hz and 0 db may then be connected to the four wire service to test the line for attenuation loss, distortion and noise. Once the tests are completed the four wire line is returned to service by a second tone received by the loop-back test circuits from the central office.

The above testing of leased telephone lines is not performed at times selectable by the customer and may not be done on a daily basis. Indeed, the customer has no independent verification of the test results until disruption of service occurs. The telephone company tests cannot be performed on an interval basis to monitor a line suspected to be faulty and do not test customer off premise extension lines, foreign exchange lines, and out-going WATS lines. All such tests and testing flexibility are performed by the present invention.

The Conklin et al patent describes testing procedures for data collection and/or processing equipment which are connected by modems and distribution and collection bridge pairs to the telephone lines. The lines are tested by transmitting a signal from a control circuit which disconnects the equipment at the remote location and provides quiet termination of the receive and transmit pairs. Another aspect of the disclosure provides a signal that connects a milliwatt signal source to the remote location transient pair. Multipoint testing when a plurality of modems are used at the remote location is also disclosed with each switching and testing circuit responsive to a different predetermined tone frequency. Conklin et al does not disclose or suggest a telephone line analyzer that can be user programmed to test any selection of user lines and does not disclose testing of off premise extension lines, foreign exchange lines and outgoing WATS lines. Conklin et al also does not disclose or suggest a device that reports all test results in a clear and concise manner and which can provide testing on a priority or interval basis.

U.S. Pat. No. 3,674,947, Chulak, discloses a remote testing system for communication circuits. It shows a prior art system (FIG. 1) and its system (FIG. 2), both for remote testing of subscriber lines. Its particular advantage as distinguished from that shown in its FIG. 1 is that only one connection through non-dedicated facilities of the switching network and of the lines connecting the locations need be made to set up the testing connection. The invention is directed to testing local telephone subscriber lines through the use of near end and far end switching equipment. It uses a near end answering tone and a far end timer to prevent accidental calls by third parties to the far end test number. It is a manual testing device unlike the present invention and consequently cannot automatically obtain or select a desired tie trunk line.

U.S. Pat. No. 3,410,966, Davies, is a system basically corresponding to that shown in FIG. 1 of Chulak, and again is directed to remote testing of telephone subscriber lines through a manual process.

U.S. Pat. No. 3,980,839, Hutcheson, describes a system for monitoring a Totalphone TM switching system. This system employs a microprocessor to monitor the operation of both the central office switching subsystem and the remote switching systems that are connected by means including a dedicated trunk line. It is directed to determining whether the switching system is operating properly and is not directed to analyzing attenuation losses on telephone lines.

U.S. Pat. No. 3,571,530, Davies, discloses a remotely controlled telephone loop testing system wherein signalling is performed over non-dedicated trunks. Although it uses multifrequency tone bursts to set up loop test circuits, it does not test dedicated tie trunk lines, but rather tests remote telephone subscriber lines.

The remaining cited references are of interest in showing various telephone switching and subscriber line testing, but none disclose or suggest an automatic telephone line analyzer for measuring and recording the attenuation on such lines associated with a particular user.

DISCLOSURE OF THE INVENTION

A telephone line analyzer for testing tie trunk lines, foreign exchange lines, wide area telephone service (WATS) lines, off-premise extension lines and other subscriber telephone lines is disclosed for use with computerized private branch exchanges (PBX's). The analyzer comprises a primary local module or unit which houses a microprocessor, programmable read only memory (PROM), random access memory (RAM), a printer interface and printer, a telephone tone encoder, a telephone tone decoder, a measurement unit, a keyboard and keyboard interface, a display and display interface, an audio receiver and amplifier, and a loop start interface.

The local unit is user programmable so as to specify up to 200 separate line tests. For a typical test of a dedicated tie trunk line, the user can program the analyzer to instruct an interconnected PBX to select that particular tie trunk line and communicate with an interconnected remote PBX. A particular extension of the remote PBX can be accessed at which a remote tone responder is located.

After decoding the particular dual frequency multiple tone (DTMF) signal of the remote responder, the local unit measures and prints the decibel level of a tone generated by the tone responder. Other tests for echo return loss can also be made.

For each line test the local unit can print the program test number, the line test number, the date of the test, the time of the test, the response time, the identifier (DTMF) signal produced by the tone responder at the far end, the decibel (db) level of the received tone, the echo return loss associated with the line, and the quiet line noise (in db).

Up to two hundred lines may be sequentially tested by the local unit at any given time. The time of day when tests are run can also be specified so that the lines may be tested during low usage periods, such as in the early morning hours. Repeated interval tests may also be taken of selected lines suspected of faulty operation so as to ascertain trends in the attenuation loss for those lines.

Through use of this telephone line analyzer, telephone voice networks can be easily and efficiently tested so as to minimize down time of these lines. By performing such tests on a daily basis, trends in volume loss (attenuation) associated with the lines can be ascertained so that preventive measures may be taken prior to complete loss of any given line. Furthermore, by identification of such lines as well as lines failing to meet minimal voice standards, the telephone company from which such lines are leased can be informed as to the specific nature of the problem and the particular line having the problem.

OBJECTS OF THE INVENTION

Therefore, it is a principal object of the present invention to provide a voice network telephone line analyzer for easily and efficiently determining the status of all lines associated with a particular voice network including dedicated tie trunk lines, subscriber lines, outgoing wide area telephone service (WATS) lines, foreign exchange lines, and off-premise extension lines associated with computerized private branch exchanges (PBX's).

Another object of the present invention is to provide such a telephone line analyzer which can be programmed to initiate the testing of the selected lines at a particular time of day so as to facilitate such testing during minimum usage of the tested lines.

A further object of the present invention is to provide a telephone line analyzer of the above description which presents a hard copy of the user defined instructions for such line tests as well as presenting a hard copy of the test results.

A further object of the present invention is to provide a telephone line analyzer of the above description which can be used to determine trends in volume loss associated with telephone lines so as to take preventive measures prior to complete loss of signal on any line.

A further object of the present invention is to provide a telephone line analyzer which is easily programmable without requiring special training by the person operating the analyzer.

A further object of the present invention is to provide a telephone line analyzer which can be remotely connected to the PBX through which the testing is conducted.

A further object of the present invention is to provide a telephone line analyzer which not only measures and prints the decibel level of a returned tone signal, but also measures, calculates and prints the echo return loss associated with the tested line, the call processing time and the quiet line noise.

A still further object of the present invention is provide a telephone line analyzer that may have priority tests programmed; whereby these tests preempt other functions of the analyzer at a particular time.

Another object of the present invention is to provide interval test capability to allow the user to perform specific line tests at selected times and repeat those tests at chosen time intervals.

An additional object of the present invention is to provide special application test programs which may be entered to automatically cancel the "call forwarding" and/or the "do not disturb" features associated with computerized PBX's so as to relieve the PBX attendant of those responsibilities; especially at the start of the business day.

A still further object of the present invention is to provide a telephone line analyzer which allows the user to review all line tests (including their instructions) stored in the system memory, as well as to delete or update such tests as necessary.

Other objects of the present invention will in part be obvious and will in part appear hereinafter.

THE DRAWINGS

For a fuller understanding of the nature and objects of the present invention, reference should be made to the following detailed description taken in connection with the following drawings in which:

FIG. 1A is a perspective view of the local unit shown in block diagram format in FIG. 1;

FIG. 1C is a diagrammatic representation of how the telephone line analyzer can test foreign exchange (FX) lines, WATS lines and subscriber or central office (C.O.) lines;

FIG. 1D is a diagrammatic representation of how the telephone line analyzer can test off premise extension lines with a modified embodiment of the tone responder shown in FIG. 1C;

FIG. 13A is a detailed schematic of additional circuitry which combines with that in FIG. 13 to form another embodiment of the tone responder for use with off premise extension lines; and FIG. 14 is a state map of the local unit under its central processing unit's control for the control program and data storage contained in the PROM and RAM modules respectively.

BEST MODE FOR CARRYING OUT THE INVENTION

Figure 1:
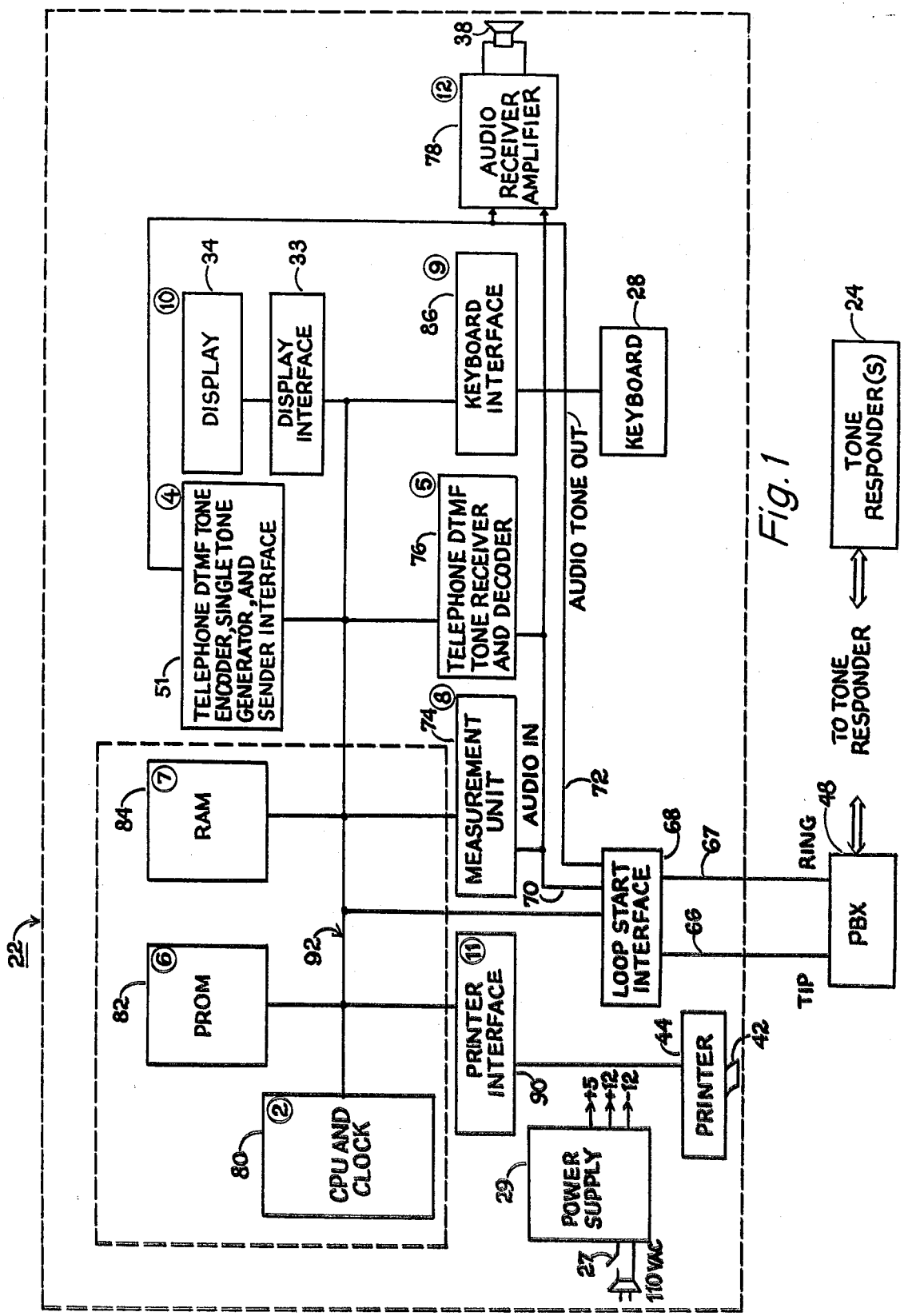
FIG. 1 is an overall block diagram of the local unit forming part of the telephone line analyzer and also illustrating one or more tone responders associated at remote and local locations and interconnected to the local unit by the telephone lines forming a voice network to be tested.

As best seen in FIGS. 1, 1A, 1B, 1C and 1D, a voice network telephone line analyzer 20 comprises a local unit 22 and one or more tone responders 24. The local unit acts as a program and test module and is preferably placed in a housing 26 as best seen in FIG. 1A. The housing includes location for keyboard 28 comprising sub-keyboard areas 30, 31 and 32. The housing also has a region for display 34 and another slotted region 36 for mounting speaker 38 (see FIGS. 1 and 1A). The housing further comprises a slotted upper portion 40 to allow paper 42 to exit from printer 44 (see FIGS. 1 and 1A). A paper feed switch 46 is also located on housing 22 as well as a speaker volume control knob 45. A power supply switch 27 energizes power supply 29 which in turn energizes the remaining components of local unit 22.

Figure 1B:
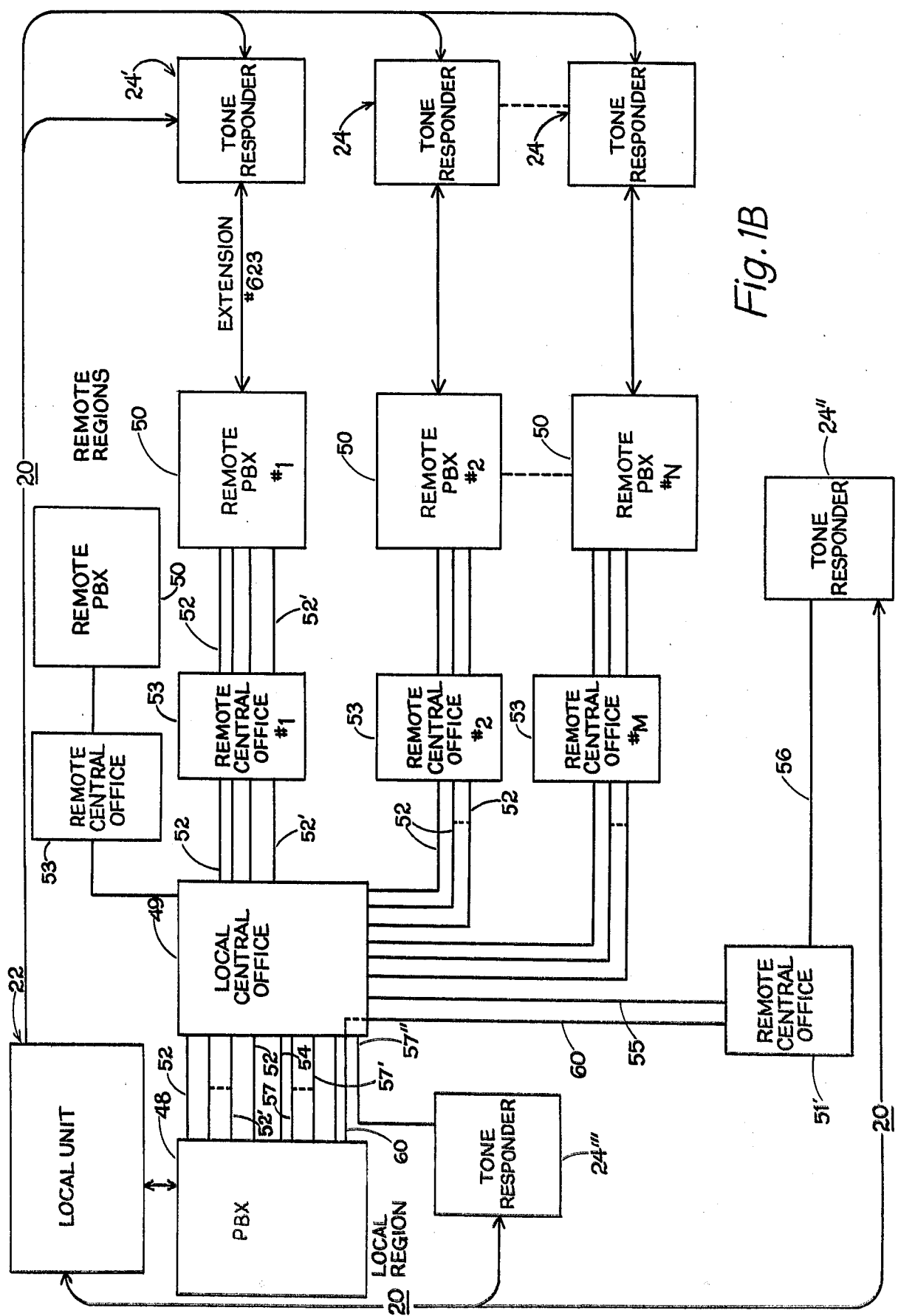
FIG. 1B is a diagrammatic representation of how various types of telephone lines can be tested by the telephone line analyzer of the present invention, including tie trunk lines, subscriber lines, outgoing WATS lines and off premise extension lines.

The basic theory of operation of the telephone line analyzer is best understood with reference to FIG. 1B. As shown there, a local private branch exchange (PBX) 48 is used to interconnect the local or near end region to one or more remote or far end regions, each remote region having its own PBX 50. PBXs 48 and 50 are of the type that allow selection of designated lines. Most modern computerized PBXs have this capability, including the Rolm Company CBX TM PBX, A.T. & T.'s Dimension ® PBX, and NEC's System 12 TM and System 22 TM PBXs. Connected between the local PBX 48 and each remote PBX 50 can be one or more dedicated telephone tie trunk lines 52. These tie trunk lines typically pass through a central office 49 and a remote central office 53. The tie trunk lines may also pass through other switching centers between the local and remote central offices. These lines are not switched anywhere in their travels but are amplified by the telephone company if the distances involved are sufficiently long.

Figure 1E:
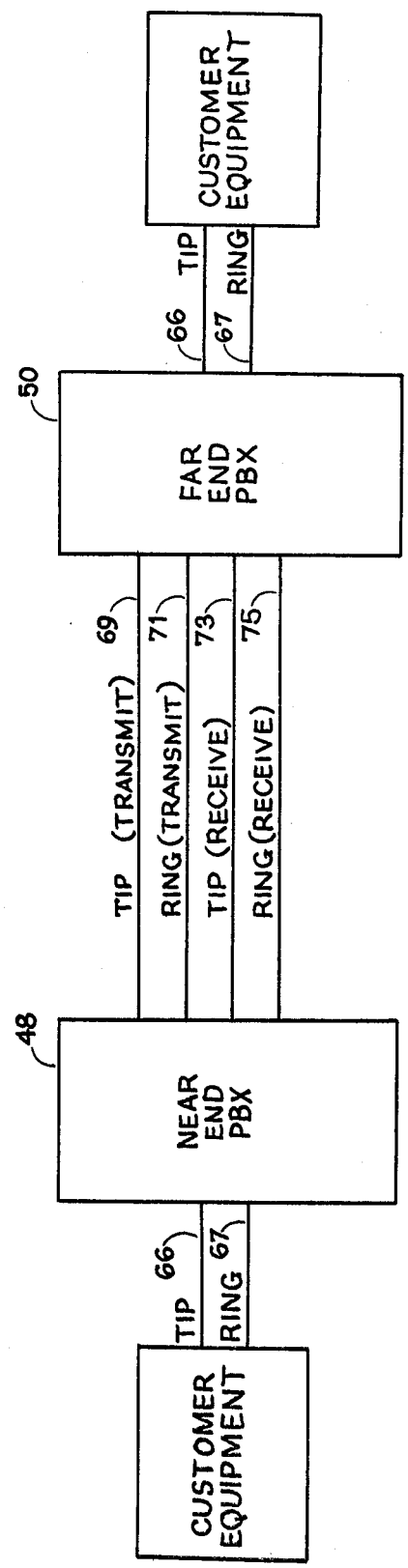
FIG. 1E is a diagrammatic representation of the transmit and receive TIP and RING lines forming a telephone line and how these lines are typically terminated at a PBX.

Tie trunk lines and other voice grade telephone lines comprise four wires as best seen in FIG. 1E. These are the transmit TIP and RING wires 69 and 71 and the receive TIP and RING wires 73 and 75. At each PBX, such as PBXs 48 and 50, the four wires are terminated so that only combined receive and transmit TIP and RING wires 66 and 67 are presented to interconnected customer equipment.

The line tests performed by the present invention measure attenuation loss on the receive TIP and RING wires but since communication is required on both receive and transmit wires, the tests give an accurate picture of the entire line's operation. This is similarly true for echo return level measurements which can also be made by the telephone line analyzer.

It is common for tie trunk lines to be located between two locations of a commercial user where high volume voice traffic is required. Such situations are common for banks having a principal office and one or more branch offices, each tying into the main office with one or more dedicated tie trunk lines. Similar situations arise in commercial establishments having many divisions all reporting to a corporate headquarters. Indeed, wherever voice traffic for a particular company is very high, dedicated tie trunk lines are normally leased from the appropriate telephone company so that these lines may be used solely by the subscriber to the exclusion of all others.

In contrast, most subscriber telephone service is done through non-dedicated central office or subscriber lines 57 and 58. Such lines may also be tested by the telephone line analyzer as discussed later.

In operation, the line analyzer 20, through its local unit 22, selects any particular line 52 (such as tie trunk line 52' connected between remote PBX 1 and the local PBX 48). The actual sequence of steps performed by analyzer 20 is presented in Table 1 for a full test of a tie line. This test sequence is illustrative of others that can be performed on tie trunk lines and other telephone lines. Table 3F illustrates the printout for a typical line test. It is there seen that the local unit prints out information concerning the test at the time the test is initiated. This includes the program test number (a number from 00 to 199), the date of the test, and the time of the test (see Table 3F).

Thus the first step following the test program printout is the generation of an approximate 1000 Hz (actually 941 Hz) tone burst fed into a dummy load for one-half a second. The measured voltage representing a given decibel (db) level due to the known impedance of the load is simultaneously measured and stored by the numbers. It is thus seen that at step 2 in Table 1 the sequence of numbers is "0, 0, 0, 1." This sequence of numbers selects a particular line, in this case a tie line with reference 52'. The printout of the selcted line is shown in Table 3F to the right of the label "DIAL SEQ:", meaning dial sequence.

TABLE 1

| | PROGRAM & TEST MODULE SEQUENCE (LOCAL UNIT) | REMOTE PBX AND REMOTE UNIT SEQUENCE | COMMENT |
|---|---|---|---|
| Step 0 | Test printout information | — | Identifies program test number, date, and time of day when test is performed |
| Step 1 | 1000 Hz tone burst to dummy load (½ sec.) | — | Measures decibel (db) level of 941 Hz tone into a dummy load for calibration purposes and is used to calculate echo return level |
| Step 2 | ##80001 with printout of | — | Accesses tie trunk line corresponding to address of the four last digits (can alternately dial a subscriber line). Printout of selected line. |
| Step 3 | WAIT (1.5 to 3.0 sec.) | Dial tone | Dial tone at remote PBX should be received at local unit (typical value −8 db) Response time for receipt of dial tone printed. |
| Step 4 | 623 | Remote PBX accesses selected extension number | The remote unit is accessed by the selected extension (here number 623) |
| Step 5 | — | DTMF burst (¼ second) | Generated by remote unit |
| Step 6 | Decode remote DTMF signal and printout decoded character | — | The remote DTMF tone is decoded by local unit and printed out for line verification purposes. When remote DTMF tone stops the local unit goes to next step (WAIT) and remote unit generates 941 Hz tone |
| Step 7 | Wait (½ sec.) | 941 Hz tone for approximately 1 sec. | This signal is analyzed by local unit for received decibel level after the ½ sec. wait period to allow line to settle |
| Step 8 | Measure and print detect (MPD) the level of received 941 hz tone (in db) | 941 Hz tone continues (same 1 second period) | |
| Step 9 | — | DTMF burst (¼ sec.) | This DTMF burst commands the local unit to start the last phase of the echo return level to |
| Step 10 | 941 Hz tone (¼ sec.) sent to remote unit with simultaneous line measurement and printout of the calculated echo return level | — | Local unit measure decibel level on line while remote unit select but off hook. This measurement is used to calculate the echo return level by comparison to the dummy load db measurement. Echo return level = line measurement - dummy load measurement. |
| Step 11 | Quiet line level measured and local unit goes "on hook" approximately 1 sec. after termination of 941 Hz signal | Remote unit goes "on hook" after approximately 1 sec. | Quiet line level (in db) measures power on line when no tone (including dial tone) is present. A typical value is −40 db. Rem unit no longer involved in test. Local unit can immediately perform test sequence for the next tie trunk line. | local unit. This measured db level is used in the calculation of the echo return level of the selected telephone line.

The next step performed (step 2) is the generation of a ##8 sequence of dual tone multiple frequency (DTMF) signals as used in Touchtone ® telephone service. The DTMF signals are dual tone signals having the frequencies set forth in Table 2.

The actual number sequence can vary depending upon the manufacturer of the PBX. In this case, a Rolm Company PBX is used. Such a number sequence (the ##8 sequence) instructs the local PBX 48 that it is to address a particular line as identified in the sequence of

TABLE 2

DTMF Tone Matrix

| | High Group | | | |
|---|---|---|---|---|
| | Column 0 1209 Hz | Column 1 1336 Hz | Column 2 1477 Hz | Column 3 1633 Hz |
| Low Group | | | | |
| Row 0, 697 Hz | 1 | 2 | 3 | A |
| Row 1, 770 Hz | 4 | 5 | 6 | B |
| Row 2, 852 Hz | 7 | 8 | 9 | C |
| Row 3, | * | 0 | # | D |

TABLE 2-continued
DTMF Tone Matrix
High Group

| | Column 0 1209 Hz | Column 1 1336 Hz | Column 2 1477 Hz | Column 3 1633 Hz |
|---|---|---|---|---|
| 941 Hz | | | | |

All communication is then done through that particular tie line with respect to the remote PBX (here PBX #1). Thus, after step 2, remote PBX #1 is accessed by the local PBX. The local unit then waits for a short period of time (such as 1.5 seconds) as shown at step 3 of Table 1. This waiting period allows the local PBX to receive the dial tone from remote PBX #1 and thereby can ascertain that a connection has been made through the selected tie trunk line. The period of time that the local unit waits for receipt of the dial tone is printed out (see Table 3F) to the right of the label "RESPONSE TIME:".

In step 4 a particular extension number associated with the remote PBX #1 is accessed. In this particular example, the remote extension number is "623". This remote extension number is associated with a dedicated remote tone responder 24'. This tone responder is part of the line analyzer and when accessed by the remote PBX, causes a DTMF signal to be generated (step 5). Such a DTMF signal may be any one of the sixteen permissible signals shown in Table 2.

The local unit 22 decodes this DTMF signal (step 6) and prints out the decoded value. In the example shown in Table 3F this decoded DTMF signal is an asterisk ("*") and follows the label "FAR END", meaning the far end identifier. The printed output is presented on paper 42 associated with printer 44 resident within the program and test module housing 22 (see FIG. 1A). In this way the analyzer operator can readily verify if the proper remote PBX has been accessed through knowledge of the DTMF signal that should have been received.

In step 7 the local unit waits for a set period of time (typically ½ second) to allow the line to settle before it measures an incoming 941 Hz tone generated by the remote unit. This tone lasts for a period of time (typically 1 second) greater than that of the local unit wait period so that the local unit can measure this incoming tone after all line transients have decayed.

Thus in step 8 the local unit performs a measure and print detect (MPD) operation where the incoming 941 Hz tone is detected and measured (in db). In Table 3F this measured tone is printed with the label "LEVEL:". A typical value for such a received tone on a dedicated tie trunk line is between 0 and −5 db.

In step 9 the remote unit generates a short DTMF burst which instructs the local unit to complete the echo return level test. Step 10 shows completion of the echo return level test.

More particularly, the echo return level is related to the signal seen at the local unit when a tone is transmitted on the line. This signal is related to the echo generated at the remote end and is indicative of the quality of transmission along the line. It is used to supplement the information received by the attenuation test previously described.

In operation, the local unit prior to accessing the particular line first generates its own 941 Hz signal (see step 1 of Table 1) which is terminated into a dummy load having an impedance of approximately 600 ohms. This impedance is typical for the type of load seen at the transmitting end of a normally operating telephone line. After the attenuation test is completed, the local unit then completes the echo return test by generating another 941 Hz tone which it applies to the selected line (step 10). As this tone is applied to the line, a measurement of the tone is made indicative of the echo associated with the line.

The echo return level is defined as the difference between the decibel reading of the line and the decibel reading of the dummy load. In typical applications a normal line has an echo reading of approximately −9 db, while the dummy load has a typical reading of approximately −2 db. Therefore, a typical echo return level is −9 db minus −2 db or −7 db. In Table 3F the value of the calculated echo return level is shown to the right of label "E-R-L:", meaning echo return level.

Finally in step 11 the db level of the quiet line (that is the line without dial tone or other intelligible signals) is measured and printed. The printout is shown in Table 3F to the right of label "LINE NOISE:". Typical values are −40 db and lower. Following this measurement, the test for the selected line is completed and the local unit goes "on hook" so as to be able to test any other desired line.

Such line tests may be conducted for all lines terminating at local PBX 48 on a sequential basis. The start time of such a test can be set for a low usage period, typically in the early morning hours. The results are then all presented on the paper read out 42 so that the operator in the morning can quickly ascertain if any of the lines are operating improperly. Corrective steps can then be taken by the telephone company upon notification of the faulty line or lines.

The line analyzer may also be used to perform interval testing. Such testing allows the user to perform specific line tests at any selected time and to repeat those tests at chosen time intervals. The interval test is normally used to monitor new installations, moves or changes of telephone lines (especially tie lines), and any lines suspected of faulty operating including higher than normal attenuation losses. The attenuation loss (db level of the received tone) can thus be monitored to determine if the situation is getting worse, warranting corrective action.

In addition to tie trunk lines shown in the specific example of Table 1, the telephone analyzer can also test the integrity of outgoing wide area telephone service (WATS) lines as shown in FIGS. 1B and 1C. In this application, local unit 22 addresses a particular subscriber line 54 which is purchased by the user for wide area telephone service. In the telephone industry, such wide area telephone service can be purchased for various zones, each zone allowing the user to make long distance telephone calls within a particular region of the country. That is, zone 1 may encompass a region having a radius of up to 100 miles from the user's location while zone 2 may encompass a region having a radius of up to 300 miles, and zone 6 may cover the entire United States. In any event, the particular WATS line selected allows the user to access to some remote location. In the given example, the local unit 22 accesses WATS line 54 in a manner analogous to accessing a tie trunk line. A telephone number at which a tone responder 24" is located may be directly accessed as shown by line 56. The tone responder then goes through a sequence of steps with the local unit analogous to that shown in Table 1. Since the particular connection between local central office 49 and remote central office 51' is determined by the telephone network and may indeed take various routes depending upon when the remote responder is accessed, the line loss for connecting line 55 can vary from test to test. What is desired, however, is to know that there is proper integrity for the WATS line 54 connecting the local region PBX to the local central office. Thus, if the measured attenuation level is within some permissible range (such as between 0 and −16.0 decibels), the line 54 is operating properly.

The telephone analyzer 20 may also be used to verify the integrity of subscriber lines 57, properly defined as central office lines, which a user rents for performing the normal telecommunication functions for a particular location aside from the dedicated tie trunk lines and WATS lines. In a typical installation a local PBX 48 may have ten central office lines for conducting voice communications aside from dedicated lines. Each of these central office lines can be tested with the present invention.

As shown in FIGS. 1B and 1C, to perform these tests, the local unit 22 accesses a particular central office line 57' in a manner analogous to selecting a tie trunk line as shown in Table 1. The number following access of this central office line corresponds to another central office line 57" rented by that customer from the telephone company and which is terminated by a local tone responder 24'''. The local PBX then performs a series of steps analogous to those shown in Table 1. In this way, both central office lines 57' and 57" are tested for attenuation loss and echo return level. The test can then continue for each additional central office line rented by that particular user through use of the same tone responder being accessed by the local unit 22. In this manner, all the central office lines rented by the user can be tested on a daily basis.

As best seen in FIGS. 1B and 1C, the line analyzer 20 may also test foreign exchange lines 60 in addition to tie trunk lines, WATS lines 54 and central office lines 57. Foreign exchange lines are telephone lines which connect a locally dialed number to a long distance location without the caller incurring a long distance telephone charge. A typical example is where a caller dials a local airline ticket information number and is connected to a central answering station located in a distant community. The foreign exchange lines are similar to central office lines except that they originate from a remote central office.

Foreign exchange lines may be tested in a manner similar to testing a central office line. That is, the local PBX accesses the foreign exchange line 60 and from this dials a long distance call to central office line 57". This makes connection to the local tone responder 24'''. The test procedure then continues in a manner analogous to testing central office lines.

Alternatively the test procedure can be conducted through a tone responder 24''' if that tone responder can be accessed by a central office line associated with remote central office 51'. Such a line 56 is shown in FIG. 1B.

As shown in FIG. 1D, the local unit may further interface with the local PBX 48 so as to test off premise extension lines 62. Off premise extension lines connect a local PBX 48 to a telephone 64 through the dedicated off premise extension line 62. These lines may actually run for several miles and can have the types of attenuation loss and echo return level associated with central office lines, tie lines, WATS lines and foreign exchange lines. It is therefore desirable to test these lines on a periodic basis.

In particular, local unit 22 through the local PBX 48 accesses the tone responder 24* through its particular extension number, (here extension number 600). The responder, once accessed, generates return signals in a manner similar to that described in Table 1. However, the tone responder must be able to distinguish a particular DTMF tone sent to it from the local unit 22 in order that the interconnected telephone is not activated when a test is to be performed. To achieve this result, the local unit sends one of the four DTMF tones that are not used to access a normal DTMF type telephone. These particular signals are the A, B, C, and D signals shown in Table 2. Once the tone responder decodes such a signal, it becomes activated and operates in a manner analogous to the previously described tone responders. At other times, tone responder 24* merely presents a non-interfering high impedance load on the line which does not affect operation of the telephone 64.

Therefore, the overall operation of the present invention allows the testing on an automatic basis of all user subscriber lines, tie trunk lines, outgoing wide area telephone service (WATS) lines, foreign exchange (FX) lines, and off premise extension lines associated with a particular user. The tests may be performed at any time, usually at low usage times, and interval tests may be made if any lines are suspected of being potentially faulty.

Finally, special application test programs may be entered to automatically cancel features which are normally found on computerized PBX's; namely, "call forwarding" and "do not disturb" features. Call forwarding is typically encountered in large commercial establishments where a person normally at a particular extension number is for some reason, at some other location. This "call forwarding" feature allows the other extension number to be immediately accessed when the first extension number is dialed. It is necessary that the PBX operator cancel these call forwarding numbers at the beginning of each subsequent work day unless, of course, that person is still at the other location. The present invention can be programmed to automatically perform the cancellation of such "call forwarding" numbers. It can similarly cancel the "do not disturb" feature on each subsequent day. Such a feature simply prevents a particular extension number from being accessed.

Besides the test procedure shown in Table 1, a faster line test may also be performed by the telephone line analyzer.

Table 3 illustrates such a test. In this test the local unit merely accesses a particular tie trunk line and performs two attenuation measurements; one where a dial tone is received from the local central office and a second where the dial tone is broken. As shown in Table 3, after accessing the tie trunk line the local unit waits (pauses) from one and a half seconds to three seconds in order for a dial tone to be received from the local central office and also to allow the line to settle. The local unit then immediately measures and prints (MPI) the line level of the received dial tone, which should be approximately −8 decibels. The local unit then sends one of the twelve DTMF signals which can be accessed on a standard telephone. For the given example, a number 9 is sent.

The receipt of this DTMF signal breaks the dial tone at the central office and thus causes the line to enter a low electrical level which is then measured by the local unit by another MPI step. The line should now be at approximately −35 to −40 db. If such a reading is obtained, the user reading printout 42 knows that the entire accessed line is most likely operational since the line to the local central office is operational.

Table 3G is a printout for a typical break dial tone test. The program number, date, time and first dial sequence are similar to that shown for the full test printout of Table 3F. The two "level" measurements are respectively the dial tone level (in db) and the quiet line level (in db). The second "dial sequence" is the DTMF signal issued by the local unit to break dial tone.

This particular test is useful when a quick measurement is required on a line, such as when an interval test is selected for a line which may be suspected of faulty operation and yet the test is to be performed while the line is under frequent use. It may also be used for testing central office lines without the need for a local tone responder 24‴. The test procedure is very fast and thus minimizes line disruption. The particular test procedure is shown in Table 3.

Printouts and Programming of Local Unit 22

As mentioned above and as seen in FIG. 1, local unit 22 includes a printer 44 for presenting hardcopy 42 to the user of the test analyzer. Thus Tables 3A–3T illustrate the type of printouts for line analyzer 20.

Tables 3A–3B illustrate on their left-hand portion the printouts obtained when the clock is set and the date is set respectively. Keys 147 and 148 of sub-keyboard area 32 (see FIG. 1A) are used in conjunction with sub-keyboard area 31. Test times are set via key 149 and examples of such printouts for priority tests and interval tests are given in Tables 3C and 3D respectively.

Once a line test has been entered via keyboard 28, its test steps can be printed out for verification and record purposes such as shown in Table 3E. There a line test (program test number 00) is shown having a direct line select to PBX line number 12. It accesses extension number 623 at the far end and executes a measure and print detect. The test sequence is similar to that given in Table 1 except for the echo return level test.

The printout results of a complete line test are given in Table 3F where an interval test has been run. Here the program test number is "00". The dial sequence is the accessed number of the line having a tone responder. The response time for line access is 3 seconds. The tone responder (far end) identifier is the DTMF signal "*". The attenuation level is −11.8 db while the echo return level (E-R-L) is −4.4 db. The noise level of the quiet line is −40.1 db. All

TABLE 3

| LOCAL UNIT | REMOTE UNIT (USUALLY CENTRAL OFFICE) | COMMENT |
|---|---|---|
| ##80001 | — | Accesses trunk line corresponding to address of the last four (least significant) digits. |
| PAUSE (1.5–3.0 sec.) | Dial tone | Dial tone from the telephone network central office should be received at local unit (typical value - 8db). The waiting period is to allow transients on line to die out. |
| Measure and print immediate (MPI) the level of the received dial tone (in db) | Dial tone continues | Measures and prints the electrical line level of the dial tone after waiting 1.5 to 3.0 seconds. |
| 9 (DTMF) | Break dial tone | Any one of the twelve user accessible DTMF signals sent to the central office to break dial tone. |
| MPI | Dial tone still broken | Local unit immediately measures the line level (in db) to ascertain if the dial tone has been broken. Line should typically read from −35 db to −40 db when the dial tone is broken. |
| Local unit goes "on hook". MPI completed | | Local unit can immediately perform test sequence for the next desired line. |

ENTER TIME-SIX DIGITS

TABLE 3A

SET TIME

TIME- 13:34:45

ENTER MO/DAY/YR

TABLE 3B

SET DATE

DATE- 12/17/81

```
    PRIORITY TESTS
RUN AT: (HR/MIN)
06:00
ENTER TESTS TO RUN 00
01
02
75 THRU 85
00 THRU 99  *ALL*
ENTRY COMPLETED!
```

TABLE 3C

SET PRIORITY TIME AND TESTS

```
    INTERVAL TESTS
START TIME: (HR/MIN)

16:10
RUN EVERY:(HR/MIN)

00 HRS. 05 MINS.
RUN HOW MANY TIMES?

05
ENTER TESTS TO RUN

00 THRU 99  *ALL*
ENTRY COMPLETED!
```

TABLE 3D

SET INTERVAL TIME AND TESTS

```
PROGRAM NO.       00
##80012
PAUSE
623
MP-DETECT
EOT
```

TABLE 3E

TEST ENTRY VERIFICATION

RUN INTERVAL TESTS

```
PROGRAM NO.         00
DATE- 12/16/81
TIME- 16:10:05
DIAL SEQ:     7434582
RESPONSE TIME:      3
FAR END:            *
LEVEL:          -11.8
E-R-L:          - 4.4
LINE NOISE:     -40.1
```

```
PROGRAM NO.         01
DATE- 01/16/82
TIME- 13:55:17
DIAL SEQ:      #80005
LEVEL:          -12.0
DIAL SEQ:           9
LEVEL:          -50.0
```

```
PROGRAM NO.         00
DATE- 12/16/81
TIME- 16:06:07
DIAL SEQ:     7434582
RESPONSE TIME:      3
FAR END:            *
LEVEL:          -12.1
E-R-L:          - 4.4
LINE NOISE:     -40.4
###################

LEVEL BELOW REF - 6.0

###################

*******************
   SUMMARY REPORT

TOT. LINES TESTED 001

FAILURE SUMMARY
LOW LEVEL   NO ANSWER
   000          000

*******************
```

TABLE 3F

LINE TEST RESULTS (for a complete test corresponding to test procedure on Table 1).

TABLE 3G

LINE TEST RESULTS
(for a break dial tone test corresponding to test procedure in Table 3).

TABLE 3H

LINE TEST RESULT WITH REFERENCE LEVEL SET AT -6.0 dBm

This is the reference level flag printed when the measured level is below the reference level.

TABLE 3I

| | |
|---|---|
| SUMMARY REPORT: | PRINTED FOLLOWING INTERVAL AND PRIORITY TEST SEQUENCES |

TABLE 3J

```
PROGRAM NO.       05
DATE- 12/16/81
TIME- 16:10:59
DIAL SEQ:    7434592

####################
   NO TONE RECEIVED!
####################
```

FAILED TEST PRINTOUT

TABLE 3K

```
ENTER * FOR TEST MENU

ENTER TEST CODE:

MEMORY 0-F TEST....1

MEMORY PATRN TEST..2

PRINTER TEST.......3

DTMF TONE SEQ TEST 4

KEYBOARD TEST......5

BRK DIAL TONE TST..6

1KHZ TEST TONE.....7

DTMF STEADY TONE...8

TO EXIT TEST HIT EOT

ENTER TEST CODE:
```

SYSTEM DIAGNOSTICS MENU

TABLE 3L

```
MEMORY TEST:
MEMORY TEST COMPLETE.
NO MEMORY FAILURES!

ENTER TEST CODE:
```

MEMORY O-F TEST

```
MEMORY PATTERN TEST
TEST CLEARS MEMORY!
TO CONFIRM, ENTER *

ADDRS  WRITTEN  READ

5000    C7       FF
5001    C8       FF
5002    C9       FF
5003    CA       FF
5004    CB       FF
5005    CC       FF
5006    CD       FF
5007    CE       FF
5008    CF       FF
5009    D0       FF
500A    D1       FF
500B    D2       FF
500C    D3       FF

TEST ABANDONED!

ENTER TEST CODE:
```

TABLE 3M

MEMORY PATTERN TEST

---

```
PRINTER TEST:
ABCDEFGHIJKLMNOPQRST
UVWXYZ 0123456789
!@#$%^*()_+-=:;,.?

ENTER TEST CODE:

DTMF OUTPUT FUNCTION
TEST...

ENTER TEST CODE:
```

TABLE 3N

PRINTER TEST

TABLE 3O

SENDS DTMF AS EACH BUTTON IS DEPRESSED

---

TABLE 3P

```
KEYBOARD TEST 01
02
03
05
06
07
08
09
0A
0B
0C
0D
0E
18

ENTER TEST CODE:
```

VERIFIES KEYBOARD BUTTON DEPRESSIONS
AND KEYBOARD DECODER

BREAK DIAL TONE TEST

DIAL TONE LEV: -11.5
QUIET LINE LEV: -42.2

TABLE 3 Q

BREAK DIAL TONE TEST (UNIT GOES
OFF-HOOK, MEASURES DIAL TONE LEVER,
DIALS ONE DIGIT, MEASURES QUIET LINE.)

---

ENTER TEST CODE:

1 KHZ TEST TONE

TABLE 3 R

1 KHz TONE TEST (SENDS) KHz TONE TO
SPEAKER)

---

ENTER TEST CODE:

DTMF OUTPUT TEST

TABLE 3 S

SENDS ALL DTMF TONES (16) TO
SPEAKER IN SEQUENCE

---

ENTER TEST CODE:

ENTER TEST CODE:

TABLE 3 T

ENTER REFERENCE LEVEL

REF. LEVEL: -6.5

REFERENCE LEVEL ENTRY VERIFICATION these values are typical for a properly operating telephone line. Table 3G similarly is a printout of a break dial tone line test.

Table 3H shows the results for a similar line tested where a reference level at the local unit is set at −6 db. This reference level is entered via the keyboard. Any subsequent line test in which the line attenuation measurement falls below the entered reference level is flagged on the printer message (see bottom of Table 3H).

In addition to individual line test results, summary printouts of a plurality of tested lines may be obtained such as shown in Table 3I (here only 1 line tested). The printout shows the total number of lines tested and the number of lines found to have a low level or no answer.

Table 3J shows the printout of a line that has failed the test. The particular failure mode is given; here, no tone received from the tone responder. Such a failure would indicate that no answer was received from the far end.

In addition to line test results, printouts of local unit operation can also be obtained. Table 3K summarizes the system diagnostic tests available. Any diagnostic test can be selected by depression of the appropriate key illustrated.

Thus a memory O-F test is obtained upon depression of the "1" key. The results of this test are shown in Table 3L. This test checks RAM memory 84 for failures.

Key number "2" selects a memory pattern test. The results of this test are shown in Table 3M. This test checks memory addresses as illustrated.

Key number "3" selects the printer test. The results of this test are shown in Table 3M. Here each character generated by printer 44 is printed out for verification.

Key number "4" selects the DTMF tone sequence test. The results of this test are shown in Table 3O. Here each DTMF signal is generated and tested as the corresponding key of keyboard 28 is depressed.

Key number "5" selects the keyboard test whose results are shown in Table 3P. Here keyboard decoding is tested as each key is depressed.

Key number "6" selects the break dial tone test. Its results are given in Table 3Q. There it is seen that the dial tone test causes the unit to go off-hook to measure the dial tone level and then dials one digit to measure a quiet line.

Key number "7" from Table 3K selects the 1 KHZ tone test. The results of this test are shown in Table 3R. Here the 1 HKZ (actually 941 Hz) signal is sent to speaker 38 for verification purposes.

Finally key number "8" of Table 3K selects the DTMF steady tone test. The results of this test are given in Table 3S. Here all sixteen DTMF signals are sent to speaker 38 in sequence.

Although not part of the menu given in Table 3K, a reference level verification may be made with a printout as shown in Table 3T. This printout is used with test results given in Table 3H.

It is readily seen that a number of printouts are available from local unit 22 which can completely describe all modes of operation including line test sequence verification, line test results, and local unit diagnostics.

Detailed Hardware Description

As best seen in FIG. 1, the local unit comprises a number of sub-assemblies which combine to perform the operations described above. In particular, the unit is connected to the TIP and RING wires 66 and 67 from PBX 48 (see FIG. 1E for interconnection to the four wire telephone line).

Figure 13:
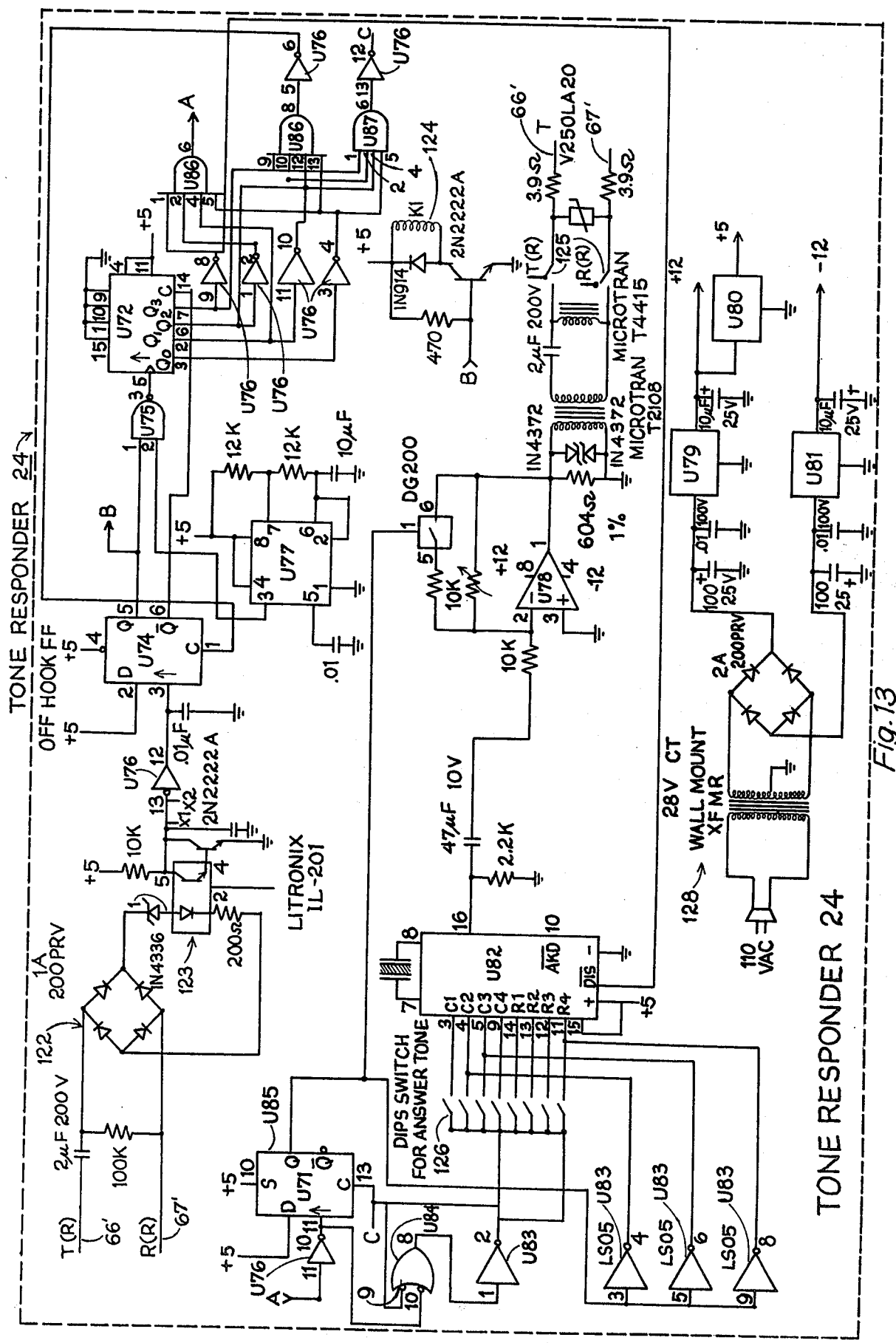
FIG. 13 is a detailed schematic of the tone responder used with the local unit to form the overall telephone line analyzer.

Table 4 cross-references each module of local unit 22 with the corresponding detailed schematic diagrams. Tone responder 24 is shown in detail in FIG. 13. Tone responder 24* associated with off-premise extension testing is shown by the combination of FIGS. 13 and 13A. As noted throughout these detailed schematic diagrams, capacitors, resistors, transformers, chokes, varistors and many semiconductor components are explicitly identified by component value or type. Integrated circuits including operational amplifiers, logic gates, flip-flops, DTMF decoders and microprocessors are identified with a "U" number where the particular "U" number corresponds to a component listed in Table 5. Every component with the same "U" number refers to the same integrated circuit chip. For example, in FIG. 2, the Nand gates shown in the lower center of the figure as U38, are all part of the same integrated circuit; namely, a 74LS32. If a particular Nand gate is to be identified, it will be done so with the "U" number and a unique pin number. Thus the lower Nand gate shown in FIG. 2 can be identified as U38-8.

TABLE 4

| Modules Forming Local Unit 22 | |
|---|---|
| Module | Figure |
| Keyboard 28 | 9 |
| Display Interface 33 | 10 |
| Display 34 | 10 |
| Printer 44 | 11 |
| Tone Encoder & Sender Interface 51 | 4 |
| Loop Start Interface 68 | 3 |
| Measurement Unit 74 | 8 |
| Tone Receiver and Decoder 76 | 5 |
| Audio Receiver & Amplifier 78 | 12 |
| Central Processing Unit (CPU) and Clock 80 | 2 |
| Programmable Read Only Memory Module (PROM) 82 | 6 |
| Random Access Memory Module (RAM) 84 | 7 |
| Keyboard Interface 86 | 9 |
| Printer Interface 90 | 11 |

TABLE 5

| "U" Number | Component |
|---|---|
| U1–U6 | 74LS273 |
| U7 | 6.8K SIP |
| U8 | 74LS245 |
| U9 | 74LS02 |
| U10 | 74LS138 |
| U11 | 74LS138 |
| U12 | 74LS21 |
| U13 | 74LS245 |
| U14 | 74LS245 |
| U15 | 74LS273 |
| U16 | 74LS374 |
| U17 | 74LS193 |
| U18 | 74LS193 |
| U19 | 74LS193 |
| U20 | 74LS74 |
| U21 | 74LS138 |
| U22 | 74LS14 |
| U23 | 74LS00 |
| U24 | 2114 RAM |
| U25 | 2114 RAM |
| U26 | 2114 RAM |
| U27 | 2114 RAM |
| U28 | 2114 RAM |
| U29 | 2114 RAM |
| U30 | 2114 RAM |
| U31 | 2114 RAM |
| U32 | 2114 RAM |
| U33 | 2114 RAM |
| U34 | 4.096 MHZ CLOCK VALTEC |
| U35 | 74LS74 |
| U36 | 74LS193 |
| U37 | 74LS08 |
| U38 | 74LS32 |
| U39 | 7437 |
| U40 | Z80A (Zilog) microprocessor |
| U41 | 74LS244 |
| U42 | 2732 PROM |
| U43 | 2732 PROM |
| U44 | 2732 PROM |
| U45 | 2732 PROM |
| U46 | 74LS244 |
| U47 | 74LS273 |
| U48 | 74LS374 |
| U49 | 74LS128 |
| U50 | 74LS32 |
| U51 | 74LS04 |

TABLE 5-continued

| "U" Number | Component |
| --- | --- |
| U52 | Intersil DG200 analog switch |
| U53 | MK5089N (Mostek) DTMF encoder |
| U54 | 74LS273 |
| U55 | 74LS273 |
| U56 | 74LS244 |
| U57 | 74LS273 |
| U58 | 74LS244 |
| U59 | 74LS244 |
| U60 | 74LS138 |
| U61 | 74LS138 |
| U62 | 74LS21 |
| U63 | 74LS138 |
| U64 | MC1458 Motorola op amp |
| U65 | MC1458 Motorola op amp |
| U66 | 74LS138 |
| U67 | Teletone M-927 DTMF decoder |
| U68 | CD4050 RCA CMOS to TTL level converter |
| U69 | 74LS38 |
| U70 | ADC0808 National A/D converter |
| U71 | MC1458 Motorola op amp |
| U72 | MC1458 Motorola op amp |
| U73 | MC1458 Motorola op amp |
| U74 | 74LS193 |
| U75 | 74LS00 |
| U76 | 74LS14 |
| U77 | 555 Signetics timer |
| U78 | MC1458 Motorola op amp |
| U79 | LM340AK-12 National Semiconductor −12V voltage regulator |
| U80 | LM309 National Semiconductor +5V voltage regulator |
| U81 | LM320K National Semiconductor +12V voltage regulator |
| U82 | MK5089 National (Mostek) DTMF encoder |
| U83 | 74LS05 |
| U84 | 74LS00 |
| U85 | 74LS74 |
| U86 | 74LS21 |
| U87 | 74LS21 |

Figure 3:
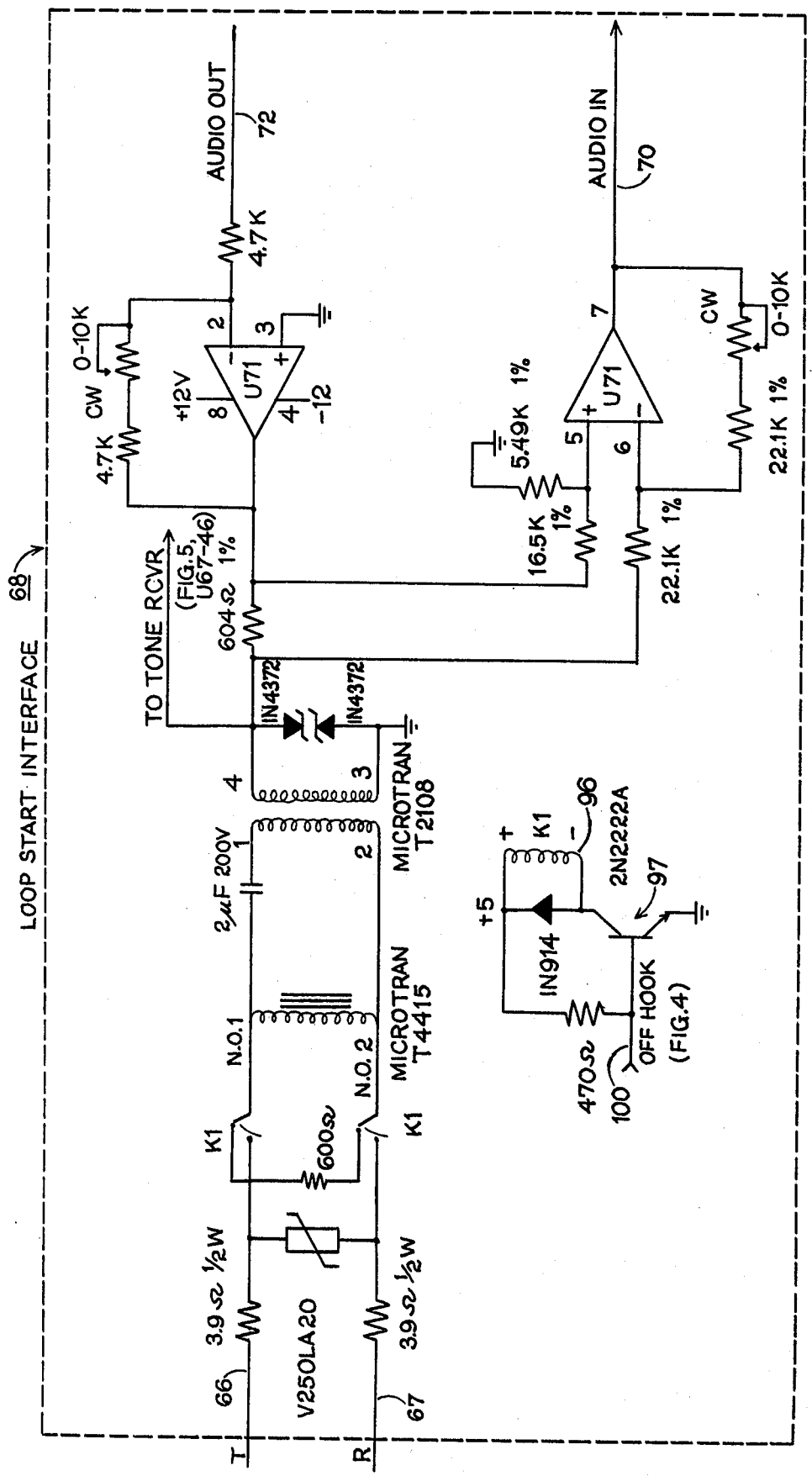
FIG. 3 is a detailed schematic of the loop start interface shown in FIG. 1.

Referring now to FIGS. 1 and 3, the loop start interface 68 is the interface between the tip line 66 and ring line 67 of the telephone network and the remaining portions of the local unit 22. As mentioned earlier the local PBX receives both transmit and receive tip and ring lines (see FIG. 1E) from the telephone network. However these lines are terminated into a single ring-tip pair for use in voice-grade communications. Although only the receive pair is attenuation tested through the remote tone responder, the receipt of the remote PBX of signals from the local unit actually tests the transmit pair as well.

Figure 4:
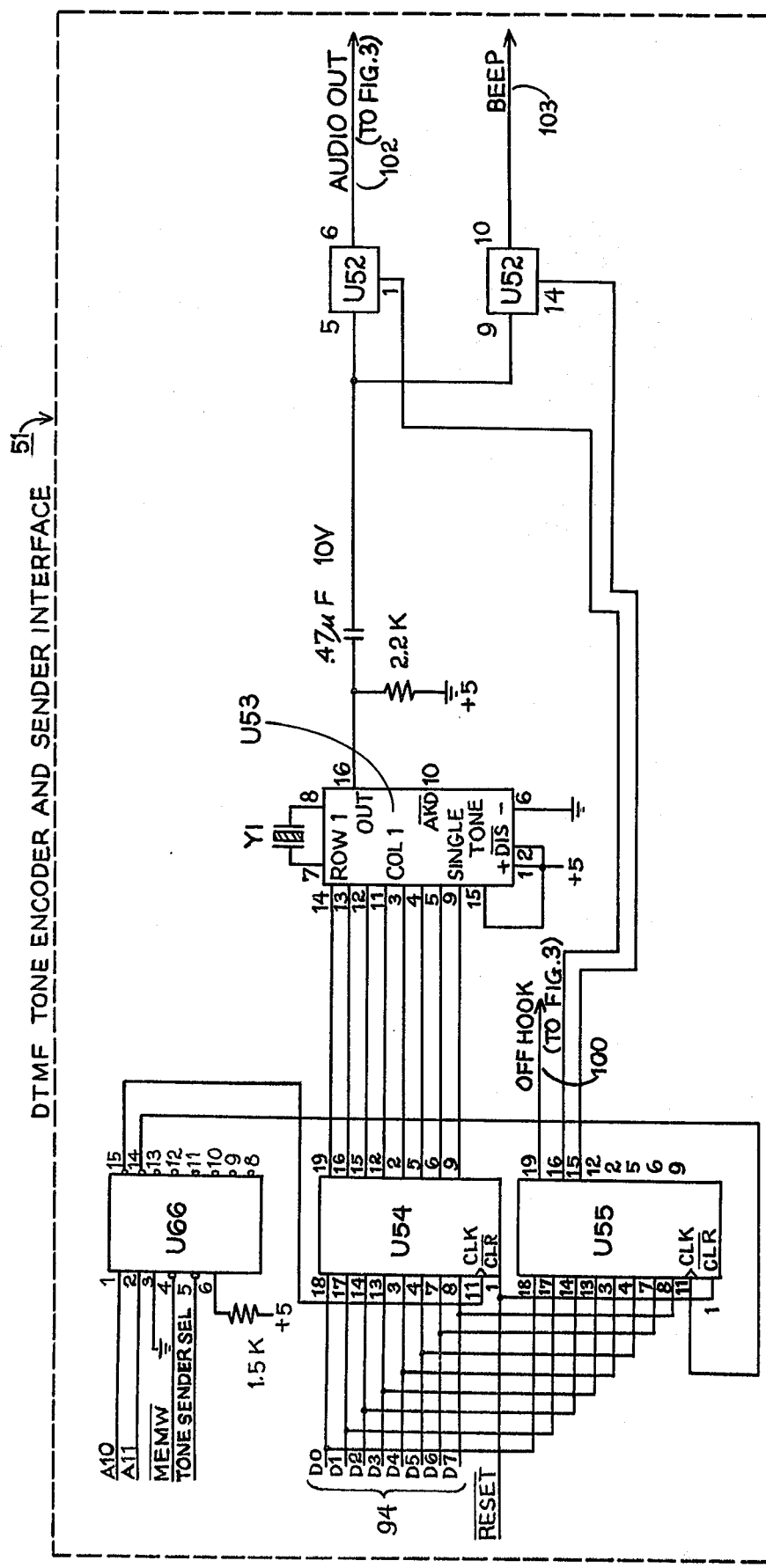
FIG. 4 is a detailed schematic of the telephone DTMF tone encoder and single tone generator and sender interface shown in FIG. 1.

As shown in FIG. 3, the loop start interface comprises relay controlled double pole switch K1 activated through relay coil 96. When transistor 97 receives an OFF HOOK signal from pin 19 of U55 (see FIG. 4 illustrating the DTMF tone encoder, single tone generator and sender interface 51), coil 96 is energized closing double pole switch contacts K1. At this point, the local unit is able to send out and receive audio information along lines 70 and 72. Prior to receipt of the OFF HOOK signal switch contacts K1 are connected across calibrating resistor 89. A 941 Hz tone is then applied across this resistor and the decibel level recorded. This recorded level is then used as the calibrated signal when the echo return level figure is calculated.

The remainder of the loop start interface buffers the information received from the tip and ring lines through amplifier U71-7 while outgoing audio information from line 72 is buffered through amplifier U71-2. Line 98 entitled "To Tone Receiver" is used to activate the tone receiver decoder U67 (see FIG. 5) at its input line 40. This enables the telephone DTMF tone receiver and decoder 76 to be responsive to incoming signals on audio in line 70.

Figure 5:
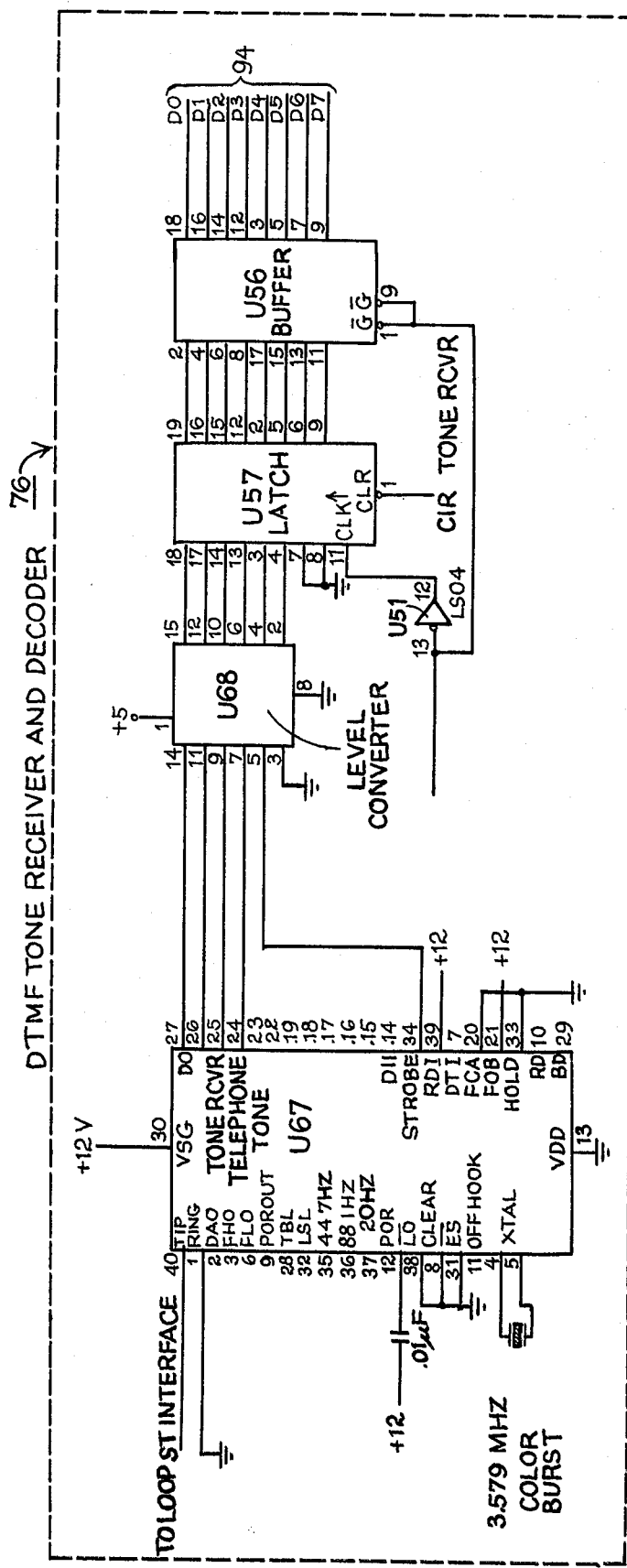
FIG. 5 is a detailed schematic of a telephone DTMF tone receiver and decoder shown in FIG. 1.

As mentioned earlier, the DTMF decoder 76 when performing a test shown in Table 1 first determines the DTMF signal received from the tone responder 24 (see FIGS. 1, 1A and 1B). As seen in FIG. 5, the DTMF decoder incorporates a decoder integrated circuit U67 whose decoded output is transferred to a level converter U68 where it is in turn transferred to latch U67. From the latch, outputs are transferred to buffer U56 for ultimate transfer onto data lines 94 forming a portion of overall bus 92 (see FIG. 1).

Details of the telephone DTMF tone encoder, single tone generator and sender interface 51 (called DTMF encoder) are shown in FIG. 4. As shown there, data is received by this module through data lines D0–D7 forming data bus 94. When DTMF signals are generated by this module an OFF HOOK signal 100 is generated to initiate activation of the loop start interface relay coil 96. This module is in turn activated by receipt of the MEMR signal from the CPU and clock module 80 (see FIG. 2) and the TONE SENDER SELECT signal from the PROM module 82 (see FIG. 6). Address lines A10 and A11 are all used in conjunction with interface U66 to energize the remainder of the DTMF encoder module.

The encoder module also incorporates an oscillator circuit comprising integrated circuit U53 in association with crystal Y1. A generated AUDIO OUT signal 102 is transferred to the loop start interface (see FIG. 3) while a BEEP signal 103 is transferred to the audio receiver and amplifier 78 (see FIG. 12). This latter signal allows the user to hear the signals being generated by the DTMF encoder.

Although not shown, a binary output signal could be generated instead of a DTMF signal if the local unit interfaced with a PBX that uses such binary signals for keyboard depression instead of DTMF signals. Examples of such PBX's are Northern Telecom's SL-1 TM and Stromberg-Carlson's DBX TM. These PBX's use binary input signals from telephone keyboards to in turn generate DTMF signals onto the telephone network. Consequently if such PBX's are used with the present invention, compatible binary signals would be generated by the local unit to properly interface with the PBX.

Figure 12:
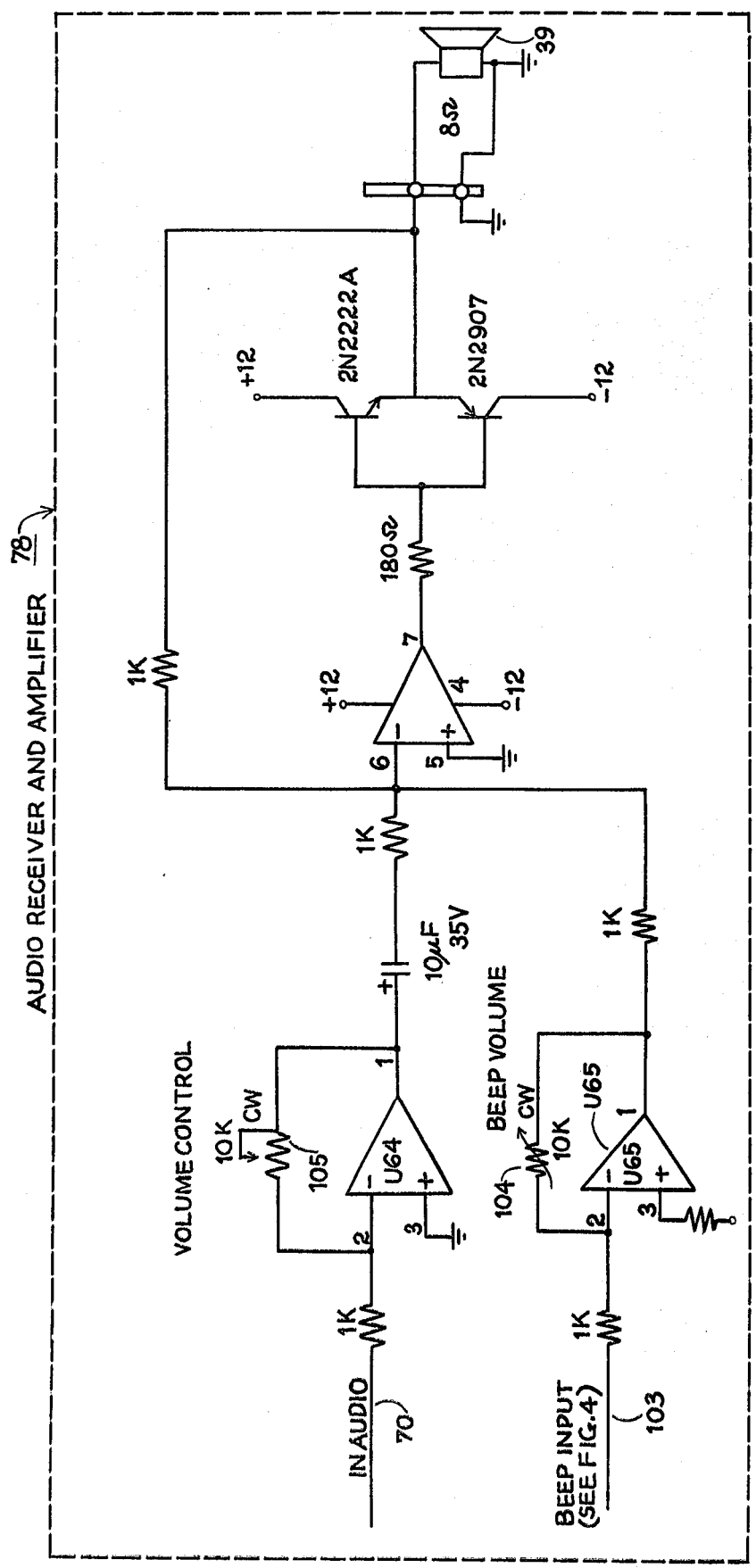
FIG. 12 is a detailed schematic of the audio receiver amplifier and speaker shown in FIG. 1.

The audio receiver and amplifier shown in FIGS. 1 and 12 receives the BEEP signal 103 and amplifies it through operational amplifier 65, having a volume control potentiometer 104. Similarly, incoming audio signals on line 70 can be monitored by the user through amplifier U64 and its volume control potentiometer 105.

Figure 8:
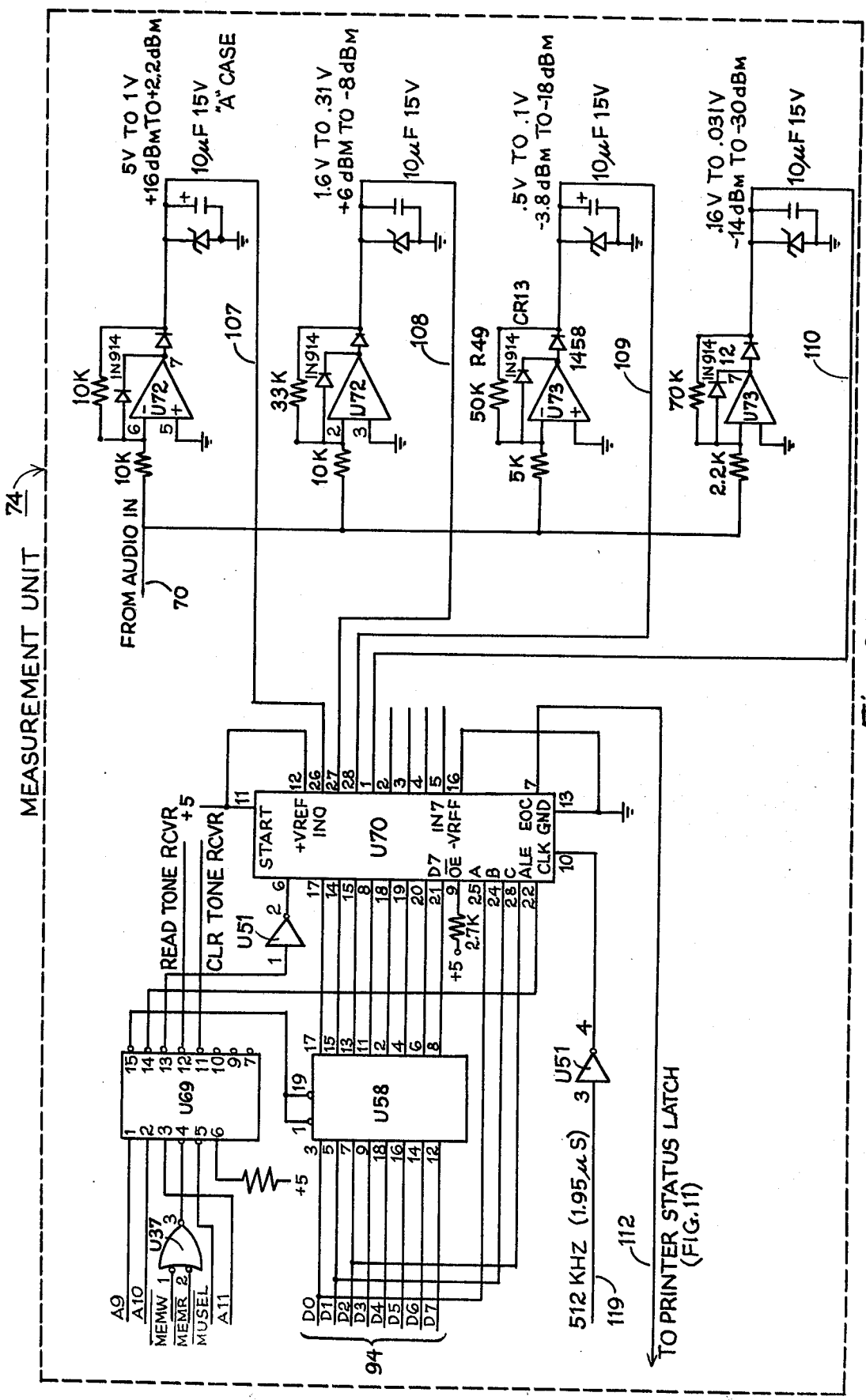
FIG. 8 is a detailed schematic of the measurement unit shown in FIG. 1.
Figure 11:
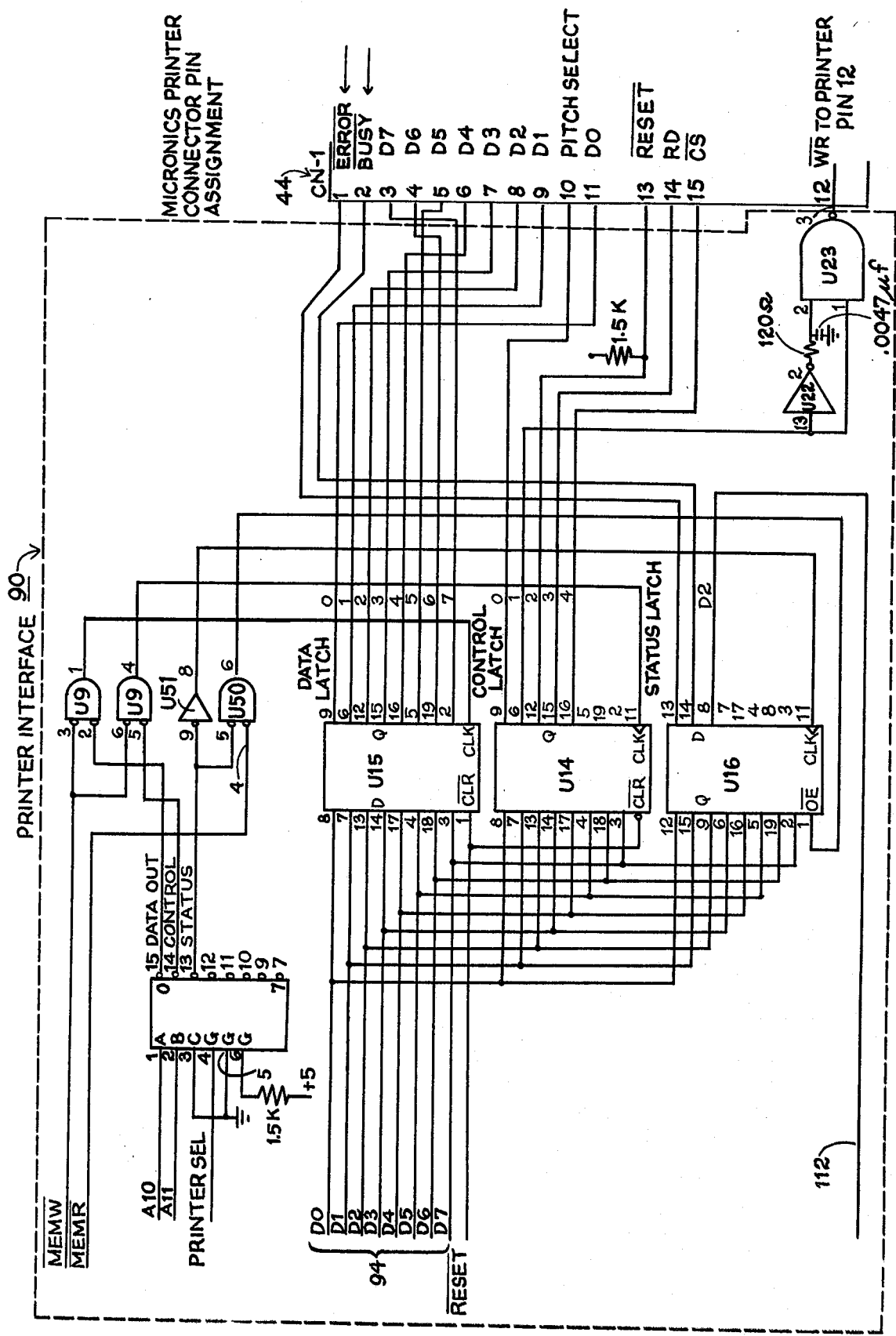
FIG. 11 is a detailed schematic of the printer interface shown in FIG. 1 and also shows the connector pins used in conjunction with a particular printer.

The input audio signals 70 are also transferred to measurement unit 74 as shown in FIGS. 1 and 8. As seen in FIG. 8, the AUDIO IN signal 70 is transferred to four separate amplifiers U72-7, U72-2, U73-1 and U73-7, each measuring a different voltage range as shown in FIG. 8. Thus amplifier U72-7 generates an output 107 if the input voltage is between 1 and 5 volts, measuring a level between 2.2 and 16 db's. Amplifier U72-2 generates an output for a voltage range of 0.31 to 1.6 volts, (−8 db to +6 db). Amplifier U73-1 generates an output for a voltage range of 0.1 volt to 0.5 volt (−8 db to −3.8 db) and amplifier U73-7 generates an output for a voltage range of 0.031 volt and 0.16 volt (−30 db to −14 db). These analog signals are transferred to integrated circuit U70. From here digitized data is presented to bus 94 via latch 58. A printer control signal 112 is transferred to the printer interface 90 as best seen in FIGS. 1 and 11. The measured level of the AUDIO IN line by the measurement unit 74 is thereby transferred to the printer interface along data bus 94 as shown in detail in FIG. 11. The printer interface operates in conjunction with this incoming data under the control of the CPU 80. The output from the printer interface is transferred to printer 44 as seen in FIGS. 1 and 11. Thus the measurements made by the measurement unit 74 are transferred to the printer 44 for display at the local unit on paper tape 42.

Figure 10:
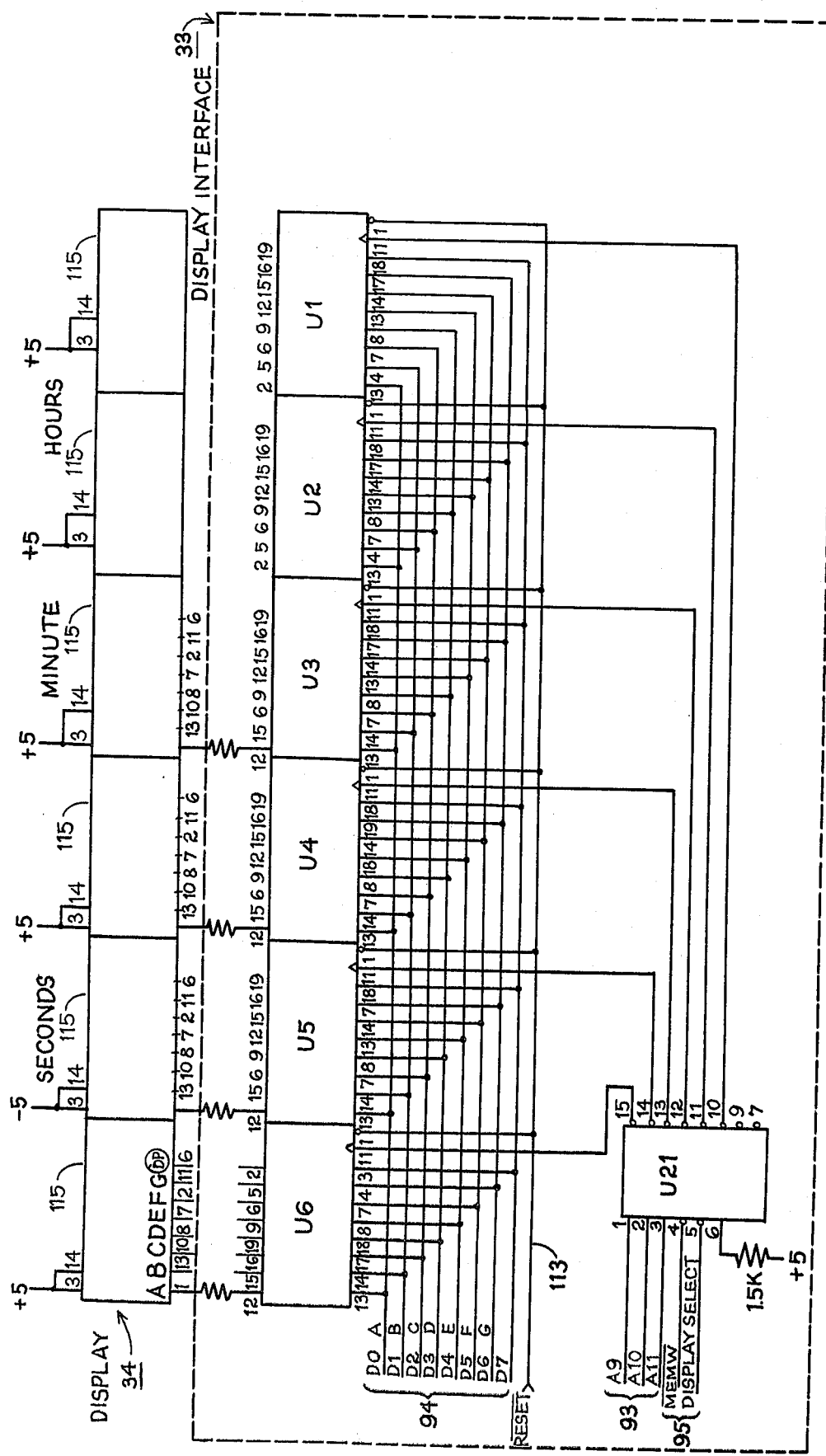
FIG. 10 is a detailed schematic of the display and display interface shown in FIG. 1.

In addition to printing information through printer interface 90 to printer 94, the present invention also incorporates a display interface 33 and display 34 as best seen in FIGS. 1 and 10. The display interface and display present visual data to the user including information regarding the local units of operation, the test number being programmed or executed, and the time of day at which tests are to be conducted. The display interface 33 interconnects with data bus 94 for receipt of data to be presented on display 34. The display interface receives a reset signal 113 from the CPU 80 along with address information on address lines A9, A10, and A11, forming part of address bus 93. It also receives commands 95. Output buffers U1 through U6 are used to energize display segments 115 forming overall display 34.

Figure 9:
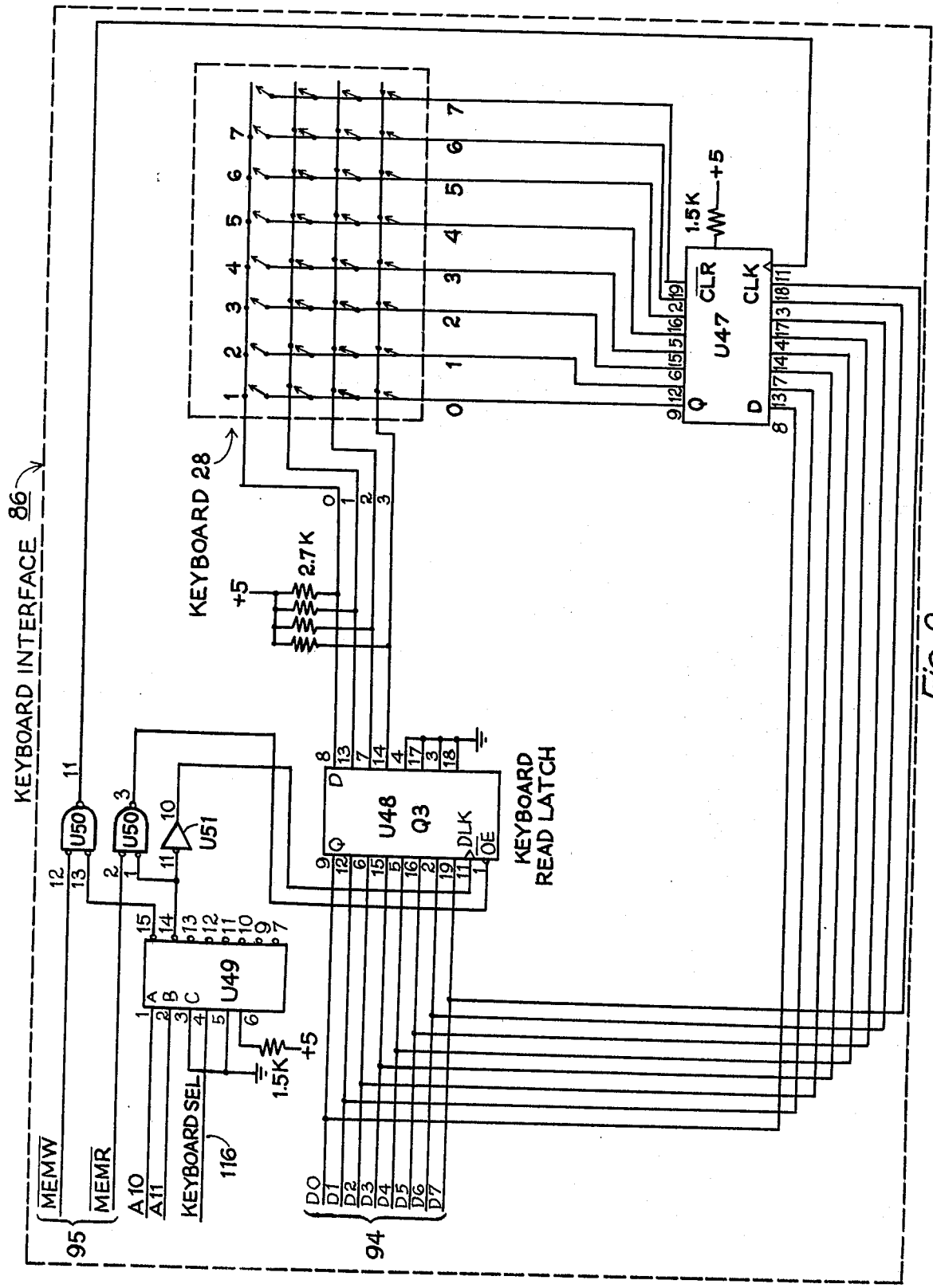
FIG. 9 is a detailed schematic of the keyboard and keyboard interface shown in FIG. 1.

Input data is generated by the user through keyboard 28 and keyboard interface 86 as best seen in FIGS. 1 and 9. FIG. 9 shows that the keyboard interface 86 receives input commands $\overline{\text{MEMW}}$ and $\overline{\text{MEMR}}$ from CPU 80 and a keyboard select signal 116 from programmable read only memory module (PROM) 82. The keyboard interface incorporates a read latch 48 which takes row output lines 0, 1, 2, and 3 and transmits them onto data lines 94 under command from NAND gate U50-3 and amplifier U51-10. The column status lines 0, 1, 2, 3, 4, 5, 6, and 7 from keyboard 28 are passed through latch U47, itself under command from NAND gate U50-11. The outputs from U48 and U47 are presented onto data bus 94.

As best seen in FIGS. 1, 2, 6 and 7, the local unit 22 comprises a CPU and clock 80, a programmable read only memory module (PROM) 82, and a random access memory module (RAM) 84. The programmable read only memory 82 is used to store the instructions for operating the CPU 80 while the random access memory 84 is used to store the user program and time of day information. The central processing unit 80 operates under the instructions stored in PROM module 82 and utilizes the data instructions in RAM module 84 for identifying the line tests to be performed.

Figure 2:
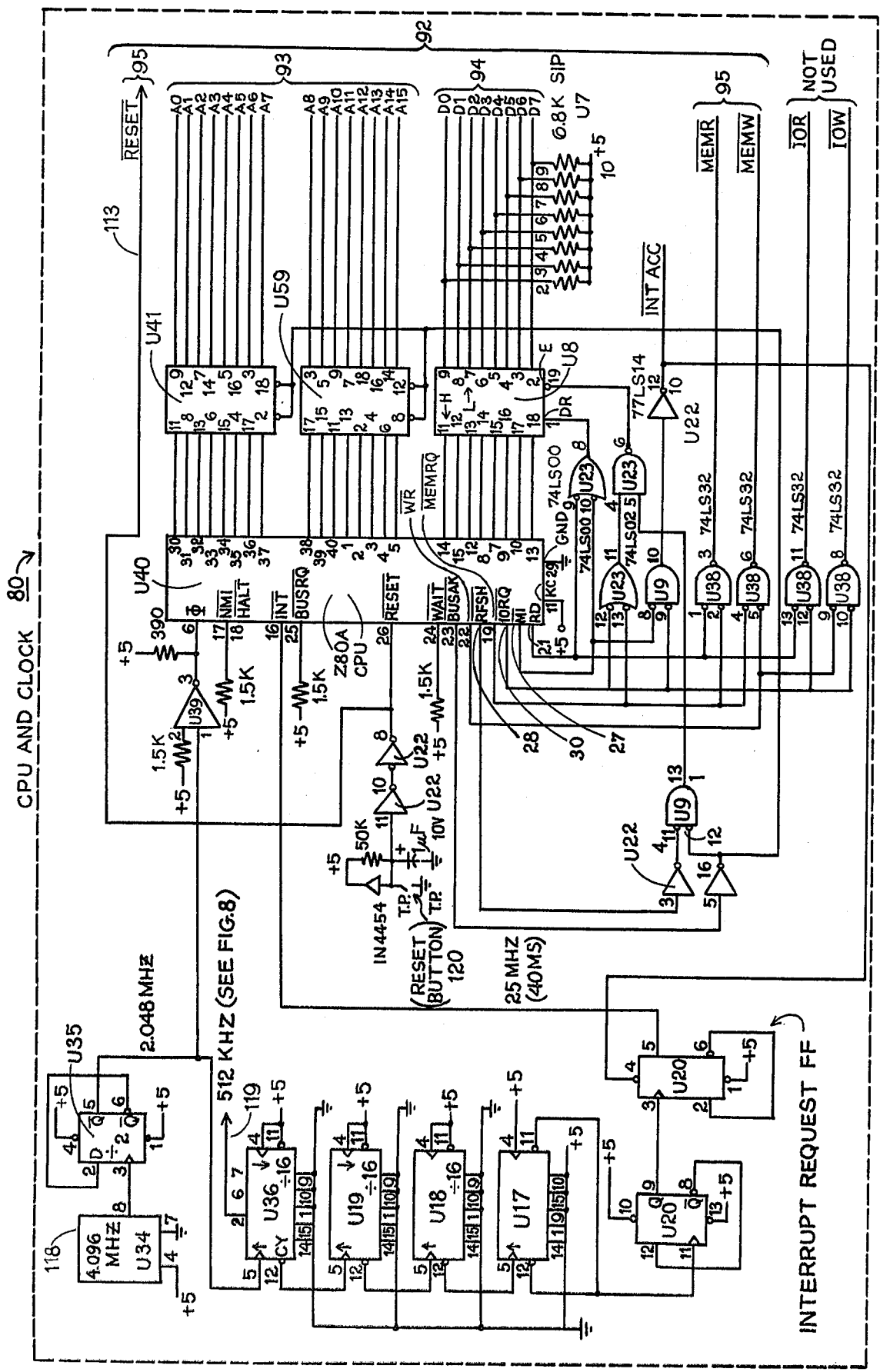
FIG. 2 is a detailed schematic of the central processing unit and clock shown in FIG. 1.

The overall instructions contained in PROM module 82 are set forth in Table 6, written in assembly language for the Z80A microcomputer U40 shown in FIG. 2. The assembled version of the program is not presented since the non-assembled version shows the exact nature of the program.

As also shown in FIG. 2, the CPU and clock 80 comprises a 4.096 megahertz clock 118 which is divided by 2 by flip-flop U35 to present a 2.048 megahertz timing signal which in turn in divided down to a 512 kilohertz clock signal 119 that is presented to measurement unit 74.

The CPU and clock in conjunction with the data stored in PROM module 82 and RAM module 84 are responsible for the entire control of the local unit, including the generating of output commands 95, the receipt and transferral of data on data bus 94, and the receipt and transfer of addressing information on address bus 93. Through these buses, forming bus 92, the CPU oversees entry of information via keyboard 28, the display of information on display 34, and control of the loop start interface 68, DTMF encoder and single tone encoder 51, DTMF decoder 76, measurement unit 74, and printer interface 90. A reset button 120 as shown in FIG. 2 is utilized to reset the microprocessor U40 when re-initialization is desired by the user.

Table 6

```
GLOBAL    MACRO
          GLBL    TONE, TNTBL, TIMER, KEYBNC, KEYIN, KEYCOL, KEYROW, ONHK
          GLBL    DISP0, KEYNUM, PORTA, PSTAT, PCNTL, PLINE, TIMDSP, BEEPIN
          GLBL    MSECS, UDATE, DAYS, MINS, HRS, MNTH, YEAR, SECS, DTMF
          GLBL    BCDOT, KEYRD, RAMSZ, RAMBG, STACK, ISR, DISP, BLANK, CMND1
          GLBL    PBUFF, RNPGM, GOTO, CANCEL, DELET, PRNT, STOP, PAUSE, MP, MPI
          GLBL    EOT, FLASH, SETIM, STDTE, STST, CLEAR, MEMCLR, ASTSK, LB, NUMLO
          GLBL    NUMHI, ALL, BEEP, BCDPR, PSPC, PSPSZ, STAT, PSTRT, LINAPX, PTDB
          GLBL    BFCNT, FLG1, BFPTR, HEADR, TSSPY, HOOK, TONEP, TEST, ALL1
          GLBL    CALC, COMON, RANGE, STCNVT, MSDAT, PKEY, TNRD, TNCLR
          GLBL    PDATE, PTIME, ASCOT, CLRBF, XFER, MAINL, INACFG, STRTM, INTVL
          GLBL    NINTVL, INTBLK, INTST, NTOGO, NXTIM, RUNINT, RUNPR, PRACFG
          GLBL    PRTIM, PRBLK, STPFG, NSTEPS, TTIMP, TMNTRY, TIMFLG, XRANGE
          GLBL    SUM, IER, ICAND, PROD, PRODX, SUM1, ADDEND, AUGEND, RDNG
          GLBL    LNFLG, ASCTBL, ERL, MSURE, CALIBR, ADD, ERL1, FSUB, HEXOUT
          GLBL    TESTK, THNKL, CYCLE, CYCOFF, TCNT, MEMINI, REFLEV, FAIL1, FAIL2
          GLBL    TTEST, SETREF, RETURN, RESTIM, REFAIL, SYSTST, MEMFLG, TSTMD
          GLBL    CNVT, MSCVT
```

```
         ENDM
WAIT     MACRO    N
         LD       A,&N
         INC      A
         LD       (TIMER),A
LP&INDX  LD       A,(TIMER)
         AND      A
         JR       NZ,LP&INDX
         ENDM
WRITE    MACRO    MSG
         PUSH     HL
         LD       HL,&MSG
         CALL     PLINE
         POP      HL
         ENDM
NUMCHK   MACRO    SRC,MOD
         PUSH     BC
         LD       A,(&SRC)
         LD       B,&MOD
         CALL     INCR
         LD       (&SRC),A
         POP      BC
         RET      C
         ENDM
CMND     MACRO    KEY,SUB
         PUSH     BC
         PUSH     HL
         LD       B,&KEY
         LD       HL,&SUB
         CALL     CMND1
         POP      HL
         POP      BC
         ENDM
CHK      MACRO    KEY,SUB
         CP       &KEY
         JP       NZ,X&INDX
         CALL     BEEP
         CALL     &SUB
         JP       COMON
X&INDX   NOP
         ENDM
CHK1     MACRO    KEY,SUB
         CP       &KEY
         JP       NZ,X&INDX
         CALL     &SUB
         JP       COMON
X&INDX   NOP
         ENDM
WCMND    MACRO
W&INDX   LD       A,(KEYIN)
         BIT      7,A
         JP       Z,W&INDX
         AND      X'3F'
         ENDM
DSPLY    MACRO    CHR,POS
         PUSH     BC
         LD       A,&POS
         LD       B,&CHR
         CALL     DISP
         POP      BC
         ENDM
CLRKEY   MACRO
```

```
                LD      A,0
                LD      (KEYIN),A
                ENDM
XMOVE           MACRO   SRC,DEST,NUM
                LD      HL,&SRC
                LD      DE,&DEST
                LD      BC,&NUM
                LDIR
                ENDM
BLANK3          MACRO
                PUSH    AF
                PUSH    DE
                PUSH    BC
                PUSH    HL
                LD      HL,BLANK
                CALL    PLINE
                LD      HL,BLANK
                CALL    PLINE
                LD      HL,BLANK
                CALL    PLINE
                POP     HL
                POP     BC
                POP     DE
                POP     AF
                ENDM
                PRINT   OFF
                RSEG    DEFS
                GLOBAL

*SYMBOL AND TABLE DEFS, RAM STORAGE
*
*       6/28/81 DSC
*
*********************************
*
*TONE GENERATOR CODE TABLE - SEE TONE FOR EXPLANATION
TNTBL           DC      X'EE',X'ED',X'EB',X'E7'
                DC      X'DE',X'DD',X'DB',X'D7'
                DC      X'BE',X'BD',X'BB',X'B7'
CYCLE           EQU     256                     CYCLE TIME FOR DISPLAY FLASHING
CYCOFF          EQU     CYCLE/4                 OFF DUTY CYCLE=25%
TONEP           EQU     X'C000'                 TONE GENERATOR MEMORY ADDRESS
KEYCOL          EQU     X'8000'                 KEYBOARD COLUMN ADDRESS
KEYROW          EQU     X'8400'                 KEYBOARD ROW READ ADDRESS
KEYNUM          EQU     32                      NUM. BER OF KEYS IN SYSTEM
DISP0           EQU     X'A000'                 LOWEST ORDER DISPLAY DIGIT ADDRESS
*                                               NEXT FIVE DIGITS AT ADDRESSES OFFSET BY
*                                               X'0200'
ONHK            EQU     X'FE'                   ON HOOK, NO AMPS ENABLED
BEEPTN          EQU     X'FA'                   ON HOOK, BEEP TONE ENABLED
DTMF            EQU     X'FD'                   OFF HOOK, DTMF OUT ENABLED
PCNTL           EQU     X'9400'                 PRINTER CONTROL ADDRESS
PSTAT           EQU     X'9800'                 PRINTER STATUS READ ADDRESS
PDATA           EQU     X'9000'                 PRINTER DATA OUTPUT ADDRESS
RAMBG           EQU     X'4000'
RAMSZ           EQU     X'1000'                 SIZE OF RAM
HOOK            EQU     X'C400'
PSPSZ           EQU     32                      PROGRAM BLOCK SIZE
NSTEPS          EQU     32
ALL             EQU     3200                    TOTAL SIZE OF PROGRAM STORAGE SPACE
RANGE           EQU     X'B200'
MSDAT           EQU     X'B000'
STCNVT          EQU     X'B400'
```

```
TNRD      EQU    X'B600'           TONE DETECTOR READ ADDRESS
TNCLR     EQU    X'B800'           TONE DETECTOR CLEAR ADDRESS
*
*KEYBOARD ENCODING
STOP      EQU    8
RNPGM     EQU    1
GOTO      EQU    5
SETREF    EQU    2
TESTK     EQU    3
DELET     EQU    6
PRNT      EQU    7
PAUSE     EQU    21
MP        EQU    22
MPI       EQU    23
EOT       EQU    24
FLASH     EQU    25
SETIM     EQU    26
STDTE     EQU    27
STST      EQU    28
ASTSK     EQU    12
LB        EQU    20
NUMLO     EQU    9
NUMHI     EQU    20
************************************************
*
*
* RAM STORAGE DEFS
*
*
*
          ASEG
          PRINT ON
          ORG    4000H
          DS     255               RESERVED FOR STACK AREA
STACK     DS     1
TSTMD     DS     1                 INDICATES TEST MODE CRITICAL SEQUENCE
KEYBNC    DS     1                 KEYSTROKE DEBOUNCE STORAGE
KEYIN     DS     1                 KEYID STORAGE, IF MSB=1, UNINTERPRETED
*                                  BLOCKS RUNNING STOP, PRIORITY TEST, ETC
TIMER     DS     1
*                                  KEYSTROKE BEING BUFFERED
*
*         THE FOLLOWING ARE PACKED BCD TIME/DATE STORAGE
*
MSECS     DS     1
SECS      DS     1
MINS      DS     1
HRS       DS     1
DAYS      DS     1
MNTH      DS     1
YEAR      DS     1
*
*FOLLOWING ARE MISCELLANEOUS
UDATE     DS     1
PBUFF     DS     23                PRINTER BUFFER
BFPTR     DS     2                 BUFFER ENTRY POINTER
BFCNT     DS     1                 BUFFER CONTENTS COUNTER
STAT      DS     1
FLG1      DS     1
STPFG     DS     1                 STOP INDICATOR FLAG TO INTERRUPT LEVEL
TIMFLG    DS     1
*INTERVAL TIME TEST RUN DATA
```

```
****SET UP DATA FOR INTERVAL TEST
INACFG    DS    1           INTERVAL ACTIVE FLAG (I.E. SOMETHING
*                            ENTERED
STRTIM    DS    2           START TEST TIME (HRS,MINS)
INTVL     DS    2           INTERVAL (HRS,MINS)
NINTVL    DS    1           NUMBER OF INTERVALS (BCD)
****RUNNING DATA FOR INTERVAL TEST
INTST     DS    1           INTERVAL STARTED FLAG (FF=ACTIVE)
NTOGO     DS    1           NUMBER INTERVALS TO GO
NXTIM     DS    2           NEXT TIME TO RUN INTERVAL TEST (HR,MIN)
RUNINT    DS    1           RUN INTERVAL FLAG TO MAINLINE FF=ACTIVE
*
*
*PRIORITY TEST RUN DATA
RUNPR     DS    1           RUN PRIORITY TEST FLAG TO MAIN FF=ACTIV
PRACFG    DS    1           PRIORITY TEST ACTIVE FLAG (I.E. SOMETHG
*                            ENTERED
PRTIM     DS    2           PRIORITY TEST RUN TIME (HRS,MINS)
RESTIM    DS    1           RESPONSE TIME ACCUMULATOR
REFAIL    DS    1           REF. LEVEL FAILURE PRINT MESSAGE FLAG
MEMFLG    DS    1           FLAG INDICATING MEMORY FAILURE
SPCX      DS    10
PSPC      DS    3200        PROGRAM STORAGE SPACE
*
INTBLK    DS    100         COMMAND STORAGE
PRBLK     DS    100         COMMAND STORAGE
*
*
XXX       DS    1
XXX1      DS    1
RDNG      DS    3
*MATH PACKEAGE UTILITY STORAGE
AUGEND    DS    4
ADDEND    DS    4
ICAND     DS    4
IER       DS    4
PRODX     DS    1
PROD      DS    4
SRC1      DS    4
SRC2      DS    4
SUM       DS    4
SUM1      DS    4
LNFLG     DS    1
CALIBR    DS    4
TWNKL     DS    1           FLAG FOR POWER ON FLASH DISPLAY
TCNT      DS    1           COUNTER FOR CYCLE OF FLASH
REFLEV    DS    3           REFERENCE LEVEL FOR MPD TEST FAILURE
FAIL1     DS    2
FAIL2     DS    2
TTEST     DS    2
RETURN    DS    2
*
*NOTE THAT THE FOLLOWING ARE HELD INVIOLATE DURING SELFTEST
          ORG   RAMBG+RAMSZ-100
          END
*THIS IS RSEG MAIN
          ASEG
          GLOBAL
          ORG   0000
*TEMP FOR DEBUG PURPOSES
          DI
          LD    SP,STACK
          JP    PWRUP
```

```
            ORG     X'38'
IVCTR       EX      AF,AF'                  INTERRUPT SERVICE ENTRY
            EXX
            JP      ISR
            RSEG    MAIN                    THIS IS THE MAINLINE PROGRAM
PWRUP       LD      A,X'F8'
            LD      (HOOK),A                MAKE CERTAIN ON HOOK
            LD      A,X'FF'
            LD      (TONEP),A               NO OUTPUT TONE
            WRITE   BLANK
            CALL    MEMINI                  INITIALIZE MEMORY
            WRITE   PMSG0
            WRITE   PMSG                    POWERUP MESSAGE
            BLANK3
            JP      MAINL
PMSG0       DC      '       JANUS I       ',0
PMSG        DC      ' DIAL LINE ANALYZER ',0
MAINL       EI
            LD      SP,STACK                RE-INIT STACK
            LD      A,0
            LD      (STAT),A                INIT STATUS OF SYSTEM
            LD      (TSTMD),A               RESET TSTMODE FLAG
            LD      A,(RUNPR)               TIME TO RUN PRIORITY TESTS?
            CP      X'80'
            JP      NZ,MAINL1               IF NOT, TRY INTERVAL TESTS
            LD      A,0
            LD      (RUNPR),A
            WRITE   BLANK
            WRITE   BLANK
            WRITE   PRTMSG
            BLANK3
            LD      A,0
            LD      (FAIL1),A               ZERO SUMMARY REPORT DATA ACCUMULATORS
            LD      (FAIL1+1),A
            LD      (FAIL2),A
            LD      (FAIL2+1),A
            LD      (TTEST),A
            LD      (TTEST+1),A
            LD      HL,PRBLK
            CALL    TSSPY
            CALL    SUMRY
            BLANK3
MAINL1      LD      A,(RUNINT)
            CP      0
            JP      Z,MAINL2                NOT TIME TO RUN INTERVAL TESTS
            LD      A,0
            LD      (RUNINT),A              CLEAR FLAG
ISR10       LD      HL,INTVL+1              CALCULATE NEXT INTERVAL TIME
            LD      A,(MINS)
            ADD     A,(HL)
            DAA
            PUSH    AF
            SUB     X'60'
            DAA
            CCF
            JP      NC,ISR6                 ADD MODULO 60
            LD      B,A                     SAVE MODULO ADJUSTED RESULT
            POP     AF
            LD      A,B
            SCF                             SET CARRY FLAG
            PUSH    AF                      SAVE CARRY BIT ALSO
ISR6        POP     AF
```

```
                LD      (NXTIM+1),A         STORE UPDATED RESULT
                DEC     HL                  POINT TO INTERVAL HOURS
                LD      A,(HRS)
                ADC     A,(HL)              CARRY USED FOR MINUTES CARRY
                DAA
                PUSH    AF                  SAVE HOURS
                SUB     X'24'
                JP      C,ISR7              IF CARRY, THEN NO NEED TO MODULO ADJ
                POP     BC
                LD      B,0
                PUSH    BC
ISR7            POP     AF
                LD      (NXTIM),A
                WRITE   BLANK
                WRITE   BLANK
                WRITE   INTMSG
                BLANK3
                LD      HL,INTBLK
                LD      A,0
                LD      (FAIL1),A           ZERO SUMMARY REPORT DATA ACCUMULATORS
                LD      (FAIL1+1),A
                LD      (FAIL2),A
                LD      (FAIL2+1),A
                LD      (TTEST),A
                LD      (TTEST+1),A
                CALL    TSSPY
                CALL    SUMRY               PRINT SUMMARY OF TESTS RUN
                BLANK3
MAINL2          CALL    TIMDSP              UPDATE TIME OF DAY DISPLAY
*
*
* NOW SEE IF THERE IS A KEYSTROKE REQUESTING SOMETHING TO DO
*
                LD      A,(KEYIN)
                BIT     7,A
                JP      Z,MAINL             SEE IF ANY COMMAND IN
                CMND    TESTK,SYSTST
                CMND    RNPGM,PSTRT
                CMND    GOTO,TSTRT
                LD      A,0
                LD      (KEYIN),A           CLEAR INVALID INPUT
                JP      MAINL
INTMSG          DC      'RUN INTERVAL TESTS',0
PRTMSG          DC      'RUN PRIORITY TESTS',0
*
*
*TIME OF DAY DISPLAY UPDATE
*
*
TIMDSP          LD      A,(TWNKL)           SEE IF WE ARE FLASHING DISPLAY
                CP      0                   AFTER A POWER ON
                JP      NZ,TMDSP1           IF NOT, SKIP THIS SECTION
                LD      A,(TCNT)            CHECK COUNTRE TO SEE IF DISP ON OR OFF
                CP      0                   IF ZERO, RESET
                JP      NZ,TWNK1
                LD      A,CYCLE
                LD      (TCNT),A            RESET COUNTER
TWNK1           CP      CYCOFF              OFF TIME PORTION OF CYCLE
                PUSH    AF
                DEC     A                   UPDATE COUNTER
                LD      (TCNT),A
                POP     AF
```

```
              JP      NC,TMDSP1           IF NOT LESS THAN OFF CYCLE, DISPLAY
              CALL    CLEAR
              RET                         NOW BLANK DISPLAY
TMDSP1        LD      A,(SECS)            UPDATE TIME OF DAY DISPLAY
              LD      B,A
              LD      A,0
              CALL    BCDOT               UPDATE SECONDS
              LD      A,(MINS)
              LD      B,A
              LD      A,2
              CALL    BCDOT
              LD      A,(HRS)
              LD      B,A
              LD      A,4
              CALL    BCDOT
              RET
TSTRT         WCMND
              CP      ASTSK
              JP      Z,TSTR1
              CP      LB                  SEE IF RANGE REQUEST
              JP      Z,TSTR2
              CALL    BCDPR
              CALL    CALC                EXECUTE A SINGLE TEST
              RET
TSTR1         CALL    BEEP
              LD      A,0                 EXECUTE ALL TESTS IN PROGRAM SPACE
              LD      B,X'99'
              CALL    XRANGE
              RET
TSTR2         CALL    BEEP
              CALL    BCDPR               FETCH LO RANGE
              PUSH    AF
              CALL    BCDPR               FETCH HIGH RANGE
              LD      B,A
              POP     AF
              PUSH    AF
              SUB     B
              DAA
              JP      C,TSTR3
              WRITE   TSTMG
              POP     AF
              JP      TSTR2
TSTR3         POP     AF
              CALL    XRANGE
              RET
TSTMG         DC      'RANGE ERROR- RE-ENTER.',0

****************************************
*
* INTERRUPT SERVICE ROUTINE
*
*     7/18/81 DSC
*
****************************************
*
ISR           CALL    TIME                UPDATE TIMES
ISR1          CALL    KEYRD               SCAN INPUT KEYBOARD
              LD      A,(TIMFLG)          SEE IF TIME TO CHECK RUN TIMES FOR TEST
              CP      0
              JP      Z,ISR11
              LD      A,0
              LD      (TIMFLG),A          RESET TIMFLG
```

```
            CALL    TIMRUN
ISR11       LD      A,(TSTMD)
            CP      X'FF'
            JP      Z,ISRET
            LD      A,(STPFG)                STOP FLAG SET??
            CP      0
            JP      Z,ISRET
            PUSH    AF
            LD      A,0
            LD      (STPFG),A                CLEAR STOP FLAG
            POP     AF
            CP      X'88'
            JP      Z,ISR88                  PRIORITY TEST RUN STOP
            LD      A,(STAT)
            CP      1                        IF 1, THEN IN PGM MODE
            JP      Z,PGMSTP
ISR88       LD      HL,MAINL                 IF HERE, EITHER IN EXECUTE OR MAIN
            PUSH    HL                       SET RETURN TO MAIN
            LD      A,X'FF'
            LD      (TONEP),A                CLEAR TONES
            LD      A,X'F8'
            LD      (HOOK),A                 PUT BACK ON HOOK
            LD      A,0
            LD      (KEYIN),A
            JP      ISRET                    NEW RETURN ADDRESS
PGMSTP      LD      HL,PSTRT                 SET RETURN ADDRESS TO START OF PGM
            PUSH    HL                       MODE
            LD      A,0
            LD      (KEYIN),A
ISRET       EX      AF,AF'
            EXX
            EI
            RET
*
*
*THIS CHECKS IF ITS TIME TO RUN INTERVAL OR PRIORITY TESTS. IF SO, APPROPRIATE
*FLAG IS SET FOR MAINLINE INTERPRETATION
*
* FIRST CHECK FOR START OF PRIORITY TESTS
*
TIMRUN      LD      A,(TSTMD)                IF IN SELF TEST MODE, IGNORE TIME
            CP      X'FF'
            RET     Z
            LD      HL,HRS                   ADDRESS OF MINUTES
            LD      A,(PRTIM)
            CP      (HL)
            JP      NZ,ISR3                  IF NOT THE SAME, TRY INTERVAL
            DEC     HL
            LD      A,(PRTIM+1)              MINUTES OF PRTIME
            CP      (HL)
            JP      NZ,ISR3                  IF NOT EQUAL, TRY INTERVAL
            LD      A,(PRACFG)               ANY PRIORITY TEST ENTERED??
            CP      0
            JP      Z,ISR3                   IF NOT, SKIP AND TRY INTERVAL TESTS
            LD      A,X'80'
            LD      (RUNPR),A                SET RUN PRIORITY TEST FLAG
            LD      A,X'88'
            LD      (STPFG),A                SET STOP- WHATEVERS HAPPENING, ABORT!
ISR3        LD      A,(INACFG)
            CP      0
            RET     Z                        IF NO ACTIVE TESTS SEQ, SKIP
```

```
            LD      HL, HRS
            LD      A, (INTST)
            CP      0
            JP      NZ, ISR4            IF NOT ZERO, CHECK AGAINST NEXT INT.
            LD      A, (STRTM)          CHECK AGAINST START TIME FOR INTERVAL T
            CP      (HL)
            RET     NZ
            DEC     HL

LD      A, (STRTM+1)
            CP      (HL)
            RET     NZ
            LD      A, X'FF'
            LD      (RUNINT), A
            LD      (INTST), A          INTERVALS ARE STARTED
            LD      A, (NINTVL)         FETCH NUMBER INERVALS TO RUN
            DEC     A
            DAA
            LD      (NTOGO), A
            RET                         NEXT INTERVAL TIME CALC'D WHEN RUN
ISR4        LD      A, (NTOGO)
            CP      0
            JP      NZ, ISR5            IF NO MORE, THEN CLEAR THE DECKS
            LD      A, 0
            LD      (INTST), A          NO LONGER STARTED!
            RET
ISR5        LD      HL, HRS
            LD      A, (NXTIM)          NEXT INTERVAL START HJOURS
            CP      (HL)
            RET     NZ
            DEC     HL
            LD      A, (NXTIM+1)
            CP      (HL)
            RET     NZ                  IF NO RETURN, SET UP FOR INTERVAL
            LD      A, X'FF'
            LD      (RUNINT), A
            LD      A, (NTOGO)
            SUB     1
            DAA
            LD      (NTOGO), A
            RET

*           ENTRY:  FORTY MILLISECOND INTERRUPT
*           EXIT:   TIME/DATE UPDATED
*                   INTERNAL TIMER DECREMENTED TO ZERO
*                   KEYBOARD SCANNED
*                   CHECK FOR TIME TO RUN TEST
*
*********************************************
*
*   SUB TO DECIMALLY INCREMENT
*           ENTRY:  A=BCD DIGIT PAIR
*                   B=MODULO
*           EXIT:   A INCREMENTED MODULO-B
*
INCR        ADD     A, 1                NOTE FIRST CALL MUST CLEAR CARRY!
            DAA
            LD      C, A
            SUB     B                   COMPARE TO MODULO
            DAA
            JR      C, INC1
```

```
            LD      A,0
            RET
INC1        LD      A,C
            RET
*
*
*
TIME        LD      A,(TIMER)           UPDATE INTERNAL TIMER
            CP      0
            JP      Z,TIMEX
            DEC     A
            LD      (TIMER),A
TIMEX       LD      A,(MSECS)           SEE IF A SEC. IS REACHED
            INC     A
            CP      25                  25*40MSEC=1SEC
            LD      (MSECS),A
            RET     NZ                  NOTHING TO UPDATE IF NO SEC.
            LD      A,(RESTIM)
            INC     A
            DAA                         DECIMALLY INCREMENT
            LD      (RESTIM),A          INCREMENT RESPONSE TIME
            LD      A,0
            LD      (MSECS),A
            NUMCHK  SECS,X'60'
            LD      A,X'FF'             THIS MEANS A MINUTE HAS CHANGED
            LD      (TIMFLG),A          SET TIME FLAG FOR TEST TIME CHECK
            NUMCHK  MINS,X'60'
            NUMCHK  HRS,X'24'           IF HERE, THEN DAY IS CHANGED. # IN M
            LD      A,(MNTH)            FETCH THE MONTH
            AND     X'F0'               MASK UPPER DIGIT
            SUB     X'80'
            DAA
            RRCA                        DIGIT*8
            LD      B,A
            RRCA
            RRCA                        DIGIT*2
            ADD     A,B                 DIGIT*10
            LD      B,A
            LD      A,(MNTH)
            AND     X'0F'
            ADD     A,B                 BINARY MONTH NOW...
            LD      HL,MNTLST           LIST OF DAYS IN MONTH
            LD      A,E
            LD      D,0
            ADD     HL,DE
            LD      A,(HL)              FETCH NO. DAYS IN THIS MONTH.
            LD      B,A                 THIS IS THE MODULO
            LD      A,(DAYS)
            CALL    INCR
            LD      (DAYS),A
            RET     C
            INC     A
            LD      (DAYS),A            NO DAYS=0, DUMMY
            NUMCHK  MNTH,X'12'
            LD      A,(MNTH)            NOR IS THERE A MONTH 0
            INC     A
            DAA
            LD      (MNTH),A
            NUMCHK  YEAR,X'99'
            RET
MNTLST      DC      X'31',X'28',X'31',X'30',X'31',X'30',X'31',X'31',X'30',X'31'
            DC      X'30',X'31'
```

```
MEMINI   LD    HL,RAMBG+257      START OF RAM
         LD    DE,RAMBG+258      CLEAR MEMORY- INITIALIZE AT ZERO
         LD    BC,RAMSZ           ENOUGH TO CLEAR FOR FLAG USE.
         LD    A,0
         LD    (HL),A
         LDIR                    CLEAR MEMORY.
         LD    A,X'C2'           INIT REFERENCE LEVEL TO -99.99 DB
         LD    (REFLEV),A
         LD    A,X'99'
         LD    (REFLEV+1),A
         LD    (REFLEV+2),A
         RET
*
*
*SUB TO REPORT SUMMARY OF FAILURES
*
SUMRY    BLANK3
         WRITE INTV1
         WRITE INTV2
         WRITE BLANK
         CALL  CLRBF
         LD    HL,INTV4
         CALL  XFER
         LD    HL,PBUFF+19
         LD    A,(TTEST)
         CALL  ASCOT
         LD    A,(TTEST+1)
         LD    HL,PBUFF+17
         CALL  ASCOT
         LD    A,(PBUFF+17)
         CP    X'30'
         JP    NZ,SUMX1
         LD    A,X'20'
         LD    (PBUFF+17),A      LEADING ZERO SUPPRESSION
SUMX1    LD    HL,PBUFF
         CALL  PLINE
         WRITE BLANK
         WRITE INTV6
         WRITE INTV3
         CALL  CLRBF
         LD    HL,INTV5
         CALL  XFER
         LD    A,(FAIL1)         LEVEL FAILURES
         LD    HL,PBUFF+3
         CALL  ASCOT
         LD    A,(FAIL1+1)
         LD    HL,PBUFF+1
         CALL  ASCOT
         LD    A,(PBUFF+1)
         CP    X'30'
         JP    NZ,SUMX2
         LD    A,X'20'
         LD    (PBUFF+1),A
SUMX2    LD    HL,PBUFF+16
         LD    A,(FAIL2)         NO RESPONSE FAILURES
         CALL  ASCOT
         LD    A,(FAIL2+1)
         LD    HL,PBUFF+14
         CALL  ASCOT
         LD    A,(PBUFF+14)
         CP    X'30'
         JP    NZ,SUMX3
```

```
            LD      A,X'20'
            LD      (PBUFF+14),A
SUMX3       LD      HL,PBUFF
            CALL    PLINE
            WRITE   BLANK
            WRITE   INTV1
            RET
INTV1       DC      '*******************',0
INTV2       DC      '    SUMMARY REPORT',0
INTV3       DC      'LOW LEVEL   NO ANSWER',0
INTV4       DC      'TOT. LINES TESTED:    ',0
INTV5       DC      '                      ',0
INTV6       DC      '   FAILURE SUMMARY',0
*FOUR DIGIT LEADING ZERO SUPPRESSSION
            END
            RSEG    MATH
            GLOBAL
*
*
*
*LINEAR APPROXIMATION- INPUT READING TO DECIBEL, RESULT IN 'SUM'
*   ENTRY:
*           A=LEVEL FROM MEASUREMENT UNIT
*           B=RANGE FROM MEASUREMENT UNIT
*   EXIT:
*           SUM=FLOATING POINT VALUE OF READING IN DB
*
*           CALCULATES Y(IN DB)=M*(LEVEL)+B
*           LINEAR APPROXIMATION COEFFICIENTS M AND B ARE GOTEN FROM A TABLE
*           WHICH IS FOUND BY USE OF (RANGE)*2 AS AN OFFSET TO A TABLE ADDRESS
*           CONTAINING THE ADDRESSES OF THE APPROPRIATE TABLE OF M'S AND B'S
*           FOR EACH RANGE. TWO STEP IS SO THAT EACH TABLE NEED NOT HAVE
*           SAME NUMBER OF ENTRIES.
*           FINAL TABLE IS IN THE FOLLOWING FORMAT:
*               (MAX VALUE)   THE HIGHEST (LEVEL) FOR WHICH THE M AND B WHICH
*                             FOLLOW ARE TO BE USED AS AN APPROXIMATION
*               (M)           IN FLOATING POINT FORMAT (SEE BELOW)
*               (B)           IN FLOATING POINT FORMAT
*
*FLOATING POINT FORMAT:
*           EACH FLOATING POINT NUMBER IS REPRESENTED BY THREE BYTES, AS FOLLOWS
*               FIRST BYTE: BIT 7 IS SIGN BIT OF MANTISSA, 1=NEGATIVE
*                           REMAINING BITS ARE EXCESS 64 EXPONENT.
*                           THUS, ANYTHING IN EXCESS OF 64 REPRESENTS A
*                           POSITIVE EXPONENT (OF TEN!!!) AND ANYTHING LESS
*                           THAN 64 IS A NEGATIVE EXPONENT.
*               SECOND AND
*               THIRD BYTES A FOUR DIGIT BCD MANTISSA.
*
*           FOR EXAMPLE: (10111111) (12) (34) (FIRST BYTE SHOWN BINARY)
*           WOULD BE   -0.01234 (THE MANTISSA IS ASSUMED TO HAVE A DECIMAL
*                      POINT BEFORE IT) HERE THE MSB 1 INDICATES A NEGATIVE
*                      MANTISSA, AND THE EXPONENT (63 IN DECIMAL) INDICATES A
*                      MINUS ONE.
*
*
SLOFF       DC      B(RANGE0),B(RANGE1),B(RANGE2),B(RANGE3)
RANGE0      DC      57,64,X'19',X'00'
            DC      194,X'10',X'86'
            DC      93,64,X'11',X'11'
            DC      193,X'63',X'30'
            DC      255,63,X'85',X'70'
```

|  | DC | 193,X'39',X'70' | |
|---|---|---|---|
| RANGE1 | DC | 41,64,X'25',X'00' | |
|  | DC | 194,X'23',X'25' | |
|  | DC | 53,64,X'16',X'60' | |
|  | DC | 194,X'19',X'80' | |
|  | DC | 71,64,X'15',X'40' | |
|  | DC | 194,X'19',X'32' | |
|  | DC | 255,64,X'10',X'00' | |
|  | DC | 194,X'15',X'50' | |
| RANGE2 | DC | 44,64,X'22',X'20' | |
|  | DC | 194,X'31',X'78' | |
|  | DC | 56,64,X'16',X'60' | |
|  | DC | 194,X'29',X'33' | |
|  | DC | 80,64,X'12',X'50' | |
|  | DC | 194,X'27',X'00' | |
|  | DC | 255,64,X'20',X'00' | |
|  | DC | 194,X'25',X'00' | |
| RANGE3 | DC | 19,64,X'63',X'60' | |
|  | DC | 194,X'50',X'00' | |
|  | DC | 36,64,X'29',X'00' | |
|  | DC | 194,X'43',X'59' | |
|  | DC | 58,64,X'18',X'00' | |
|  | DC | 194,X'39',X'50' | |
|  | DC | 255,64,X'12',X'00' | |
|  | DC | 194,X'35',X'96' | |
| LINAPX | PUSH | AF | SAVE READING LEVEL |
|  | LD | HL,SLOFF | CALCULATE ADDRESS OF SLOPE/OFFSET |
|  | LD | E,B | THIS CALCULATES START OF APPROPRIATE |
|  | LD | D,0 | TABLE ENTRIES FOR THIS RANGE |
|  | ADD | HL,DE | NOTE EACH ENTRY IS TWO BYTES |
|  | ADD | HL,DE | |
|  | LD | E,(HL) | FETCH LOWER BYTE ADDRESS |
|  | INC | HL | |
|  | LD | D,(HL) | FETCH UPPER BYTRE ADDRESS |
|  | PUSH | DE | ADDRESS TO HL |
|  | POP | HL | |
|  | LD | DE,7 | ENTRY OFFSET IN TABLE |
|  | POP | AF | FETCH BACK THE LEVEL TO CHECK IF WE |
|  | LD | B,A | ARE IN THE RIGHT RANGE OF APPROXIMATION |
| LIN1 | LD | A,(HL) | FUNCTION |
|  | CP | B | IS LEVEL BEYOND MAX RANGE OF FUNCTION? |
|  | JP | NC,FND | IF NO CARRY, HL POINTS TO M AND B |
|  | ADD | HL,DE | IF NOT, ADD ENTRY OFFSET |
|  | JP | LIN1 | |
| FND | INC | HL | POINT TO LSB (EXPONENT) OF M |
|  | PUSH | HL | SAVE ADDRESS OF M |
|  | LD | A,B | FETCH LEVEL |
|  | CALL | B2BCD | CONVERT LEVEL INTO FLOATING POINT. |
|  | LD | DE,RDNG | RDNG=ADDRESS OF FP LEVEL |
|  | POP | HL | ADDRESS OF M |
|  | PUSH | HL | SAVE ADDRESS |
|  | CALL | MULT | CALCULATE M*(LEVEL) |
|  | POP | HL | |
|  | INC | HL | |
|  | INC | HL | |
|  | INC | HL | POINT TO FIRST BYTE OF B |
|  | LD | DE,PRODX | ADDRESS OF M*(LEVEL) |
|  | CALL | ADD | |
|  | RET |  | RESULT IS IN SUM |

```
*
*FLOATING POINT NUMERAL FORMAT:
*       EACH NUMBER IS REPRESENTED BY THREE BYTES, IN ORDER:
```

```
*          EXPONENT BYTE: MSB IS SIGN OF MANTISSA, REMAINDER IS EXPONENT
*                                    IN OFFSET 64 NOTATION
*                                    EG. 64=0, 63=-1, ETC.
*          MANTISSA :   TWO BYTES, SIGNED MAGNITUDE IN BCD
*                       MSDIGITS FIRST, THEN LSDIGITS
*
***********************************************
*
* FLOATING POINT MATH SUBS
* BCD ARITHMETIC, GEN'LY
* 9/28/81 DSC
*
*
*
*
*SHIFT     LEFT BCD BYTE PAIR
*          ENTRY:HL POINTS TO MSD OF 4(OR 2) BYTE BCD PAIR
*          EXIT: A=LEFT SHIFTED DIGIT,
*                FOUR DIGITS SHIFTED LEFT IN PLACE
*
SHFLF2     INC     HL
           LD      A,0
           CALL    LEFT
           CALL    LEFT
           INC     HL
           RET
SHFLF4     INC     HL
           INC     HL
           INC     HL                      POINT TO LSDIGIT
           LD      A,0
           CALL    LEFT
           CALL    LEFT
           CALL    LEFT
           CALL    LEFT
           INC     HL
           RET
LEFT       AND     X'0F'
           LD      B,A
           LD      A,(HL)
           RRC     A
           RRC     A
           RRC     A
           RRC     A
           AND     X'0F'                   THIS WILL BE THE CARRY OUT
           PUSH    AF
           LD      A,(HL)
           RLCA
           RLCA
           RLCA
           RLCA
           AND     X'F0'
           OR      B
           LD      (HL),A                  STORE RESULT
           POP     AF                      THIS IS THE CARRY OUT
           DEC     HL
           RET
*
*
*
*SHIFT RIGHT 2- SAME AS ABOVE
*
SHFRT      LD      A,(HL)
           RLA
           RLA
           RLA
```

```
            RLA
            AND     X'F0'
            LD      B,A
            LD      A,(HL)
            SRA     A
            SRA     A
            SRA     A
            SRA     A
            AND     X'0F'
            LD      (HL),A
            INC     HL
            LD      A,(HL)
            SRA     A
            SRA     A
            SRA     A
            SRA     A
            AND     X'0F'
            OR      B
            PUSH    AF
            LD      A,(HL)
            AND     X'0F'
            LD      B,A
            POP     AF
            LD      (HL),A
            LD      A,B
            RET
*
*
*BCD ADD
*       ENTRY: DE=(ADDEND) THE NUMBER TO ADD TO THE AUGEND
*              HL=(AUGEND) THE THING THAT IS ADDED TO
*       POINTER IS TO MSDIGIT
*       ALWAYS TWO BYTE ADD
*       A CONTAINS ANY CARRY DIGIT
*
BCDADD      INC     HL
            INC     DE
            LD      A,(DE)
            ADD     A,(HL)
            DAA
            LD      (HL),A
            DEC     HL
            DEC     DE
            LD      A,(DE)
            ADC     A,(HL)
            DAA
            LD      (HL),A
            RET     NC
            LD      A,1
            RET
*
*
*THIS ADDS AS ABOVE, BUT WITH 4 BYTES
*       ENTRY: HL TO MSDIGIT
*              DE TO MSDIGIT, ADDEND
*
PLUS4       INC     HL
            INC     HL
            INC     DE              POINT TO 3RD MSD
            INC     DE
            CALL    BCDADD
            DEC     DE
            DEC     HL
```

```
            LD      A,(DE)
            ADC     A,(HL)
            DAA
            LD      (HL),A
            DEC     HL
            DEC     DE
            LD      A,(DE)
            ADC     A,(HL)
            DAA
            LD      (HL),A
            RET     NC
            LD      A,1
            RET
*
*
*MULTIPLY
*           MULTIPLY DE*HL
*           RESULT TO PROD
*           FORMAT: 3 BYTES PER NUMBER, EXPONENT, MANTISSA(2)
MULT        LD      A,0
            PUSH    HL
            PUSH    DE
            LD      HL,ICAND
            LD      DE,ICAND+1
            LD      BC,11                   CLEAR WORK SPACE
            LD      (HL),A
            LDIR
            POP     DE                      NOW LOAD OPERANDS TO ICAND AND IER
            INC     DE                      POINT TO MANTISSA
            LD      A,(DE)                  FETCH MSD
            LD      (ICAND+2),A
            INC     DE
            LD      A,(DE)
            LD      (ICAND+3),A
            POP     HL
            INC     HL                      POINTER TO MANTISSA
            LD      A,(HL)
            LD      (IER+2),A
            INC     HL
            LD      A,(HL)
            LD      (IER+3),A
            DEC     DE
            DEC     DE
            DEC     HL
            DEC     HL
            PUSH    HL
            PUSH    DE
            LD      B,4                     IER NIBBLE COUNT
            PUSH    BC
MULT4       LD      HL,IER+2                NOW DO SHIFT AND ADD STUFF TO MULTIPLY
            CALL    SHFRT
MULT1       CP      0
            JP      Z,MULT2
            PUSH    AF
            LD      HL,PROD
            LD      DE,ICAND
            CALL    PLUS4
            POP     AF
            DEC     A
            JP      MULT1
MULT2       POP     BC
            DEC     B
```

```
              JP      Z,MULT3
              PUSH    BC
              LD      HL,ICAND
              CALL    SHFLF4
              JP      MULT4
*
*
*NOW ADJUST THE EXPONENT AND DETERMINE SIGN OF RESULT
MULT3         POP     DE              FETCH BACK THE OPERAND POINTERS
              POP     HL
              LD      A,(DE)          FETCH EXPONENT
              AND     X'7F'           WE ADD EXPONENTS, CORRECTING FOR
              LD      B,A             EXCESS 64 OFFSET.
              LD      A,(HL)
              AND     X'7F'
              ADD     A,B             A=NEW EXPONENT+64
              SUB     64              SUBTRACT THE OFFSET TO CORRECT
              LD      B,A             CALCULATE NEW EXPONENT
              PUSH    DE              SAVE SOURCE POINTERS
              PUSH    HL
              LD      C,8
ADD6          LD      A,(PROD)        NOW LEFT JUSTIFY RESULT AND CORRECT
              AND     X'F0'           EXPONENT
              JP      NZ,ADD5
              DEC     B
              LD      HL,PROD
              PUSH    BC
              CALL    SHFLF4          WE'RE ADJUSTING THE PRODUCT
              POP     BC
              DEC     C
              JP      Z,ADD5
              JP      ADD6
ADD5          POP     HL              COMPARES SIGNS OF OPERANDS. IF
              POP     DE              DIFFERENT, RESULT IS NEG.
              LD      A,(DE)          IF SAME, POSITIVE
              AND     X'80'
              LD      C,A
              LD      A,(HL)
              AND     X'80'
              CP      C
              JP      Z,POS
              LD      A,B
              OR      X'80'           RESULT IS NEG
              LD      (PRODX),A
              RET
POS           LD      A,B
              LD      (PRODX),A       RESULT IS POSITIVE
              RET
*
*
*
*FLOATING SUB
*       ENTRY:(DE)=SUBTRAHEND
*             (HL)=MINUEND
*       EXIT: (SUM)=DIFFERENCE
FSUB          PUSH    HL
              PUSH    DE
              POP     HL
              LD      A,(HL)
              CPL
              AND     X'80'           COMPLEMENT SIGN
```

```
            LD      B,A
            LD      A,(HL)
            AND     X'7F'
            OR      B
            LD      (IER),A
            LD      DE,IER+1
            LD      BC,2
            JP      ADD1
*ADD (FLOATING POINT)
*       ENTRY: (DE)=ADDEND
*              (HL)=AUGEND EACH TO EXPONENT
*       EXIT:  RESULT IN (SUM)
ADD         PUSH    HL                      SAVE POINTER
            PUSH    DE
            POP     HL
            LD      DE,IER
            LD      BC,3
ADD1        LDIR                            PUT ADDEND INTO (IER)
            POP     HL
            LD      DE,ICAND
            LD      BC,3
            LDIR                            PUT AUGEND INTO (ICAND)
ADD4        LD      A,(IER)                 NOW EQUALIZE EXPONENTS
            AND     X'7F'
            LD      B,A
            LD      A,(ICAND)
            AND     X'7F'
            CP      B                       EXPONENTS EQUAL?
            JP      Z,ADD2
            JP      C,ADD3
            LD      A,(IER)                 IF HERE, IER<ICAND
            INC     A
            LD      (IER),A
            LD      HL,IER+1                NOW SHIFT MANTISSA
            CALL    SHFRT
            JP      ADD4
ADD3        LD      A,(ICAND)               IF HERE, ICAND<IER
            INC     A
            LD      (ICAND),A
            LD      HL,ICAND+1
            CALL    SHFRT
            JP      ADD4
ADD2        LD      A,(ICAND)
            AND     X'80'
            LD      B,A                     NOW SEE IF WE ADD OR SUBTRACT
            LD      A,(IER)
            AND     X'80'
            CP      B                       IF SIGNS SAME, WE JUST ADD
            JP      NZ,SUBT                 IF SIGNS DIFFERENT, WE SUBTRACT
            LD      HL,ICAND+2
            LD      DE,IER+2
            LD      BC,SUM+2
            LD      A,(DE)
            ADD     A,(HL)
            DAA
            LD      (BC),A
            DEC     BC
            DEC     DE
            DEC     HL
            LD      A,(DE)
            ADC     A,(HL)
            DAA
            LD      (BC),A
```

|       |       |            |                                    |
|-------|-------|------------|------------------------------------|
|       | JP    | NC, ADD7   | CARRY MEANS EXTRA DIGIT OUT        |
|       | LD    | HL, SUM+1  |                                    |
|       | CALL  | SHFRT      |                                    |
|       | LD    | A, (SUM+1) |                                    |
|       | OR    | X'10'      |                                    |
|       | LD    | (SUM+1), A |                                    |
|       | LD    | A, (IER)   | INCREASE EXPONENT                  |
|       | INC   | A          |                                    |
|       | LD    | (SUM), A   |                                    |
|       | JP    | JUST       |                                    |
| ADD7  | LD    | A, (IER)   | EXPONENTS MUST BE SAME, AND SO SIGN |
|       | LD    | (SUM), A   |                                    |
| JUST  | LD    | C, 4       | MAX NUMBER OF LEFT SHIFTS TO JUSTIFY |
| JUST1 | LD    | A, (SUM+1) |                                    |
|       | AND   | X'F0'      | LEFT JUSTIFY RESULT                |
|       | RET   | NZ         | IF NOT ZERO, WE'RE LEFT JUSTIFIED  |
|       | LD    | A, (SUM)   |                                    |
|       | DEC   | A          |                                    |
|       | LD    | (SUM), A   |                                    |
|       | LD    | HL, SUM+1  |                                    |
|       | PUSH  | BC         |                                    |
|       | CALL  | SHFLF2     |                                    |
|       | POP   | BC         |                                    |
|       | DEC   | C          |                                    |
|       | RET   | Z          |                                    |
|       | JP    | JUST1      |                                    |
|       | RET   |            |                                    |
| SUBT  | LD    | A, (IER)   |                                    |
|       | AND   | X'80'      |                                    |
|       | JP    | Z, SUBT1   | PUT THE NEGATIVE MANTISSA TO HL.   |
|       | LD    | HL, IER+2  |                                    |
|       | LD    | DE, ICAND+2 |                                   |
|       | JP    | SUBT3      |                                    |
| SUBT1 | LD    | HL, ICAND+2 |                                   |
|       | LD    | DE, IER+2  |                                    |
| SUBT3 | LD    | BC, SUM+2  |                                    |
|       | LD    | A, (ICAND) |                                    |
|       | AND   | X'7F'      | ASSUME POSITIVE RESULT             |
|       | LD    | (SUM), A   |                                    |
| SUBT4 | LD    | A, (DE)    |                                    |
|       | SUB   | (HL)       |                                    |
|       | DAA   |            |                                    |
|       | LD    | (BC), A    |                                    |
|       | DEC   | BC         |                                    |
|       | DEC   | HL         |                                    |
|       | DEC   | DE         |                                    |
|       | LD    | A, (DE)    |                                    |
|       | SBC   | A, (HL)    |                                    |
|       | DAA   |            |                                    |
|       | LD    | (BC), A    |                                    |
|       | JP    | NC, JUST   | IF CARRY, OUR RESULT IS NEGATIVE   |
|       | LD    | A, (SUM)   | THEREFORE, SET SIGN NEGATIVE       |
|       | OR    | X'80'      | AND SUBTRACT OTHER WAY             |
|       | LD    | (SUM), A   |                                    |
|       | INC   | HL         |                                    |
|       | INC   | DE         |                                    |
|       | PUSH  | HL         |                                    |
|       | PUSH  | DE         |                                    |
|       | POP   | HL         |                                    |
|       | POP   | DE         |                                    |
|       | INC   | BC         |                                    |
|       | JP    | SUBT4      |                                    |

```
*
*
*BIN TO BCD
*         ENTRY:A=BINARY BYTE
*         EXIT: RDNG IS THREE BYTE FLOATING POINT CONVERSION
B2BCD    LD    HL,0
         LD    DE,X'100'
         LD    B,100
         CALL  JIM
         LD    DE,X'10'
         LD    B,10
         CALL  JIM
         OR    L
         LD    (RDNG+2),A
         LD    A,H
         LD    (RDNG+1),A
         LD    A,68
         LD    (RDNG),A              INITIAL EXPONENT
         LD    B,4
BCJS     LD    A,(RDNG+1)
         AND   X'F0'
         RET   NZ
         LD    A,(RDNG)
         DEC   A
         LD    (RDNG),A
         LD    HL,RDNG+1
         PUSH  BC
         CALL  SHFLF2
         POP   BC
         DEC   B
         RET   Z
         JP    BCJS
JIM      SUB   B
         JP    C,EXIT
         ADD   HL,DE
         JP    JIM
EXIT     ADD   A,B
         RET
*
*
*
*THIS IS TO FORMAT A FLOATING POINT NUMBER OUT IN ASCII, IN THE FOLLOWING
*FORMAT:<+ OR ->##.#, WITH LEADING ZERO SUPPRESSION. NUMBERS WHICH ARE TO
*FOR THIS FORMAT ARE DISPLAYED AS ZERO, TOO HIGH ARE DISPLAYED AS 99.99
*
*
*ENTRY: HL=POINTER TO LOCATION OF PRINTER BUFFER WHERE DATA IS TO BEGIN
*      DE=POINTER TO LOCATION OF DATA TO BE PRINTED.
*EXIT: DATA IS IN PRINTER BUFFER AS DIRTECTED
*      NOTE: SOURCE DATA MAY BE MODIFIED
*
PTDB     PUSH  HL
         PUSH  DE                    SAVE POINTERS
         POP   HL
         LD    DE,IER
         LD    BC,3
         LDIR
         LD    HL,IER
         PUSH  HL                    DATA GOES TO LOCATION IER
PTDB3    POP   HL
         PUSH  HL                    FETCH DATA POINTER
         LD    A,(HL)                NORMALIZE EXPONENT TO PRINT FORMAT
         AND   X'7F'                 IGNORE SIGN
```

```
                CP      66
                JP      NC,PTDB1         IF =66, THEN OK TO PRINT AS IS
PTDB2           LD      A,(HL)           IF HERE, THEN EXPONENT TOO LOW
                INC     A
                LD      (HL),A
                INC     HL
                CALL    SHFRT
                JP      PTDB3
PTDB1           POP     HL               FETCH DATA POINTER
                LD      A,(HL)           IS IT POS OR NEG?
                AND     X'80'
                JP      NZ,PTDB5         NOT ZERO, THEN NEG
                LD      A,'+'
                JP      PTDB6
PTDB5           LD      A,'-'
PTDB6           POP     DE               FETCH DATA DESTINATION POINTER
                LD      (DE),A           STORE SIGN CHARACTER
                INC     DE
                INC     HL
                LD      A,(HL)           FETCH A BYTE OF DATA
                PUSH    HL               SAVE DATA SOURCE POINTER
                PUSH    DE               SAAVE DESTINATION POINTER
                PUSH    DE               COPY DESTINATION POINMTER TO HL
                POP     HL               DESTINATION POINTER TO HL
                CALL    ASCOT            ASCII DATA OUT
                POP     DE               FETCH DESTINATION POINTER
                LD      A,(DE)           IS LEADING DIGIT A ZERO?
                CP      '0'
                JP      NZ,PTDB9
                LD      A,' '
                LD      (DE),A           BLANK OUT LEADSING ZERO
PTDB9           INC     DE
                INC     DE               POINTER TO DECIMAL POINT LOCZTION
                LD      A,'.'
                LD      (DE),A
                POP     HL               FETCH SOURCE DATA POINTER
                INC     HL
                LD      A,(HL)           LAST TWO DIGITS DATA
                PUSH    DE               COPY DESTINATION TO HL
                POP     HL
                INC     HL
                RRA
                RRA
                RRA
                RRA
                AND     X'0F'
                ADD     A,X'30'
                LD      (HL),A
                RET
                END
                RSEG    PGM1
                GLOBAL
****
*
*PRINT THE TEST TIMES SEQUENCES
*       CAUSES EITHER PRIORITY TEST SEQUENCE OR INTERVSAL TEST SEQUENCE DATA
* TO TBE PRINTED.
TTIMP           CALL    BEEP
                CLRKEY                   CLEAR KEYBOARD ENTRY
                WCMND                    WAIT FOR ENTRY
                LD      A,(KEYIN)
                AND     X'3F'
                CP      9                IF KEY=1,THEN PRINT PRIORITY
                JP      Z,TT1            IF (1), PRINT INTERVAL SEQ.
```

```
                CP      16
                JP      Z,T66
                WRITE   ERMX            0= PRIORITY, 1=INTERVAL
                JP      TTIMP
ERMX            DC      'ENTER 0 OR 1',0
T66             CALL    BEEP
                WRITE   BLANK           BLANK LINE
                WRITE   XXXL
                WRITE   BLANK
                WRITE   ZZ1             HEADER LINE FOR PRIORITY SEQUENCE
                LD      A,(PRACFG)
                CP      0
                JP      NZ,T67
                WRITE   ZZ40
                BLANK3
                WRITE   BLANK
                RET
T67             CALL    CLRBF
                LD      HL,ZZ2
                CALL    XFER
                LD      A,(PRTIM)       PRINT OUT START TIME
                LD      HL,PBUFF+11
                CALL    ASCOT
                LD      A,(PRTIM+1)
                LD      HL,PBUFF+14
                CALL    ASCOT
                LD      HL,PBUFF
                CALL    PLINE
                LD      HL,PRBLK        ADDRESS OF BLOCK TO PRINT
                JP      TT2
TT1             CALL    BEEP
                WRITE   BLANK           PRINT SEPARATOR SYMBOL LINE
                WRITE   XXXL
                WRITE   BLANK
                WRITE   ZZ3             HEADER LINE FOR INTERVAL SEQUENCE
                LD      A,(INACFG)      ANYTHING TOPRINT?
                CP      0
                JP      NZ,TT99
                WRITE   ZZ40
                BLANK3
                WRITE   BLANK
                RET
TT99            CALL    CLRBF
                LD      HL,ZZ4
                CALL    XFER
                LD      A,(STRTM)       PRINT START UP TIME
                LD      HL,PBUFF+9
                CALL    ASCOT
                LD      A,(STRTM+1)
                LD      HL,PBUFF+12
                CALL    ASCOT
                LD      HL,PBUFF
                CALL    PLINE
                CALL    CLRBF
                LD      HL,ZZ5
                CALL    XFER
                LD      A,(INTVL)       PRINT INTERVAL TO RUN AT
                LD      HL,PBUFF+6
                CALL    ASCOT
                LD      A,(INTVL+1)
                LD      HL,PBUFF+13
                CALL    ASCOT
                LD      HL,PBUFF
                CALL    PLINE
                CALL    CLRBF
```

```
                LD      HL,ZZ6
                CALL    XFER
                LD      A,(NINTVL)              PRINT NUMBER OF INTERVALS TO RUN
                LD      HL,PBUFF+8
                CALL    ASCOT
                LD      HL,PBUFF
                CALL    PLINE
                LD      HL,INTBLK
*
*
*THIS PRINTS OUT THE BLOCK OF PROGRAMS TO RUN AT A TEST TIME
*
* ENTRY: HL= BLOCK ADDRESS
*
TT2             LD      B,0
                WRITE   BLANK
                WRITE   TS30
TTT1            LD      A,(HL)
                CP      ASTSK                   IF ASTERISK, PRINT
                JP      NZ,TT3
                CALL    BEEP
                PUSH    BC
                PUSH    HL
                WRITE   TS22                    PRINT 00-99
                POP     HL
                INC     HL
                POP     BC
                INC     B                       ONE CHARACTER DECIPHERED
                JP      TTEX
TT3             CP      LB                      IF POUND, ITS A RANGE
                JP      NZ,TT4
                CALL    BEEP
                PUSH    BC
                PUSH    HL
                CALL    CLRBF
                LD      HL,TS20
                CALL    XFER
                POP     HL
                INC     HL                      GO AROUND POUND SIGN
                LD      A,(HL)
                INC     HL
                PUSH    HL
                LD      HL,PBUFF
                CALL    ASCOT
                POP     HL
                LD      A,(HL)
                INC     HL
                PUSH    HL
                LD      HL,PBUFF+8
                CALL    ASCOT
                LD      HL,PBUFF
                CALL    PLINE
                POP     HL
                POP     BC
                LD      A,B                     5 CHARS DECIPHERED
                ADD     A,5
                LD      B,A
                JP      TTEX
TT4             CP      EOT                     END OF TEST?
                JP      NZ,TT5
TTX             WRITE   ZZ7
                WRITE   BLANK
                WRITE   XXXL
```

```
          BLANK3
          RET
TT5       PUSH    BC
          PUSH    HL
          CALL    CLRBF
          LD      HL,TS21            BLANK LINE
          CALL    XFER
          POP     HL
          LD      A,(HL)
          INC     HL
          PUSH    HL
          LD      HL,PBUFF
          CALL    ASCOT
          LD      HL,PBUFF
          CALL    PLINE
          POP     HL
          POP     BC
          INC     B                  ONE CHAR DECIPHERED
TTEX      LD      A,B
          CP      0
          JP      Z,TTX              IF ZERO, SOMNETHING WRONG
          JP      TTT1
ZZ1       DC      '   PRIORITY TESTS',0
ZZ2       DC      'EXECUTE AT    :   ',0
ZZ3       DC      '   INTERVAL TESTS',0
ZZ4       DC      'START AT   :   , RUN',0
ZZ5       DC      'EVERY:   HRS.   MINS.',0
ZZ6       DC      'EXECUTE     TIMES.',0
ZZ7       DC      'END OF TEST.',0
TS30      DC      '    TEST SEQUENCE    ',0
ZZ40      DC      'NO SEQUENCE ENTERED.',0

*
*THIS IS THE ENTER THE TEST TIMES ROUTINE
*
*
TMNTRY    WCMND                      IF 0, SET PRIORITY
          CP      9                  IF 1, SET INTERVAL
          JP      Z,INVSET           INTVL
          CP      16
          JP      Z,PRSET
          WRITE   TS1
          WRITE   TS2
          WRITE   TS3
          CLRKEY
          JP      TMNTRY
INVSET    CALL    BEEP
          LD      HL,INACFG
          LD      DE,INACFG+1
          LD      BC,10
          LD      A,0
          LD      (HL),A
          LDIR                       CLEAR INTERVAL TEST SET UP DATA'
          WRITE   BLANK
          WRITE   ZZ3                HEADER LINE
          WRITE   TS4                ENTER THE START TIME
          BLANK3
          CLRKEY
          LD      HL,STRTM
          CALL    TIMENT
          CALL    CLRBF              PRINT THE START TIME
          LD      HL,TS10
          CALL    XFER
```

```
            LD      HL,PBUFF
            LD      A,(STRTM)
            CALL    ASCOT
            LD      HL,PBUFF+3
            LD      A,(STRTM+1)
            CALL    ASCOT
            LD      HL,PBUFF
            CALL    PLINE
            WRITE   TS6                     ENTER INTERVAL
            BLANK3
            LD      HL,INTVL
            CALL    TIMENT
            CALL    CLRBF                   PRINT THE INTERVAL
            LD      HL,TS11
            CALL    XFER
            LD      A,(INTVL)
            LD      HL,PBUFF
            CALL    ASCOT
            LD      A,(INTVL+1)
            LD      HL,PBUFF+8
            CALL    ASCOT
            LD      HL,PBUFF
            CALL    PLINE
            WRITE   TS7                     ENTER NUMBER OF INTERVALS
            BLANK3
            CALL    BCDPR
            CP      0                       1 OR ZERO ALWAYS RESULTS IN AT LEAST
            JP      NZ,ABCD                 ONCE RUNNING
            INC     A
            DAA
ABCD        LD      (NINTVL),A
            CALL    CLRBF                   PRINT NUMBER OF INTERVALS
            LD      HL,TS12
            CALL    XFER
            LD      A,(NINTVL)
            LD      HL,PBUFF
            CALL    ASCOT
            LD      HL,PBUFF
            CALL    PLINE
            LD      A,X'FF'
            LD      (INACFG),A              SET INTERVAL TEST ACTIVE FLAG
            LD      HL,INTBLK               WHERE TO PUT PROGRAM DATA
            JP      BLKSET                  NOW ENTER THE TESTS TO BE RUN
* THIS SETS THE PRIORITY TEST START TIME
*
PRSET       CALL    BEEP
            LD      A,0
            LD      HL,RUNPR
            LD      (HL),A
            INC     HL
            LD      (HL),A
            INC     HL
            LD      (HL),A
            INC     HL
            LD      (HL),A                  CLEAR PRIORITY TEST SET UP DATA
            WRITE   BLANK
            WRITE   ZZ1                     HEADER LINE
            WRITE   TS8
            CLRKEY
            LD      HL,PRTIM
            CALL    TIMENT
            CALL    CLRBF
            LD      HL,TS10
```

```
        CALL    XFER
        LD      A,(PRTIM)
        LD      HL,PBUFF
        CALL    ASCOT
        LD      A,(PRTIM+1)
        LD      HL,PBUFF+3
        CALL    ASCOT
        LD      HL,PBUFF
        CALL    PLINE
        LD      A,X'FF'
        LD      (PRACFG),A          SET PRIORITY TEST ACTIVE FLAG
        LD      HL,PRBLK
*
*
*THIS ENTERS THE TESTS TO BE RUN
*       *=ALL
*       # (NNNN) IS A RANGE, LO TO HI
*       NN       IS A TEST TO BE RUN
BLKSET  WRITE   TS9
        BLANK3
        WRITE   BLANK
        LD      B,0                 MAX NO TO ENTER=100
BK0     WCMND                       WAIT FOR AN ENTRY
        CP      ASTSK               ASTERISK?
        JP      NZ,BL1              SEE IF RANGE ENTRY
        PUSH    HL
        PUSH    BC
        PUSH    AF
        CALL    BEEP
        POP     AF
        POP     BC
        POP     HL
        LD      (HL),A
        INC     HL
        INC     B
        PUSH    HL
        PUSH    BC
        WRITE   TS22                WRITE THE FULL RANGE REQUESTED
        POP     BC
        POP     HL
        CLRKEY
        JP      BLOOP
BL1     CP      LB                  IF POUND SIGN, THEN START OF RANGE
        JP      NZ,BL2
*
*RANGE ENTRY
*
        CALL    BEEP
        LD      (HL),A              STORE POUND SIGN
        INC     HL
        CLRKEY
BK3     CALL    BCDPR               GET LO RANGE
        LD      (HL),A              STORE IT
        INC     HL
        CLRKEY
        CALL    BCDPR               FETCH HI RANGE
        LD      (HL),A              STORE IT
        DEC     HL                  NO TEST IF LO LESS THAN HI
        CP      (HL)
        JP      NC,OK                IF SO, OK
        WRITE   TS5                 REENTER PROPER RANGE
        JP      BK3
OK      PUSH    BC
```

```
            PUSH    HL
            CALL    CLRBF                       PRINT THE RANGE ENTERED
            LD      HL,TS20
            CALL    XFER
            POP     HL
            LD      A,(HL)
            INC     HL
            PUSH    HL
            LD      HL,PBUFF
            CALL    ASCOT
            POP     HL
            LD      A,(HL)
            INC     HL
            PUSH    HL
            LD      HL,PBUFF+8
            CALL    ASCOT
            LD      HL,PBUFF
            CALL    PLINE
            POP     HL
            POP     BC
            INC     B
            INC     B
            INC     B
            INC     B
            JP      BLOOP                       GO FOR NEXT INSTRUCTION
BL2         CP      EOT
            JP      Z,BL5
            CALL    BCDPR                       ENTER A TEST NUMBER
            LD      (HL),A
            PUSH    BC
            PUSH    HL
            CALL    CLRBF                       PRINT THE PROGRAM ENTERED
            LD      HL,TS21
            CALL    XFER
            POP     HL
            LD      A,(HL)
            INC     HL
            PUSH    HL
            LD      HL,PBUFF
            CALL    ASCOT
            LD      HL,PBUFF
            CALL    PLINE
            POP     HL
            POP     BC
            INC     B
BLOOP       LD      A,B
            CP      0
            JP      NZ,BK0                      IF NOT AT END, KEEP ENTERING
            LD      A,EOT
BL5         LD      (HL),A
            WRITE   TS13
            BLANK3
            RET
TS1         DC      '0=SET PRIORITY TIME',0
TS2         DC      '1=SET INTERVAL TIME',0
TS3         DC      'RE-ENTER, 0 OR 1   ',0
TS4         DC      'START TIME: (HR/MIN)',0
TS5         DC      'OUT OF RANGE. RE-ENTER',0
TS6         DC      'RUN EVERY:(HR/MIN)',0
TS7         DC      'RUN HOW MANY TIMES?',0
TS8         DC      'RUN AT: (HR/MIN)',0
TS9         DC      'ENTER TESTS TO RUN',0
TS10        DC      '  :  ',0
```

```
TS11     DC       '   HRS.    MINS. ',0
TS12     DC       '          ',0
TS13     DC       'ENTRY COMPLETED!',0
TS20     DC       '   THRU    ',0
TS21     DC       '          ',0
TS22     DC       '00 THRU 99  *ALL*',0
XXXL     DC       '========================',0
*
*THIS CALLS FOR ENTRY OF HOURS/MINS, TESTS FOR RANGE, AND PUTS AT (HL),HL+1
*ENTRY: HL SET TO HRS, FOLOWED BY MINS
TIMENT   CALL     BCDPR
         PUSH     AF
         SUB      X'25'                 SEE IF HOURS>24
         DAA
         JP       C,TM12
         POP      AF
         WRITE    TS5
         BLANK3
         JP       TIMENT
TM12     POP      AF
         LD       (HL),A
         INC      HL
TM11     CALL     BCDPR                 GET START TIME MINS
         PUSH     AF
         SUB      X'60'                 SEE IF IN RANGE
         JP       C,TM10
         POP      AF
         WRITE    TS5
         BLANK3
         JP       TM11
TM10     POP      AF
         LD       (HL),A                SET START HOURS
         RET
         END
         RSEG     PROGM
         GLOBAL
************************************
*
* PROGRAM MODE MAINLINE
*
*        8/15/81 DSC
*
************************************
*
* ENTRY FROM MAINLINE, NO CONDITIONS
*
PSTRT    LD       A,1
         LD       (STAT),A              SET MODE FOR STOP INTERPRETATION
         CALL     CLEAR                 CLEAR DISPLAY
         DSPLY    18,5                  DISPLAY A P SHOWING MODE
         WCMND                          WAIT FOR KEYBOARD ENTRY
         CMND     STDTE,SETDT           DATE SET
         CMND     SETIM,STIM            TIME SET
         CMND     RNPGM,EXIT            RUN/PROGRAM MODE CHANGE
         CMND     PRNT,PRTST            PRINT TEST
         CMND     GOTO,PGNTRY           ENTER PROGRAM
         CMND     DELET,DLET            DELETE PROGRAM
         CMND     STST,TMNTRY           SET TEST TIMES
         CMND     SETREF,REFSET         SET REFERENCE LEVEL
         CLRKEY                         CLEAR ANY KEY ENTRIES
         JP       PSTRT
EXIT     LD       A,0
```

```
            LD      (STAT),A                STATUS= MAINLINE
            JP      MAINL                   JUMP CURES ANY STACK UNCERTAINTY
*
*
*
*******************************************
*
* DELETE A PROGRAM
*
*       8/15/81 DSC
*
*ENTRY: DELETE HAS BEEN PRESSED. NEXT ENTRY IS EITHER ASTERISK OR A BCD PAIR
*       INDICATING DELETE ALL OR NAMED PROGRAM.
*EXIT:  REQUESTED DELETEION PERFORMED
*
DLET        WCMND                           WAIT FOR ENTRY
            CP      ASTSK                   ASTERISK? (I.E. DELETE ALL??)
            JP      NZ,DL1                  IF NOT, GET NUMBER OF PGM TO DELETE
            WRITE   DLTAL                   DOUBLE CHECK- DELETE ALL???
            BLANK3
            WRITE   BLANK
            CLRKEY
            WCMND                           IF DELETE, THEN CLEAR ALL
            CP      DELET                   IF NOT, EXIT
            JP      NZ,DLX
            LD      BC,ALL                  ALL= ALL OF PROGRAM SPACE
            LD      HL,PSPC                 PROGRAM BLOCK BEGINNING
            CALL    MEMCLR                  CLEAR PROGRAMS!
            WRITE   ALLD
            BLANK3
            WRITE   BLANK
            CLRKEY
            RET
DLX         WRITE   DLX1
            CLRKEY
            RET
DLX1        DC      'DELETE ABORTED!',0
DLTAL       DC      'DELETE ALL PGMS?',0
ALLD        DC      'ALL PGMS DELETED!',0
DL1         CP      STST                    DELETE A PR'TY OR INT'VL SEQUENCE?
            JP      NZ,DL10
            CALL    BEEP
            CLRKEY
DL13        WCMND                           WAIT FOR NUMERAL FOR PROPER SEQ
            CP      16                      IS IT A KEYBOARD 0? (INT'VL)
            JP      NZ,DL11                 IF NOT, SEE IF PR'TY
            CALL    BEEP
            LD      A,0                     CLEAR ACTIVE FLAG
            LD      (PRACFG),A
            WRITE   DLT2
            BLANK3
            RET
DL11        CP      9                       KEYBOARD 1?
            JP      NZ,DL13                 WAIT FOR PROPER ENTRY
            CALL    BEEP
            LD      A,0
            LD      (INACFG),A              CLEAR INTVL ACTIVE FLAG
            WRITE   DLT3
            BLANK3
            RET
DLT3        DC      'INTERVAL SEQ. DELETED',0
DLT2        DC      'PRIORITY SEQ. DELETED',0
```

```
DL10    CALL    BCDPR               GET PROGRAM NUMBER TO BE DELETED
        LD      HL,PSPC
        LD      DE,NSTEPS
DL2     CP      0                   CALCULATE BASE ADDRESS OF PROGRAM
        JP      Z,DL3
        DEC     A
        DAA
        ADD     HL,DE
        JP      DL2
DL3     LD      BC,NSTEPS
        CALL    MEMCLR              HL=BASE ADDRESS OF PGM TO DELETE
        WRITE   DLT1
        CLRKEY
        RET
DLT1    DC      'PROGRAM DELETED!',0
*
*
***********************************************
*
* PROGRAM ENTRY ROUTINE
*
*       8/15/81 DSC
*
***********************************************
*
*ENTRY: GOTO WAS PRESSED. WAIT FOR ASTERISK (NEXT AVAILABLE SLOT) OR
*       A BCD PAIR INDICATING TO WRITE OVER EXISTING PROGRAM AS INDICATED.
*EXIT:  PROGRAM ENTERED OR ERROR DIAGNOSTIC PRINTED.
*
*
PGNTRY  WCMND                       WAIT FOR KEY ENTRY
        CP      ASTSK               IF ASTERISK, CALCULATE NEXT EMPTY SLOT
        JP      Z,AVAIL
        CALL    BCDPR               GET NUMBER OF PROGRAM TO ENTER
        PUSH    AF                  SAVE PROGRAM NUMBER TO PRINT OUT
        LD      B,A                 DISPLAY PRGM NO.
        LD      A,0
        CALL    BCDOT
        POP     AF
        PUSH    AF
        LD      HL,PSPC             CALCULATE BASE ADDRESS OF PROGRAM
        LD      DE,NSTEPS
PG1     CP      0
        JP      Z,PG3
        ADD     HL,DE
        DEC     A
        DAA
        JR      PG1
PG3     POP     AF
        PUSH    AF
        JP      PGCLR               NOW CLEAR THIS PROGRAM SPACE
AVAIL   CALL    BEEP
        CLRKEY
        LD      HL,PSPC             EXAMINE EACH PGM LOCATION BEGINNING
        LD      DE,NSTEPS
        LD      B,0
PG2     LD      A,(HL)              LOOK IF ZERO. IF SO, SLOT AVAILABLE
        CP      0
        JP      Z,PG4
        ADD     HL,DE
        LD      A,B
        INC     A
        DAA
```

```
                LD      B,A                     CALCULATE PROGRAM NUMBER
                CP      0                       IF ZERO, WE'VE GONE FULL CIRCLE    JP    NZ,PG2
        LANK PGROGRAMS
                WRITE   PGERR                   IF NONE AVAIL, USER MUST OVERWRITE OR
                CLRKEY
                RET
PGERR           DC      'NO AVAILABLE SPACE.',0
PG4             LD      A,B
                PUSH    AF                      SAVE PROGRAM NUMBER
PGCLR           POP     AF
                PUSH    HL
                PUSH    AF
                LD      BC,NSTEPS
                CALL    MEMCLR                  CLEAR THIS PROGRAM SPACE
                POP     AF
                PUSH    AF
                LD      B,A                     DISPLAY PROGRAM NUMBER
                LD      A,0
                CALL    BCDOT
                POP     AF
                POP     HL
                PUSH    AF
*****
*
*THIS IS THE BEGINNING OF THE PROGRAM ENTRY VERIFIER. NOW, ONLY VALID
*PROGRAM KEYS MAY BE ENTERED, TERMINATING EITH EOT.
*
                LD      B,NSTEPS-1              MAX NO. COMMANDS, LESS EOT REQ'D
PGE2            WCMND                           WAIT FOR KEY ENTRY
                CP      PAUSE
                JR      Z,ENTER
                CP      MP
                JR      Z,ENTER
                CP      MPI
                JR      Z,ENTER
                CP      FLASH
                JR      Z,ENTER
                CP      NUMLO                   LOW VALUE OF NUMERIC ENTRY
                JR      C,PGE1                  IF CARRY, OUT OF RANGE OR EOT
                CP      NUMHI+1
                JR      NC,PGE1                 IF FALL THRU, THEN NUMERIC
ENTER           LD      (HL),A                  STORE KEYSTROKE
                INC     HL
                PUSH    HL
                CALL    BEEP
                POP     HL
                CLRKEY
                DEC     B
                JR      Z,FORCE                 OUT OF SPACE IF ZERO
                JR      PGE2
PGE1            CP      EOT                     END OF TEST?
                JR      NZ,PEER                 IF NOT, ERROR
                LD      (HL),A
                JP      PG5                     NOW PRINT THE ENTERED PROGRAM
FORCE           LD      A,EOT                   FORCE AN END
                LD      (HL),A
                INC     HL
                WRITE   FRCND
                JP      PG5                     AND PRINT THE PROGRAM AS WRITTEN
FRCND           DC      'PRGM SPACE EXCEEDED!',0
PEER            CLRKEY                          IGNORE THIS KEYSTROKE!
                JP      PGE2
PG5             POP     AF                      RECALL PROGRAM NUMBER
```

```
            CALL    PGPRN               PRINT THE PROGRAM JUST ENTERED
            RET
*
*
************************************
*
*PROGRAM PRINT
*       8/15/81 DSC
*
************************************
*
*ENTRY: A=PROGRAM NO. (0-99) IN BCD
*EXIT: REQUESTED PROGRAM IS PRINTED.
*
PGPRN       LD      HL,PSPC             CALCULATE PROGRAM ADDRESS
            PUSH    AF
            LD      DE,NSTEPS
PRN2        CP      0
            JP      Z,PRN1
            ADD     HL,DE
            DEC     A
            DAA
            JR      PRN2
PRN1        LD      A,(HL)              SEE IF ANY PROGRAM ENTERED
            CP      0
            JR      NZ,PRN3             SKIP IF PROGRAM (OR GARBAGE) THERE
            POP     AF
            RET
PRN3        POP     AF
            PUSH    AF
            PUSH    HL
            CALL    HEADR
            POP     HL
            POP     AF
            PUSH    HL                  SAVE POINTER
            LD      HL,PBUFF
            LD      (BFPTR),HL
            LD      A,0                 INIT POINTERS AND FLAGS
            LD      (BFCNT),A
            LD      (FLG1),A
            LD      B,32
            POP     HL
PRN4        LD      A,(HL)              FETCH A PROGRAM COMMAND
            PUSH    HL
            PUSH    BC                  SAVE THE WORKS
            CP      NUMLO               IS IT A NUMERIC ENTRY?
            JR      C,PRN9              IF NOT, TEST IF END OF NUMERIC STRING
            CP      NUMHI+1
            JR      NC,PRN9
            PUSH    AF
            LD      A,1                 SET NUMERIC ENTRY FLAG
            LD      (FLG1),A
            POP     AF                  RESTORE DATA
            LD      HL,ASCTBL
            SUB     NUMLO
            LD      E,A
            LD      D,0
            ADD     HL,DE
            LD      A,(HL)              FETCH ASCII VALUE OF NUMERIC KEY
            LD      HL,(BFPTR)
            LD      (HL),A              STORE ASCII CHARACTER
            INC     HL
            LD      (BFPTR),HL
```

```
          LD      A,(BFCNT)
          INC     A
          LD      (BFCNT),A
          CP      21
          CALL    Z,PRN11                 IF ZERO, MUST LPRINT
          JP      NXT                     NOW FOR NEXT COMMAND! (PHEW!)
PRN9      LD      A,(FLG1)                IS THIS THE END OF A NUMERIC STRING?
          CP      0
          JR      Z,PRN10                 IF NOT, THEN TRY TO DECIPHER KEY
          CALL    PRN11                   PRINT THE NUMERIC STRING
          JP      PRN10
PRN11     LD      A,0
          LD      (FLG1),A                CLEAR NUMERIC STRING FLAG
          LD      HL,(BFPTR)              NOW, PRINT THE NUMRIC STRING
          LD      A,0
          LD      (HL),A                  TERMINATE STRING!
          LD      HL,PBUFF
          CALL    PLINE
          LD      HL,PBUFF
          LD      (BFPTR),HL
          LD      A,0
          LD      (BFCNT),A
          RET
PRN10     POP     BC
          POP     HL
          PUSH    HL
          PUSH    BC
          LD      A,(HL)
          CP      PAUSE
          JR      NZ,PRN5
          WRITE   PRM5
          JP      NXT
PRN5      CP      FLASH
          JR      NZ,PRN6
          WRITE   PRM6
          JP      NXT
PRN6      CP      MPI
          JR      NZ,PRN7
          WRITE   PRM7
          JP      NXT
PRN7      CP      MP
          JR      NZ,PRN8
          WRITE   PRM8
          JP      NXT
PRN8      CP      EOT
          JR      NZ,PRN12
          WRITE   PRM9
          POP     BC
          POP     HL
          BLANK3
          RET
PRN12     WRITE   PRM12
NXT       POP     BC
          DEC     B
          JP      Z,PEXIT                 IF ZERO, WE'VE PRINTED 32
          POP     HL
          INC     HL
          JP      PRN4
PEXIT     POP     HL
          BLANK3
          RET
PRM0      DC      '*NO PROGRAM*',0
PRM1      DC      'PROGRAM NO.          ',0
```

```
LRM1      EQU     *-PRM1
PRM5      DC      'PAUSE',0
PRM6      DC      'FLASH',0
PRM7      DC      'MP-IMMEDIATE',0
PRM8      DC      'MP-DETECT',0
PRM9      DC      'EOT',0
PRM12     DC      'UNDECIPHERABLE',0
ASCTBL    DC      '147*2580369#'
```

```
************************************
*
* TIME OF DAY ENTRY
*
*         8/15/81 DSC
*
************************************
*
*ENTRY: NO CONDITION
*EXIT:  TIME IS SET (NOT DISPLAYED- TIME DISPLAYED IN MAINLINE ONLY!)
*
STIM      WRITE   HRSIN
          BLANK3
          CALL    BCDPR               GET HRS IN
          CP      X'24'
          JP      NC,TIMERR
          LD      (HRS),A
          CALL    BCDPR
          CP      X'60'
          JP      NC,TIMERR
          LD      (MINS),A
          CALL    BCDPR
          CP      X'60'
          JP      NC,TIMERR
          LD      (SECS),A
          CALL    PTIME
          BLANK3
          WRITE   BLANK
          LD      A,X'FF'
          LD      (TWNKL),A           STOPS DISPLAY FROM FLASHING
          RET
TIMERR    WRITE   SECERR
          JP      STIM
SECERR    DC      'ERROR- REENTER ALL',0
HRSIN     DC      'ENTER TIME-SIX DIGITS',0
SETDT     WRITE   MOTHIN
          BLANK3
          WRITE   BLANK
          CALL    BCDPR
          CP      X'13'
          JP      C,ST1
          WRITE   INERR
          JR      SETDT
ST1       LD      (MNTH),A
          CALL    BCDPR
          CP      X'32'
          JP      C,ST4
          WRITE   INERR
          BLANK3
          WRITE   BLANK
          JP      SETDT
ST4       LD      (DAYS),A
          CALL    BCDPR
          LD      (YEAR),A
          CALL    PDATE
```

```
        BLANK3
        WRITE   BLANK
        RET
YRIN    DC      'ENTER YEAR:',0
MOTHIN  DC      'ENTER MO/DAY/YR   ',0
INERR   DC      'ERROR- REENTER ALL',0
*
*
*
****PRINT TEST COMMAND INTERPRETER
*
*
*
PRTST   WCMND                           WAIT FOR ENTRY
        CP      ASTSK                   PRINT ALL?
        JP      Z,PALL
        CP      STST                    TEST TIMES PRINT??
        JP      Z,TTIMP
        CALL    BCDPR                   FETCH NO. TO PRINT
        CALL    PGPRN
        RET
PALL    CALL    BEEP
        LD      A,0
PALL1   PUSH    AF
        CALL    PGPRN
        POP     AF
        INC     A
        DAA
        CP      0
        RET     Z
        JP      PALL1
        RET
*****************************************
*
*WAIT FOR NUMERIC PAIR ENTRY
*
*       8/15/81 DSC
*
*****************************************
*ENTRY: NO CONDITIONS
*EXIT: A=BCD PAIR ENTERED FROM KEYBOARD
BCDPR   PUSH    HL
        PUSH    DE
        PUSH    BC
        CALL    NUMIN                   GET FIRST DIGIT
        SLA     A
        SLA     A
        SLA     A
        SLA     A                       PUT DIGIT IN HIGH SLOT
        PUSH    AF                      SAVE DIGIT
        CALL    NUMIN                   GET NEXT DIGIT
        LD      B,A
        POP     AF                      RESTORE HIGH DIGIT
        OR      B
        POP     BC
        POP     DE
        POP     HL
        RET
NUMIN   WCMND                           WAIT FOR ENTRY
        CP      NUMLO                   COMPARE TO LOW NUMBER
        JP      C,NERR
        CP      NUMHI+1                 COMPARE TO HIGH DIGIT
        JP      NC,NERR
```

```
          CP      ASTSK
          JP      Z,NERR
          CP      LB              POUND SIGN
          JP      Z,NERR
          LD      HL,NUMTBL       CONVERSION TABLE
          SUB     NUMLO
          LD      E,A             KEYSTROKE TO NUMBER
          LD      D,0
          ADD     HL,DE           TABLE ENTRY ADDRESS
          LD      A,(HL)
          PUSH    AF              SAVE ENTRY
          CALL    BEEP
          CLRKEY
          POP     AF
          RET
NERR      CLRKEY
          JP      NUMIN
*
*THIS TABLE CONVERTS A KEY ENTRY CODE TO ITS CORRESPONDING VALUE AS
*PRINTED ON THE KEY.
NUMTBL    DC      1,4,7,'*',2,5,8,0,3,6,9,'#'
*
*
*CLEAR DISPLAY
*
CLEAR     DSPLY   10,0
          DSPLY   10,1
          DSPLY   10,2
          DSPLY   10,3
          DSPLY   10,4
          DSPLY   10,5
          RET
*
*
*CLEAR MEMORY UTILITY ROUTINE
* ENTRY:BC= NUMBER TO CLEAR, BEGINNING AT (HL)
* EXIT: MEM IS CLEARED FOR (BC) BYTES FROM (HL)
*
MEMCLR    PUSH    HL
          POP     DE
          INC     DE
          LD      A,0
          LD      (HL),A
          DEC     BC
          LDIR
          RET
*
*
*
***********************************************
*
* PRINT THE HEADER LINE FOR A PROGRAM OR TEST
*         8/17/81 DSC
*
***********************************************
*
*ENTRY: A=PROGRAM NUMBER
*EXIT: HEADER LINE PRINTED. ALL REGISTERS FLUMOXED.
HEADR     PUSH    AF
          PUSH    BC
          PUSH    DE
          PUSH    HL
          PUSH    AF
```

```
                CALL    CLRBF
                LD      HL,PRM1         PRINT PROGRAM NO.
                CALL    XFER
                POP     AF
                LD      HL,PBUFF+19
                CALL    ASCOT
                LD      HL,PBUFF
                CALL    PLINE
                POP     HL
                POP     DE
                POP     BC
                POP     AF
                RET
REFSET          WRITE   REF1
                BLANK3
                CALL    BCDPR
                LD      (REFLEV+1),A
                CALL    BCDPR
                LD      (REFLEV+2),A
                LD      A,X'C2'
                LD      (REFLEV),A
                CALL    CLRBF
                LD      HL,REF2
                CALL    XFER
                LD      HL,PBUFF+16
                LD      DE,REFLEV
                CALL    PTDB
                LD      HL,PBUFF
                CALL    PLINE
                BLANK3
                RET
REF1            DC      'ENTER REFERENCE LEVEL',0
REF2            DC      'REF. LEVEL:         ',0
                END
                RSEG    RTEST
                GLOBAL
*
*
*****************************************
*
*       TEST RUN SUPERVISOR
*
*               8/28/81 DSC
*
*****************************************
*
*       THIS DECIDES WHICH TESTS ARE TO BE RUN- EITHER ALL TESTS IN THE
*       TEST PROGRAM SPACE (I.E. INSTRUCTION=*)
*       OR THE SINGLE SELECTION, OR THE RANGE (DESIGNATED #) FOLLOWING.
*       TESTS ARE RUN SO LONG AS THE SELECTED PPROGRAMS EXIST.
*       ENTRY:  HL= POINTER TO PROGRAM CONTROL BLOCK (PCB)
*       (EITHER FOR THE PRIORITY SET OR THE INTERVAL SET)
*       EXIT:   PROGRAMS REQUESTED ARE RUN
*
TSSPV           PUSH    HL
                POP     BC              FETCH RETURN ADDRESS
                POP     HL
                LD      (RETURN),HL
                PUSH    BC
                POP     HL
                LD      B,100           MAX NUMBER TO INTERPRET
                PUSH    BC
```

```
TSTLOP  POP   BC                LOOP FOR INTERPRETING REQUEST STRINGS
        LD    A,B
        CP    0
        JP    Z,TSTEX           IF ZERO, FORCE A RETURN- ALL INTERPRED
        PUSH  BC
        PUSH  HL
        CALL  EXEC              DISPLAYS "E"
        POP   HL                SEE WHAT IS REQUESTED FROM PCB
        LD    A,(HL)
        CP    ASTSK             IS THIS AN ASTERISK? IF SO, RUN ALL
        JP    NZ,TST1
        LD    A,0
        LD    B,X'99'
        PUSH  HL
        CALL  XRANGE            EXECUTE ALL PROGRAMS
        POP   HL
        INC   HL
        POP   BC
        INC   B
        PUSH  BC
        JP    TSTLOP
TST1    CP    EOT               DONE IF EOT
        JP    Z,TSTEX           DONE
        CP    LB                IF POUND, DO A RANGE
        JP    NZ,TS50
        INC   HL
        LD    A,(HL)            START RANGE
        ADD   A,0
        DAA                     MAKE CERTAIN ITS DECIMAL!
        INC   HL
        PUSH  AF
        LD    A,(HL)            END RANGE
        ADD   A,0
        DAA
        LD    B,A
        POP   AF
        INC   HL                POINTER TO NEXT INSTRUCTION
        PUSH  HL                SAVE POINTER
        CALL  XRANGE            RUN SELECTED RANGE OF PROGRAMS
        POP   HL
        POP   BC
        LD    A,3               INC THE INSTRUCTION COUNTER
        ADD   A,B
        LD    B,A
        PUSH  BC
        JP    TSTLOP
TS50    ADD   A,0               TEST FOR DECIMAL RANGE
        DAA
        INC   HL
        PUSH  HL
        CALL  CALC
        POP   HL
        POP   BC
        INC   B
        PUSH  BC                INC REQUEST COUNTER
        JP    TSTLOP            KEEP CYCLING
TSTEX   LD    A,0               EXIT LOCATION
        LD    (STAT),A          STATUS TO MAINLINE
        LD    HL,(RETURN)
        PUSH  HL
        RET
```

```
*RUNS  RANGE OF PROGRAMS FROM <A> TO <B>
*
*       ENTRY: A= START PROGRAM NUMBER (BCD)
*              B= END PROGRAM NUMBER (BCD)
*       EXIT:  REQUESTED PROGRAMS RUN.
*
XRANGE  PUSH    AF                      SAVE PROGRAM COUNTER
        PUSH    BC                      SAVE END PROGRAM
        CALL    CALC                    RUN PROGRAM IN A
        POP     BC
        POP     AF
        CP      B                       TRYING TO RUN LAST TEST?
        RET     Z                       IF SO, WE DONE!
        ADD     A,1                     OTHERWISE, INCREMENT PROGRAM COUNTER
        DAA
        JR      XRANGE                  RUN NEXT PROGRAM
*
*
*       NOTE
*       THIS CALCULATES THE ADDRESS OF THE FIRST PROGRAM INSTRUCTION
*       IN THE REQUESTED PROGRAM NO. CURRENTLY CONTAINED IN A
*       ENTRY:  A=PROGRAM NUMBER
*       EXIT    REQUESTED TEST IS RUN IF IT EXISTS
*
*
CALC    LD      HL,PSPC                 SIZE OF INDIVIDUAL PROGRAM IN TPS
        LD      DE,PSPSZ                BEGINNING OF TEST PROGRAM SPACE (TPS)
        PUSH    AF                      SAVE PROGRAM NUMBER
TST3    CP      0                       IS REQUESTED PROGRAM NO. DOWN TO 0?
        JR      Z,TST2
        ADD     HL,DE                   ADD INDIVID. PROGRAM SPACE SIZE
        DEC     A
        DAA                             DECIMALLY DECREMENT
        JR      TST3
TST2    LD      A,(HL)                  FETCH FIRST INSTRUCTION IN PROGRAM
        CP      0                       IF ZERO, NO PROGRAM
        JP      Z,TST4
        POP     AF                      RESTORE PROGRAM NUMBER
        CALL    TEST                    RUN THE TEST!
        RET
TST4    POP     AF
        RET
***************************************************
*
* TEST LINE SUBROUTINE
*       7/21/81 DSC
*
***************************************************
*
*       ENTRY:  A=BCD PROGRAM BLOCK NUMBER
*               HL=POINTER TO FIRST INSTRUCTION BYTE
*       EXIT:   TEST RUN
*
TEST    PUSH    HL
        PUSH    AF
        LD      A,(TTEST)               INCREMENT TOTAL TESTS RUN COUNTER
        ADD     A,1
        DAA
        LD      (TTEST),A
        JP      NC,TEST1X
        LD      A,(TTEST+1)
        ADC     A,0
        DAA
```

```
              LD      (TTEST+1),A
TEST1X        WRITE   BLANK
              CALL    EXEC                  DISPLAY TEST NUMBER
              POP     AF
              PUSH    AF
              LD      B,A
              LD      A,0
              CALL    BCDOT
              WRITE   BLANK
              POP     AF
              PUSH    AF
              CALL    HEADR                 PRINT TEST NUMBER
              CALL    PDATE
              CALL    PTIME
              CALL    ERL                   CALIBRATE FOR ECHO RETURN LOSS
              LD      A,DTMF                PUT SYSTEM OFF HOOK
              LD      (HOOK),A
              WAIT    38
              POP     AF
              POP     HL
              LD      A,0
              LD      (LNFLG),A             INIT THE LINE PRINT PNTER FOR DIAL SEQ
TST1X         LD      A,(HL)                FETCH PROGRAM INSTRUCTION
              INC     HL
              PUSH    HL                    SAVE PROGRAM POINTER
              CP      9                     IS IT A KEYSTROKE???
              JP      C,DILSQ
              CP      21
              JP      NC,DILSQ
              PUSH    AF                    SAVE KEYSTROKE
              LD      A,(LNFLG)             IS THIS FIRST CHAR IN STRING?
              CP      0
              JP      NZ,LN1
              CALL    CLRBF
              LD      HL,SEQMSG
              CALL    XFER                  INITIALIZE DIAL SEQUENCE PRINT LINE
LN1           POP     AF                    RESTORE THE KEYSTROKE
              PUSH    AF
              SUB     NUMLO                 SUBTRACT OFFSET
              LD      E,A
              LD      D,0
              LD      HL,ASCTBL
              ADD     HL,DE                 CALCULATE ASCII TABLE ADDRESS
              LD      A,(HL)                A=ASCII VALUE OF KEYSTROKE.
              LD      HL,PBUFF+12
              LD      DE,PBUFF+11
              LD      BC,9
              PUSH    AF
              LDIR                          ENTER NEW NUMBERS FROM THE RIGHT
              POP     AF
              LD      (PBUFF+20),A
              LD      A,(LNFLG)
              INC     A
              LD      (LNFLG),A             INCREMENT FLAG TO INDICATE # ENTRIES
              CP      10                    IF TEN PRINT THE LINE AS IS
              JP      NZ,DILSQ3             IF NOT TEN, NO NEED TO PORCE PRINT
              LD      HL,PBUFF
              CALL    PLINE
              LD      A,0
              LD      (LNFLG),A
              CALL    CLRBF
              LD      HL,SEQMSG
              CALL    XFER
```

```
DILSQ3   POP     AF              RESTORE THE KEYSTROKE
         CALL    TONE            PLAY THE TONE
         LD      A,0             INITIALIZE RESPONSE TIME
         LD      (RESTIM),A
         JP      COMON           FETCH NEXT COMMAND
SEQMSG   DC      'DIAL SEQ:   ',0
DILSQ    PUSH    AF              SAVE KEYSTROKE
         LD      A,(LNFLG)       IF NOT KEY, END OF DIAL SEQ?
         CP      0
         JP      NZ,PSEQ9        IF END OF DIAL SEQ, THEN PRINT LINE
         POP     AF
         JP      DILSQ2
PSEQ9    POP     AF
PSEQ     PUSH    AF
         LD      HL,PBUFF
         CALL    PLINE
         LD      A,0
         LD      (LNFLG),A
         CALL    CLRBF
         LD      HL,SEQMSG
         CALL    XFER
         POP     AF              RESTORE KEYSTROKE
DILSQ2   CP      EOT             IS THIS LAST STEP?
         JP      Z,NDTST         IF SO, EXIT CLEANLY!
         CHK1    PAUSE,PAWS1     IS THIS A WAIT???
         CHK1    MP,MP1          MEASURE AND PRINT?
         CHK1    MPI,MPI1        MEASURE AND PRINT IMMEDIATE???
         CHK1    FLASH,FLSH
         CALL    TONE            IF NOT, IT MUST BE A DIAL OUT TONE
COMON    POP     HL              RESTORE PROGRAM BLOCK POINTER
         JP      TST1X
NDTST    LD      A,ONHK          RESTORE SYSTEM ON HOOK
         LD      (HOOK),A
         WRITE   BLANK
         WRITE   BLANK
         WRITE   BLANK
         POP     HL
         RET
PAWS1    WAIT    30
         RET
*
*
*MEASURE AND PRINT ROUTINE
*
*
*
MP1      LD      A,0             INITIALIZE FAILURE FLAG
         LD      (REFAIL),A
         CALL    TNDTC           DETECT TONE
         CP      X'FF'           IF 'FF' THEN NO TONE DETECTED
         JP      Z,MPER1         PRINT ERROR MESSAGE AND RETURN
         PUSH    AF
         CALL    CLRBF           PRINT OUT RESPONSE TIME
         LD      HL,RESM
         CALL    XFER
         LD      A,(RESTIM)
         LD      HL,PBUFF+19
         CALL    ASCOT
         LD      A,(PBUFF+19)    SUPPRESS LEADING ZEROS
         CP      X'30'
         JP      NZ,XYZ
         LD      A,X'20'
         LD      (PBUFF+19),A
```

```
XYZ     LD      HL,PBUFF
        CALL    PLINE
        CALL    CLRBF
        LD      HL,MPM1                 TONE DETECT MESSAGE
        CALL    XFER
        POP     AF
        LD      (PBUFF+20),A
        LD      HL,PBUFF
        CALL    PLINE                   PRINT TONE DETECTED
        CALL    MPI1                    DO AN IMMEDIATE MEASUREMENT
        LD      DE,SUM1
        LD      HL,REFLEV               COMPARE REFERENCE LEVEL TO LINE LEVEL
        LD      A,(HL)
        AND     X'7F'                   CONVERT AUTEMPORE TO POSITIVE
        LD      (HL),A
        CALL    ADD
        LD      A,(REFLEV)
        OR      X'80'
        LD      (REFLEV),A              RESTORE TO OLD NEGATIVE SELF
        LD      A,(SUM)
        AND     X'80'                   RESULT NEG?
        JP      Z,XYZ1
        LD      A,X'FF'
        LD      (REFAIL),A              SET FLAG FOR LATER PRINT OF MESSAGE
XYZ1    CALL    TNDTC                   WAIT FOR DTMF TO COME AND GO
        CP      X'FF'
        JP      Z,MPER1
        CALL    ERL1
        WAIT    8
        CALL    MSCVT
        CALL    CLRBF
        LD      HL,LINLEV
        CALL    XFER
        LD      HL,PBUFF+16
        LD      DE,SUM1
        CALL    PTDB
        LD      HL,PBUFF
        CALL    PLINE
        LD      A,(REFAIL)
        CP      0
        RET     Z
        WRITE   FLAGIT                  WRITE REFERENCE LEVEL FAILURE MESSAGE
        WRITE   BLANK
        CALL    CLRBF
        LD      HL,FAILM
        CALL    XFER
        LD      HL,PBUFF+16
        LD      DE,REFLEV
        CALL    PTDB
        LD      HL,PBUFF
        CALL    PLINE
        WRITE   BLANK
        WRITE   FLAGIT
        LD      A,(FAIL1)               INCREMENT SUMMARY COUNTER FOR CAT. 1
        INC     A
        DAA
        LD      (FAIL1),A
        LD      A,0
        LD      (REFAIL),A              RESET FLAG
        RET
RESM    DC      'RESPONSE TIME:    ',0
LINLEV  DC      'LINE NOISE:       ',0
FAILM   DC      'LEVEL BELOW REF   ',0
```

```
*
*THIS IS THE ENTRY POINT FOR A MEASURE AND PRINT IMMEDIATE
*
*
MPI1      WAIT    3                   WAIT FOR AT LEAST 100 MSEC TO SETTLE
          CALL    MSCVT               CALL MEASURE AND CONVERT
          CALL    CLRBF               PRINT OUT MEASUREMENT LINE
          LD      HL,DBLIN
          CALL    XFER
          LD      DE,SUM1             LOCATION OF DATA TO PRINT
          LD      HL,PBUFF+16
          CALL    PTDB                OUTPUT ASCII DB LEVEL TO PRINTER BUFFER
          LD      HL,PBUFF
          CALL    PLINE
          RET
DBLIN     DC      'LEVEL:              ',0
MPER1     WRITE   BLANK
          WRITE   FLAGIT
          WRITE   MPM2
          WRITE   FLAGIT
          WRITE   BLANK
          LD      A,(FAIL2)
          ADD     A,1
          DAA
          LD      (FAIL2),A
          RET     NC
          LD      A,(FAIL2+1)
          ADC     A,0
          LD      (FAIL2+1),A
          RET
*
*
*MEASURE AND CONVERT- THIS TAKES TEN READINGS AND CONVERTS TO AVERAGED
* IN LOCATION <SUM1>
*
*
MSCVT     WAIT    35                  ALLOW INTEGRATORS TO DESGREGATE
          LD      B,10                TOTAL MEASUREMENTS TO TAKE FOR AVERAGING
          PUSH    BC
          LD      A,64                INITIAL EXPONENT
          LD      (SUM1),A
          LD      A,0
          LD      (SUM1+1),A
          LD      (SUM1+2),A          INITIALIZE THE AVERAGE
MPIL      CALL    MSURE
          CALL    LINAPX              CALCULATE DB LEVEL
          LD      DE,SUM1
          LD      HL,SUM              ADD FOR AVERAGING PURPOSES
          CALL    ADD
          XMOVE   SUM,SUM1,3          MOVE RESULT TO SUM1
          POP     BC                  FETCH BACK LOOP COUNTER
          DEC     B                   DECREMENT COUNTER
          PUSH    BC
          JP      NZ,MPIL             IF NOT DONE, KEEP MEASURING
          POP     BC
          LD      A,(SUM1)            FETCH EXPONENT
          DEC     A                   IN EFFECT, DIVIDE BY TEN
          LD      (SUM1),A
          RET
TNDTC     LD      BC,450              ;  WAIT 450*40MSEC
          LD      A,(TNCLR)
TND1      LD      A,(TNRD)
          BIT     4,A                 IS PROBE THERE?
```

```
            JP      NZ,TNOK
            LD      A,(TNCLR)
            DEC     BC
            LD      A,B
            OR      C
            JP      Z,TND2                      NO TONE, TIME OUT
            WAIT    1
            JP      TND1                        KEEP TRYING
TND2        LD      A,X'FF'
            RET                                 ERROR CODE
TNOK        LD      HL,TNDTB
            AND     X'0F'
            LD      D,0
            LD      E,A
            ADD     HL,DE                       CALCULATE TABLE ENTRY ADDRESS
            LD      A,(HL)
            PUSH    AF
TN3         LD      A,(TNRD)
            BIT     4,A                         STROBE GONE???
            JP      Z,TN01
            LD      A,(TNCLR)                   CLEAR
            JP      TN3
TN01        POP     AF
            RET

RET
TMP1        DC      'LEVEL:    RANGE:   ',0
FLAGIT      DC      '##### ###############',0
TNDTB       DC      'D1234567890*#ABC'
MMG1        DC      'RANGE:    LEVEL:       ',0
MM1         DC      '          ',0
MPM1        DC      'FAR END:               ',0
MPM2        DC      '  NO TONE RECEIVED!',0
*
*
*****************************************
*
* MEASURE INPUT
*   8/20/DSC
*
*****************************************
*
*ENTRY: NO CONDITION
*EXIT: A= MEASUREMENT DATA
*      B=RANGE SETTING
*
MSURE       LD      B,0
            WAIT    1
MS1         LD      A,B
            LD      (RANGE),A                   SET RANGE
            CALL    RDCNV
            CP      X'21'                       IS GREATER THAN X'20'? MIN. SIGNIFICANT
            JR      NC,MSGXX                    IF SO, WE'VE A WINNER!
            PUSH    AF
            LD      A,B                         TRY LOWER RANGE
            INC     A                           IF LAST RANGE TAKE IT!
            CP      4
            JP      NC,LAST
            LD      B,A
            POP     AF
            JP      MS1
LAST        POP     AF
MSGXX       RET
```

```
*
*
*READ MEASUREMENT UNIT
*
*
RDCNV   LD      A,(MSDAT)
        LD      (STCNVT),A              INITIATE A CONVERSION
        NOP
        NOP
        NOP
        NOP
        NOP
        NOP
        NOP
MS2     LD      A,(PSTAT)               WAIT FOR END OF CONVERSION
        BIT     2,A
        JP      Z,MS2                   WAIT FOR NOT(EOC)
        LD      A,(MSDAT)               CHECK INPUT DATA
*THE FOLLOWING COMMENTED LINES PRINT INTERMEDIATE MEASUREMENTS
*       PUSH    HL
*       PUSH    DE
*       PUSH    BC
*       PUSH    AF
*       CALL    CLRBF
*       LD      HL,MM1
*       CALL    XFER
*       LD      A,B
*       LD      HL,PBUFF
*       CALL    ASCOT
*       POP     AF
*       PUSH    AF
*       LD      HL,PBUFF+4
*       CALL    ASCOT
*       LD      HL,PBUFF
*       CALL    PLINE
*       POP     AF
*       POP     BC
*       POP     DE
*       POP     HL
        RET
MSG3    DC      'MPI LEVEL= -4.2 DB'
DAD     LD      L,A                     ADDS STACK TO CURRENT MEASUREMENT
        LD      H,0
        LD      A,B                     SAVE RANGE!
        POP     BC                      RET ADDRESS
        POP     DE
        ADD     HL,DE
        PUSH    HL
        PUSH    BC
        LD      B,A                     RESTORE RANGE
        RET
*
*DISPLAY ""E"" AND SET MODE TO TEST
*
EXEC    LD      A,2                     SET STATUS TO RUN MODE
        PUSH    HL
        LD      (STAT),A
        CALL    CLEAR                   CLEAR DISPLAY
        LD      A,5
        LD      B,13
        CALL    DISP                    DISP THE TEST MODE
        POP     HL
        RET
```

```
*
*
*
****************************************
*
* FLASH HOOK ROUTINE
*    3/22/81 DSC
*
****************************************
*FLASHES ON/OFF HOOK FOR 1/2 SECOND
*
*
FLSH      LD      A,ONHK              FLASH ON HOOK
          LD      (HOOK),A
          WAIT    13                  WAIT APPROX 1/2 SEC
          LD      A,DTMF              OFF HOOK AGAIN
          LD      (HOOK),A
          WAIT    13
          RET
*
*
*  FOR ECHO RETURN LOSS
* FIRST CALCULATES UNCONNCTED LINE LEVEL WITH 1KHZ TONE FOR CALLIBRATION
* SECOND, DETERMINES DIFFERENCE IN RETURN LINE LEVEL
*
ERL       LD      A,X'FC'             ON HOOK, LINE AMP ENABLED
          LD      (HOOK),A
          LD      A,X'C7'             1KHZ TONE
          LD      (TONEP),A
          WAIT    20
          CALL    MSCVT               MEASURE DEAD LINE LEVEL
          LD      A,X'FF'
          LD      (TONEP),A
          XMOVE   SUM1,CALIBR,3       STORE CALIBRATION LEVEL FOR LATER USE
          RET
CL1       DC      'CALIB. LEV:        ',0
CL2       DC      'RET. LEV:          ',0
ERL1      LD      A,X'C7'
          LD      (TONEP),A           OUTPUT A 1KHZ TONE
          WAIT    10                  PAUSE A MOMENT TO REFRESH ONESELF
          CALL    MSCVT               MEASURE THE RETURN LEVEL
          LD      A,X'FF'             TURN OFF 1KHZ TONE
          LD      (TONEP),A
          LD      HL,SUM1
          LD      DE,CALIBR
          LD      A,(DE)              SUBTRACT CAL LEVEL FROM ECHO LEVEL
          CPL
          AND     X'80'               COMPLEMENT SIGN OF CALIB. LEVEL
          LD      B,A
          LD      A,(DE)
          AND     X'7F'
          OR      B
          LD      (DE),A
          CALL    ADD
          CALL    CLRBF
          LD      HL,ERLMSG
          CALL    XFER
          LD      HL,PBUFF+16
          LD      DE,SUM
          CALL    PTDB
          LD      HL,PBUFF
          CALL    PLINE
          RET
ERLMSG    DC      'E-R-L:             ',0
```

```
            END
            PRINT OFF
            GLOBAL
            RSEG    SLFTST
ONE         EQU     9
TWO         EQU     13
THREE       EQU     17
FOUR        EQU     10
FIVE        EQU     14
SIX         EQU     18
SEVEN       EQU     11
EIGHT       EQU     15
NINE        EQU     19
ZERO        EQU     16
SYSTM0      DC      'ENTER * FOR TEST MENU',0
SYSTM1      DC      'ENTER TEST CODE:',0
MENU1       DC      'MEMORY 0-F TEST....1',0
MENU2       DC      'MEMORY PATRN TEST..2',0
MENU9       DC      'PRINTER TEST.......3',0
MENU3       DC      'DTMF TONE SEQ TEST 4',0
MENU4       DC      'KEYBOARD TEST......5',0
MENU5       DC      'BRK DIAL TONE TST..6',0
MENU6       DC      '1KHZ TEST TONE.....7',0
MENU7       DC      'DTMF STEADY TONE...8',0
MENU8       DC      'TO EXIT TEST HIT EOT',0
SYSTST      WRITE   SYSTM0
SYST1       WRITE   BLANK
            LD      A,0
            LD      (TSTMD),A           NOT IN ANY CRITICAL SEQUENCE NOW
            LD      B,X'88'             DISPLAY ALL 8'
            CALL    BCDOT
            LD      A,2
            LD      B,X'88'
            CALL    BCDOT
            LD      A,4
            LD      B,X'88'
            CALL    BCDOT
            WRITE   BLANK
            WRITE   SYSTM1              SYSTEM TEST MESSAGE
            BLANK3
            CLRKEY
            WCMND
            CP      ASTSK
            JP      NZ,SYST2
            WRITE   BLANK
            WRITE   MENU1               MENU REQUEST- PRINT TEST SELECTIONS
            WRITE   BLANK
            WRITE   MENU2
            WRITE   BLANK
            WRITE   MENU9
            WRITE   BLANK
            WRITE   MENU3
            WRITE   BLANK
            WRITE   MENU4
            WRITE   BLANK
            WRITE   MENU5
            WRITE   BLANK
            WRITE   MENU6
            WRITE   BLANK
            WRITE   MENU7
            WRITE   BLANK
            WRITE   MENU8
            WRITE   BLANK
```

```
            JP      SYST1
SYST2       CP      EOT
            JP      NZ,SYST2Z
            CALL    BEEP
            JP      MAINL
SYST2Z      LD      HL,SYST1
            PUSH    HL                      RETURN ADDRESS
            CP      ONE
            JP      Z,MEMTST
            CP      TWO
            JP      Z,MEMPTN
            CP      THREE
            JP      Z,PTEST
            CP      FOUR
            JP      Z,AUDTST
            CP      FIVE
            JP      Z,KEYBD
            CP      SIX
            JP      Z,BRKDL
            CP      SEVEN
            JP      Z,KHZOUT
            CP      EIGHT
            JP      Z,DTMFOT
            JP      SYST1
NOTIMP      DC      'NOT YET IMPLEMENTED!',0
*
*
* MEMORY READ/WRITE TEST *
*   ALTERNATELY WRITES 00 AND FF TO EACH RAM LOCATION
*   MEMORY CONTENTS PRESERVED
*   EXIT TEST MIDSTREAM BY EOT
MEMTST      CALL    BEEP
            WRITE   PMSG5                   MEMORY TEST
            LD      A,0
            LD      (MEMFLG),A              CLEAR ERROR FLAG
            LD      (KEYIN),A               CLEAR KEYIN
            LD      HL,RAMBG
            LD      DE,RAMSZ
LOP1        LD      A,(HL)                  MEMORY TEST: WRITE ALTERNATELY FF
            LD      B,A                     AND 00  TO EACH RAM LOCATION AND
            LD      A,00                    CHECK./ DIAGNOSTIC PRINT OUT IF ERROR
            LD      C,A
            LD      (HL),A
            LD      A,(HL)
            CP      C
            JP      NZ,ERRX
            LD      A,X'FF'
            LD      C,A
            LD      (HL),A
            LD      A,(HL)
            CP      C
            JP      NZ,ERRX
MRET        LD      (HL),B                  RESTORE DATA
            EI
MRET2       LD      A,(KEYIN)               SEE IF ABORT REQUEST
            BIT     7,A
            JP      Z,MRET1
            AND     X'3F'
            CP      EOT                     IS THIS AN EOT?
            JP      NZ,MRET23               ABORT IF SO
            WRITE   MEMP4
            JP      SYST1
MRET23      LD      A,0
```

```
           LD      (KEYIN),A       CLEAR KEYIN
MRET1      INC     HL
           DEC     DE
           LD      A,D
           OR      E
           CP      0
           JP      NZ,LOP1
           WRITE   PMSG6
           LD      A,(MEMFLG)
           CP      0
           JP      NZ,SYST1
           WRITE   PMSG7           NO ERRORS FOUND
           JP      SYST1
ERRX       LD      (HL),B          RESTORE DATA
           EI
           CALL    ERR
           JP      MRET2
*
*PRINTS OUT A MEMORY ERROR
* ENTRY: HL= ADDRESS OF ERROR
*        A= READ DATA
*        C= EXPECTED DATA
ERR        PUSH    HL
           PUSH    DE
           PUSH    BC
           PUSH    AF
           LD      (HL),B          RESTORE DATA TO MEMORY, IF ANY
           LD      B,A
           PUSH    BC
           PUSH    HL              SAVE ADDRESS
           CALL    BEEP
           LD      A,(MEMFLG)      IF FIRST ERROR, SET FLAG AND HEADER
           CP      0
           JP      NZ,ERRQZ
           LD      A,X'FF'
           LD      (MEMFLG),A
           WRITE   ERMZ1
           WRITE   BLANK
ERRQZ      CALL    CLRBF
           LD      HL,ERMZ         PRINT ADDRESS OF FIRST MEMORY FAILURE
           CALL    XFER
           POP     HL
           LD      A,H
           PUSH    HL
           LD      HL,PBUFF
           CALL    HEXOUT
           POP     HL
           LD      A,L
           LD      HL,PBUFF+2
           CALL    HEXOUT
           POP     BC
           LD      A,C
           PUSH    BC
           LD      HL,PBUFF+11
           CALL    HEXOUT
           POP     BC
           LD      A,B
           LD      HL,PBUFF+19
           CALL    HEXOUT
           LD      HL,PBUFF
           CALL    PLINE
           POP     AF
           POP     BC
```

```
               POP    DE
               POP    HL
               RET                              DIAGNOSTIC
ERMZ           DC     '                  ',0
ERMZ1          DC     'ADDRS  WRITTEN  READ',0
*
*
*PRINTER FUNCTION TEST
* WRITES ALL (ENGLISH LANGUAGE) PRINTER SYMBOLS
*
PTEST          CALL   BEEP
               WRITE  PTEST1            PRINTER TEST
               WRITE  PTEST2
               WRITE  PTEST3
               WRITE  PTEST4
               JP     SYST1
*
*AUDIO OUTPUT FUNCTION TEST
* TEST DTMF TONE GENERATOR BY
* GOING TROUGH RANGE
AUDTST         CALL   BEEP
BP11           WRITE  AUDIO
               WRITE  AUDIO1
               LD     A,BEEPTN
               LD     (HOOK),A
               LD     A,0               NOW OUTPUT ALL DTMF TONES
BP1            PUSH   AF
               LD     HL,TNTBL1
               LD     E,A
               LD     D,0
               ADD    HL,DE
               LD     A,(HL)
               SUB    9
               LD     HL,TNTBL          NOW FETCH TONE OUTPUT CODE
               LD     D,0
               LD     E,A
               ADD    HL,DE
               LD     A,(HL)
               LD     (TONEP),A
               WAIT   10
               LD     A,X'FF'
               LD     (TONEP),A
               WAIT   10
               POP    AF
               INC    A
               CP     12
               JP     NZ,BP1
               JP     SYST1
*
*THIS TABLE IS THE CODED KEYSTROKE SEQUENCE 1-2-3-4-5-6-7-8-9-*-0-#
* AS IT WOULD APPEAR IF ENTERED FROM THE KEYBOARD
*
TNTBL1         DC     9,13,17,10,14,18,11,15,19,12,16,20
PTEST1         DC     'PRINTER TEST:',0
PTEST2         DC     'ABCDEFGHIJKLMNOPQRST',0
PTEST3         DC     'UVWXYZ 0123456789   ',0
PTEST4         DC     '!@#$%^*()_+-=:;,.?',0
PMSG2          DC     'SYSTEM SELF-DIAGNOSIS',0
PMSG3          DC     'SYSTEM TEST COMPLETE!',0
PMSG5          DC     'MEMORY TEST:       ',0
PMSG6          DC     'MEMORY TEST COMPLETE.',0
PMSG4          DC     'MEMORY ERROR AT:    ',0
PMSG7          DC     'NO MEMORY FAILURES!',0
```

```
BLANK      DC       '  ',0
AUDIO      DC       'DTMF OUTPUT FUNCTION',0
AUDIO1     DC       'TEST...      ',0
*
*
*MEMORY PATTERN TEST *
* THIS WRITES A PATTERN TO MEMORY AND CHECKS FOR THE PATTERN TO DETECT FLAWS
* IN ADDRESSING WHICH WOULD NOT BE FOUND BY THE 0-F TEST.
* IT IS, PERFORCE, DESTRUCTIVE OF MEMORY AND THEREFORE RE-INITS THE
* SYSTEM AFTER EXECUTION.
*
PTRN0      DC       'MEMORY PATTERN TEST'
PTRN1      DC       'TEST CLEARS MEMORY!'
PTRN3      DC       'TO CONFIRM, ENTER *',0
PTRN2      DC       'TEST NOT CONFIRMED!',0
MEMP4      DC       'TEST ABANDONED!',0
MEMP5      DC       'TEST COMPLETED!',0
           PRINT    ON
MEMPTN     CALL     BEEP
           WRITE    PTRN0
           LD       A,X'FF'
           LD       (TSTMD),A           SET CRITICAL SEQUENCE- BLOCK STOP
           LD       A,0
           LD       (MEMFLG),A          CLEAR FLAG INDICATING A MEM FAILURE
           WRITE    PTRN1
           WRITE    PTRN3
           BLANK3
           CLRKEY
           WCMND
           CALL     BEEP
           CP       ASTSK
           JP       Z,MEMPT1            IF NOT CONFIRMED, EXIT
           WRITE    PTRN2
           JP       SYST1
MEMPT1     LD       HL,RAMBG+355        DO NOT TEST STACK AND RESERVED MEMRY
           LD       DE,RAMSZ            LEAVE SOME STACK
MEMPT2     LD       B,253               DON'T MAKE PATTERN SIZE=POWER OF 2
           LD       A,0
MEMPT3     LD       (HL),A              PUT PATTERN INTO MEMORY
           INC      A                   NEXT PATTERN ELEMENT
           INC      HL                  NEXT LOCATION TO STORE PATTERN
           DEC      DE                  NUMBER OF LOCATIONS LEFT
           PUSH     AF
           LD       A,D                 ALL LOCATIONS WRITTEN??
           OR       E
           JP       Z,MEMPT4            IF DONE, NOW CHECK PATTERN
           POP      AF
           DEC      B
           JP       Z,MEMPT2            RESET PATTERN
           JP       MEMPT3
MEMPT4     CLRKEY
*                                       SET UP FOR EASY EXIT BY ENTRY STOP
           LD       HL,RAMBG+355
           LD       DE,RAMSZ
MEMPT5     LD       A,0
           LD       B,253
MEMPT6     CP       (HL)                IS ACC=TO MEMORY? IE PATTERN?
           JP       Z,MEMP0
           LD       C,A
           PUSH     AF
           LD       A,(HL)
           CALL     ERR                 PRINT LOCATION OF ERROR IF NOT
           POP      AF
```

```
MEMPQ     LD      C, A
          LD      A, (KEYIN)
          BIT     7, A
          JP      Z, MEMPT7
          LD      A, (KEYIN)
          AND     X'3F'
          CP      EOT                     EOT ENTERED TO ABORT TEST?
          JP      NZ, MEMPT7
          WRITE   MEMP4
          CALL    MEMINI
          JP      SYST1
MEMPT7    LD      A, C
          INC     A
          INC     HL
          DEC     DE
          LD      C, A
          LD      A, D
          OR      E
          JP      Z, MEMPTX               EXIT-DONE
          LD      A, C
          DEC     B
          JP      Z, MEMPT5
          JP      MEMPT6
MEMPTX    LD      A, (MEMFLG)             RESTORE MEMORY TO INITIAL CONDITIONS
          CP      0
          JP      NZ, TX1
          WRITE   PMSG7
TX1       WRITE   MEMP5
          CALL    MEMINI
          EI
          JP      SYST1
          PRINT OFF
*
*BREAK DIAL TONE TEST
* MEASURES DIAL TONE LEVEL, THEN QUIET LINE LEVEL AFTER DIALING A ONE
*
*
BRKDL     CALL    BEEP
          WRITE   BRK1
          BLANK3
          LD      A, DTMF
          LD      (HOOK), A
          WAIT    10                      LET DIAL TONE SETTLE
          CALL    MSCVT
          CALL    CLRBF                   PRINT OUT MEASUREMENT LINE
          LD      HL, BRK2
          CALL    XFER
          LD      DE, SUM1                LOCATION OF DATA TO PRINT
          LD      HL, PBUFF+16
          CALL    PTDB                    OUTPUT ASCII DB LEVEL TO PRINTER BUFFER
          LD      HL, PBUFF
          CALL    PLINE
          LD      A, 9
          CALL    TONE                    OUTPUT A ONE
          WAIT    20
          CALL    MSCVT                   TAKE MEASUREMENT AFTER BREAKING DIAL TN
          CALL    CLRBF                   PRINT OUT MEASUREMENT LINE
          LD      HL, BRK3
          CALL    XFER
          LD      DE, SUM1                LOCATION OF DATA TO PRINT
          LD      HL, PBUFF+16
          CALL    PTDB                    OUTPUT ASCII DB LEVEL TO PRINTER BUFFER
          LD      HL, PBUFF
```

```
           CALL    PLINE
           LD      A,ONHK
           LD      (HOOK),A              PUT SYSTEM BACK ON HOOK
           JP      SYST1
BRK1       DC      'BREAK DIAL TONE TEST',0
BRK2       DC      'DIAL TONE LEV:       ',0
BRK3       DC      'QUIET LINE LEV:      ',0
*
*
*KEYBOARD TEST
* KEYS NUMBERED IN SEQUENCE UPPER LEFT TO BOTTOM RIGHT, COLUMN ORDER
* KEY ID NUMBER (HEXADECIMAL) IS PRINTED
* EXIT BY HITTING EOT KEY TWICE IN SUCCESSION
*
KEYBD      CALL    BEEP
           LD      A,X'FF'
           LD      (TSTMD),A             TO BLOCK OPERATION OF STOP KEY
           WRITE   KEY1
           BLANK3
           LD      H,0
           PUSH    HL
KEYBD1     CLRKEY
           WCMND
           PUSH    AF
           CALL    BEEP
           POP     AF
           CP      EOT
           JP      NZ,KEY2
           POP     HL
           CP      H
           JP      Z,SYST1
KEY2       LD      H,A
           PUSH    HL
           CALL    PKEY
           JP      KEYBD1
KEY1       DC      'KEYBOARD TEST',0
*
*
*DTMF STEADY OUTPUT TONE TEST
* PUTS OUT STEADY DTMF TONE AS PER KEYBOARD INPUT UNTIL EOT HIT
* EXIT BY HITTING EOT TWICE
*
DTMFOT     CALL    BEEP
           WRITE   DTMG1
           BLANK3
           WRITE   BLANK
           LD      C,0
DTMF1      CLRKEY
           WCMND
           CP      9
           JP      C,DTMF1
           CP      EOT
           JP      Z,EOT1
           CP      21
           JP      NC,DTMF1              IGNORE KEYS NOT IN SEQUENCE
           LD      C,A
           SUB     9                     OFFSET
           LD      HL,TNTBL
           LD      E,A
           LD      D,0
           ADD     HL,DE                 ADDRESS OF TONE CODE.
           LD      A,(BEEPTN)
```

```
               LD      (HOOK),A         ENABLE AUDIO OUTPUT
               LD      A,(HL)           FETCH TONE
               LD      (TONEP),A
               JP      DTMF1
EOT1           LD      A,X'FF'
               LD      (TONEP),A        TURN OFF TONE
               LD      A,ONHK
               LD      (HOOK),A
               LD      A,C
               CP      EOT
               JP      Z,SYST1
               LD      A,EOT
               LD      C,A
               JP      DTMF1
KHZM           DC      '1 KHZ TEST TONE',0
KHZOUT         CALL    BEEP
               WRITE   KHZM
               BLANK3
               WRITE   BLANK
               LD      C,0
KHZ1           CLRKEY
               WCMND
               CP      ASTSK
               JP      Z,KHZON
               CP      EOT
               JP      Z,KHZOFF
               JP      KHZ1
KHZON          LD      A,BEEPTN
               LD      (HOOK),A
               LD      A,X'CE'
               LD      (TONEP),A
               LD      A,0
               LD      C,A
               JP      KHZ1
KHZOFF         LD      A,X'FF'
               LD      (TONEP),A        TURN OFF TONE
               LD      A,ONHK
               LD      (HOOK),A
               LD      A,EOT
               CP      C
               JP      Z,KHZ2
               LD      C,A
               JP      KHZ1
KHZ2           CALL    BEEP
               JP      SYST1
DTMG1          DC      'DTMF OUTPUT TEST',0
               END     0
               RSEG    SUBS
               GLOBAL
*********************************************
*
* DIAL TONE DRIVER
*
*         6/28/81 DSC
*
*********************************************
*
*
* ENTRY: A=KEYSTROKE FROM TOUCHTONE PAD
* EXIT:  TONE OUTPUT, ONLY A REG CHANGED
*        CODE: SEE TABLE BELOW
*
```

```
* KEY    CODE    TONE CODE
*  0     16      D7
*  1     9       EE
*  2     13      DE
*  3     17      BE
*  4     10      ED
*  5     14      DD
*  6     18      BD
*  7     11      EB
*  8     15      DB
*  9     19      BB
*  *     12      E7
*  #     20      B7
*  ---   21      CE
*
TONE     CP      22
         JP      NC,TNRET        SKIP IF INVALID TONE REQUEST
         CP      9
         JP      C,TNRET
         SUB     9               OFFSET FOR KEY CODE
         LD      HL,TNTBL        ADDRESS OF TONE CODE TABLE
         LD      E,A
         LD      D,0
         LD      A,DTMF
         LD      (HOOK),A
         ADD     HL,DE           CALCULATE TONE TABLE ENTRY ADDRESS
         LD      A,(HL)          FETCH TONE CODE
         LD      (TONEP),A
         WAIT    3
         LD      A,X'FF'
         LD      (TONEP),A
         WAIT    3
TNRET    RET
*
*
*
*******************************************
*
* READ KEYSTROKE
*
*       7/4/81  DSC
*
*******************************************
*
*       ENTRY;  NO CONDITIONS
*       EXIT:   IF KEYSTROKE READ, THEN IF
*                  1. LAST KEYSTROKE NOT INTERPRETED,
*                     THEN IGNORE THIS ONE.
*                  2. IF THIS IS FIRST RECOGNITION OF
*                     THIS KEYSTROKE, SEE IF IT PERSISTS
*                     FOR ONE MORE TIME (DEBOUNCE)
*                  3. IF THIS IS SECOND RECOGNITION OF
*                     THE SAME KEYSTROKE, THEN STORE THE
*                     KEYID AT (KEYIN) AND SET UN-INTERP
*                     FLAG.
KEYRD    LD      B,X'FE'         COLUMN ENABLE
         LD      E,1             KEYID COUNTER
         LD      HL,KEYCOL       ADDRESS OF COLUMN ENABLE
KEY2     LD      (HL),B          SEND TO KEYBOARD COLUMN
         LD      A,(KEYROW)      FETCH ROW DATA (INVERTED)
         CPL                     COMPLEMENT (TRUE=1)
         LD      D,4             NO. ROWS RO CHECK
KEY1     RRCA                    SHIFT TRUE ROW, IF ANY, TO CARRY
         JR      C,KEY3          IF SET, WE'VE FOUND A KEYSTROKE
         INC     E               INCREMENT KEYID COUNTER
```

```
          DEC     D                     DECREMENT ROW TEST COUNTER
          JP      NZ,KEY1               LOOP IF ALL ROWS NOT TESTED
          LD      A,E
          DEC     A
          SUB     KEYNUM                TEST IF ALL KEYS CHECKED
          JP      NC,KEY6               IF SO, DONE.
          SCF
          LD      A,B                   ENABLE NEXT COLUMN IN SEQUENCE
          RLA
          LD      B,A
          JR      KEY2                  TEST NEXT COLUMN
KEY3      LD      A,E                   SEE IF THIS IS A STOP
          CP      STOP                  IF THIS IS STOP, THEN DO APPROPRIATE
          JP      NZ,KEYXX
          LD      A,(TSTMD)
          CP      X'FF'
          JP      NZ,KEY3X              IN TEST MODE, IGNORE
          LD      A,E
          JP      KEYXX
KEY3X     LD      A,X'FF'
          LD      (STPFG),A
          LD      A,STOP
          OR      X'80'
          LD      (KEYIN),A
          RET
KEYXX     LD      A,(KEYIN)             SEE IF LAST KEY INTERPRETED
          BIT     7,A
          RET     NZ                    IF NOT, SKIP
          LD      A,(KEYBNC)            TEST IF THIS IS SECOND RECOGNITION
          CP      E
          JP      Z,KEY4                IF SO, WE'VE GOT A WINNER!!
          LD      A,E
          LD      (KEYBNC),A            IF NOT, UPDATE FOR NEXT PASS
          RET
KEY4      LD      A,E                   FETCH KEYID
          OR      X'40'                 SET WAIT FOR CLEAR FLAG
          LD      (KEYIN),A             STORE FOR INTERPRETATION
          RET
KEY5      LD      A,(KEYIN)
          OR      X'80'
          LD      (KEYIN),A             SET READY TO INTERPRET FLAG
          RET
KEY6      LD      A,(KEYIN)
          AND     X'40'                 ARE WE WAITING FOR A CLEAR?
          JP      NZ,KEY5
          RET
*
*
*
*
*
*
*
****************************************
*
* DISPLAY DIGIT UPDATE
*
*       7/4/81  DSC
*
****************************************
*
*       ENTRY:  A=DIGIT POSITION (0=LSD)
*               B=CHARACTER CODE (SEE TABLE)
*       EXIT    NO CONDITION, DIGIT IS UPDATED
*
```

```
* CHARACTER CODE TABLE
*
CHRTB   DC      X'C0'                   0       0
        DC      X'F9'                   1       1
        DC      X'A4'                   2       2
        DC      X'B0'                   3       3
        DC      X'99'                   4       4
        DC      X'92'                   5       5
        DC      X'82'                   6       6
        DC      X'F8'                   7       7
        DC      X'80'                   8       8
        DC      X'90'                   9       9
        DC      X'FF'                   10      <BLANK>
        DC      X'88'                   11      A
        DC      X'C6'                   12      C
        DC      X'86'                   13      E
        DC      X'8E'                   14      F
        DC      X'89'                   15      H
        DC      X'E1'                   16      J
        DC      X'C7'                   17      L
        DC      X'8C'                   18      P
        DC      X'92'                   19      S
        DC      X'C1'                   20      U
        DC      X'8D'                   21      Y
        DC      X'BF'                   22
        DC      X'83'                   23      B<LC
        DC      X'A1'                   24      D
        DC      X'A3'                   25      TINY SQUARE, BOTTOM
        DC      X'9C'                   26      "      "    , TOP
        DC      X'A7'                   27      C, LOWER CASE
        DC      X'B3'                   28      C, BACKWARD AND LOWER CLASS
        DC      X'AB'                   29      U, UPSIDE DOWN AND TINY
        DC      X'E3'                   30      U, RIGHTSIDE UP AND TINY
DISP    LD      HL,DISP0                FIRST DIGIT ADDRESS
        LD      DE,X'200'               INTERDIGIT OFFSET ADDRESS
        INC     A
DISP1   DEC     A
        JR      Z,DISP2                 CALCULATE DIGIT ADDESS
        PUSH    AF
        XOR     A
        ADC     HL,DE
        POP     AF
        JR      DISP1
DISP2   PUSH    HL                      SAVE DIGIT ADDRESS
        LD      HL,CHRTB                ADDRESS OF CHARACTER CODE TABLE
        LD      E,B                     CALCULATE TABLE ENTRY ADDRESS
        LD      D,0
        ADD     HL,DE
        LD      A,(HL)                  FETCH CHARACTER DISPLAY CODE
        POP     HL                      RESTORE CHARACTER ADDRESS
        LD      (HL),A                  STORE NEW DIGIT
        RET
*
* SPECIAL TWO DIGIT PACKED BCD DISPLAY
*
*       ENTRY:  SAME AS ABOVE EXCEPT B=BCD PAIR
*               A=FIRST DIGIT POS.
*               B=DIGIT PAIR
BCDOT   LD      C,A
        LD      A,B
        AND     X'0F'
        PUSH    BC
        LD      B,A
        LD      A,C
        CALL    DISP                    DISPLAY
```

```
            POP    BC
            LD     A,B
            SRA    A
            SRA    A
            SRA    A
            SRA    A
            AND    X'0F'
            LD     B,A
            LD     A,C
            INC    A
            CALL   DISP
            RET
*
*
*
*
*
******************************************
*
* PRINTER INTERFACE/ WRITE A LINE
*
*          DSC 7/12/81
*
******************************************
*
*          ENTRY:HL=ADDRESS OF <=21 CHAR. STRING
*          EXIT: LINE IS WRITEED, BLANKS INSERTED AT END OF SHORT STRINGS
*                RETURN CODE: A=01 IF LINE WRITEED
*                             A=00 IF PRINTER FAILURE
*
PSTRD       LD     A,25                PRINTER STATUS READY WAIT ROUTINE
            LD     (TIMER),A           WAIT NO MORE THAN 1 SEC
            LD     A,X'0F'
            LD     (PCNTL),A           INIT CONTROL WORD TO PRINTER
PRN2        LD     A,(PSTAT)           READ STATUS
            BIT    1,A                 IS IT READY???
            RET    NZ
            LD     A,(TIMER)           HAVE WE WAITED TOO LONG?
            OR     A
            JP     NZ,PRN2               IF NOT, KEEP TRYING
            POP    HL                  REMOVE RETURN ADDRESS FROM STACK,
            RET                        LIVING ON THE EDGE!!!
*
*
*WRITE A LINE MAIN ROUTINE
*
*
PLINE       PUSH   HL
            PUSH   DE
            PUSH   BC
            LD     A,X'0B'
            LD     IX,X'0F0F'
            LD     (PCNTL),A
            LD     (PCNTL),IX
            CALL   PSTRD               MAKE SURE PRINTER IS READY
PRN1        LD     B,22                NUMBER OF CHARS SPACES LEFT IN LINE
PRN3        DEC    B
            JP     Z,PRN5                DONE
            LD     A,(HL)              FETCH A CHAR.
            INC    HL
            CP     0                   IF NULL, END OF STRING
            JP     Z,PFILL               FILL REST OF LINE WITH BLANKS
PRN4        LD     (PDATA),A           SEND CHAR TO PRINTER
            LD     IX,X'0F0F'
            LD     A,X'0D'             CLOCK DATA IN TO PRINTER
            LD     (PCNTL),A
```

```
            LD      (PCNTL),IX              WAIT UNTIL PRINTER READY AGAIN
            CALL    PSTRD                   KEEP LOOPING TILL FULL LINE SENT
            JR      PRN3                    BLANK FILL THE LINE
PFILL       LD      A,X'20'                 KEEP CHAR. POINTER AT NULL TERMINATOR
            DEC     HL                      SO THAT LINE IS COMPLETED PROPERLY
            JR      PRN4                    WRITE THE LINE WITH A LINE FEED
PRN5        LD      A,X'0A'
            LD      (PDATA),A
            LD      A,X'0D'
            LD      IX,X'0F0F'
            LD      (PCNTL),A
            LD      (PCNTL),IX
            CALL    PSTRD
            LD      IX,X'0F0F'
            LD      A,X'0B'
            LD      (PCNTL),A
            LD      (PCNTL),IX
            POP     BC
            POP     DE
            POP     HL
            RET
************
*
*
*
*           SUB TO TEST KEYSTROKE- USED BY MACRO "CMND"
*           TEST KEYIN AGAINST CONTENTS OF B TO SEE IF SAME KEY. IF SO, RUN
*           ROUTINE @HL
*
CMND1       LD      A,(KEYIN)
            BIT     7,A
            RET     Z
            AND     X'3F'                   MASK FLAG BITS
            CP      B
            RET     NZ
            PUSH    HL
            CALL    BEEP                    AUDIBLE FEEDBACK TONE
            POP     HL
            LD      A,0
            LD      (KEYIN),A
            JP      (HL)                    NOTE RETURN ADDRESS AT MACRO CALL
PKEY        PUSH    AF
            SRA     A
            SRA     A
            SRA     A
            SRA     A
            AND     X'0F'
            CALL    CNVT
            LD      (PBUFF),A
            POP     AF
            AND     X'0F'
            CALL    CNVT
            LD      (PBUFF+1),A
            LD      A,0
            LD      (PBUFF+2),A
            LD      HL,PBUFF
            CALL    PLINE
            RET
CNVT        CP      X'0A'
            JP      NC,ALPHA
            ADD     A,X'30'
            RET
ALPHA       ADD     A,X'37'
            RET
BEEP        PUSH    AF
            LD      A,BEEPTN                ON HOOK, SPEAKER ENABLED
```

```
          LD      (HOOK),A
          LD      A,X'CE'
          LD      (TONEP),A        BEGIN TONE
          WAIT    1                TONE FOR 120 MSEC
          LD      A,X'FF'          NO TONE
          LD      (TONEP),A
          LD      A,ONHK           PUT ON HOOK
          LD      (HOOK),A
          POP     AF
          RET
*
*UTILITY ROUTINES
*
*
*CLEAR PRINTER OUTPUT BUFFER
*
CLRBF     PUSH    AF
          PUSH    BC
          PUSH    DE
          PUSH    HL
          LD      BC,21
          LD      HL,PBUFF
          LD      DE,PBUFF+1
          LD      A,0
          LD      (HL),A
          LDIR
          POP     HL
          POP     DE
          POP     BC
          POP     AF
          RET
*
*
*CONVERT AND DUMP TO MEMORY
*  CONVERTS BCD PAIR TO ASCII PAIR AND DUMPS TO MEMORY @HL
*
*ENTRY:A=PAIR (BCD)
*      HL=DESTINATION
*EXIT PAIR CONVERTED TO ASCII AND DUMPED HIGH AT (HL) AND LO AT (HL+1)
ASCOT     PUSH    AF
          SRL     A
          SRL     A
          SRL     A
          SRL     A
          CP      10               SEE IF HEX
          JP      NC,ALPH
          ADD     A,X'30'          CONVERT TO ASCII
          JP      ASC1
ALPH      ADD     A,X'37'
ASC1      LD      (HL),A
          INC     HL
          POP     AF
          AND     X'0F'
          CP      10
          JP      NC,ALPH2
          ADD     A,X'30'
          JP      ASC3
ALPH2     ADD     A,X'37'
ASC3      LD      (HL),A
          RET
*
*
*
*TRANSFER TO BUFFER
* TRANSFERS TO BUFFER FROM (HL) UNTIL A NULL IS FOUND
```

```
*
XFER      PUSH    DE
          LD      DE,PBUFF
XFER1     LD      A,(HL)              FETCH DATA
          CP      0                   NULL???
          JP      Z,XFER2             DONE IF NULL
          LD      (DE),A
          INC     HL
          INC     DE
          JP      XFER1
XFER2     POP     DE
          RET
*
*PRINT DATE
*
*
PDATE     CALL    CLRBF
          LD      HL,DTMSG
          CALL    XFER
          LD      A,(MNTH)
          LD      HL,PBUFF+6
          CALL    ASCOT
          LD      A,(DAYS)
          LD      HL,PBUFF+9
          CALL    ASCOT
          LD      A,(YEAR)
          LD      HL,PBUFF+12
          CALL    ASCOT
          LD      HL,PBUFF
          CALL    PLINE
          RET
*
*
*PRINT TIME
*
*
PTIME     CALL    CLRBF
          LD      HL,TMSG
          CALL    XFER
          LD      A,(HRS)
          LD      HL,PBUFF+6
          CALL    ASCOT
          LD      A,(MINS)
          LD      HL,PBUFF+9
          CALL    ASCOT
          LD      A,(SECS)
          LD      HL,PBUFF+12
          CALL    ASCOT
          LD      HL,PBUFF
          CALL    PLINE
          RET
TMSG      DC      'TIME-   :   :   ',0
DTMSG     DC      'DATE-   /   /   ',0
*
*
*
*
******HEX TO ASCII OUTPUT TO BUFFER
* *
*  ENTRY:A=BINARY BYTE
*         HL=LOCATION TO STORE TWO SUCCEEDING HEX-ASCII DIGITS
*  EXIT: BYTE CONVERTED TO HEX ASCII AT (HL) AND (HL+1)
*
*
```

Figure 6:
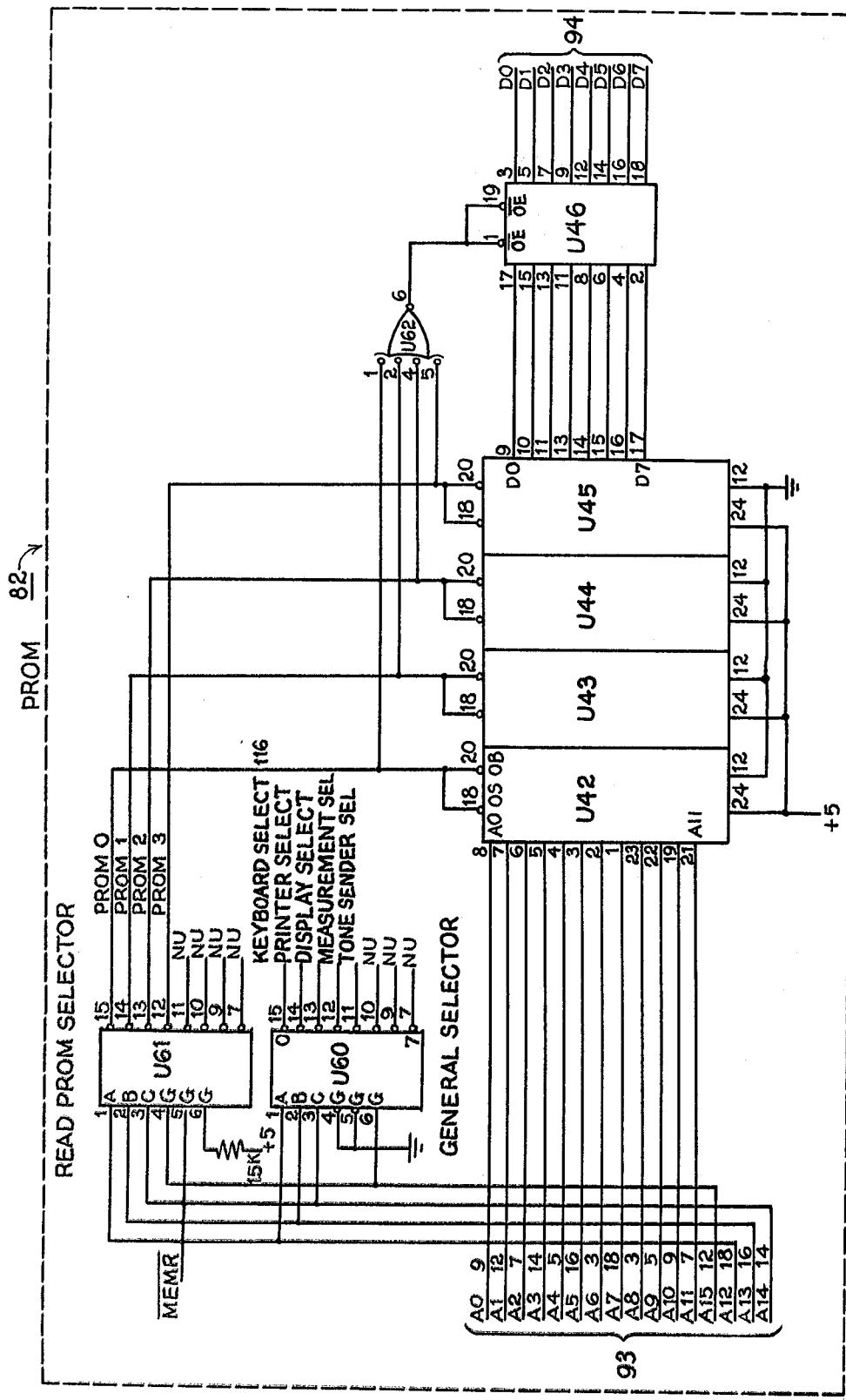
FIG. 6 is a detailed schematic of the programmable read only memory (PROM) module of the local unit shown in FIG. 1.

As best seen in FIG. 6, the PROM module 82 comprises four programmable read only memory chips U40-U45, a read PROM selector U61, and a general selector U60. The programmable read only memory chips U42-U45 are addressed via address bus 93 and data is presented from the programmable read only memory chips U42-U45 through buffer U46 onto data bus 94.

Figure 7:
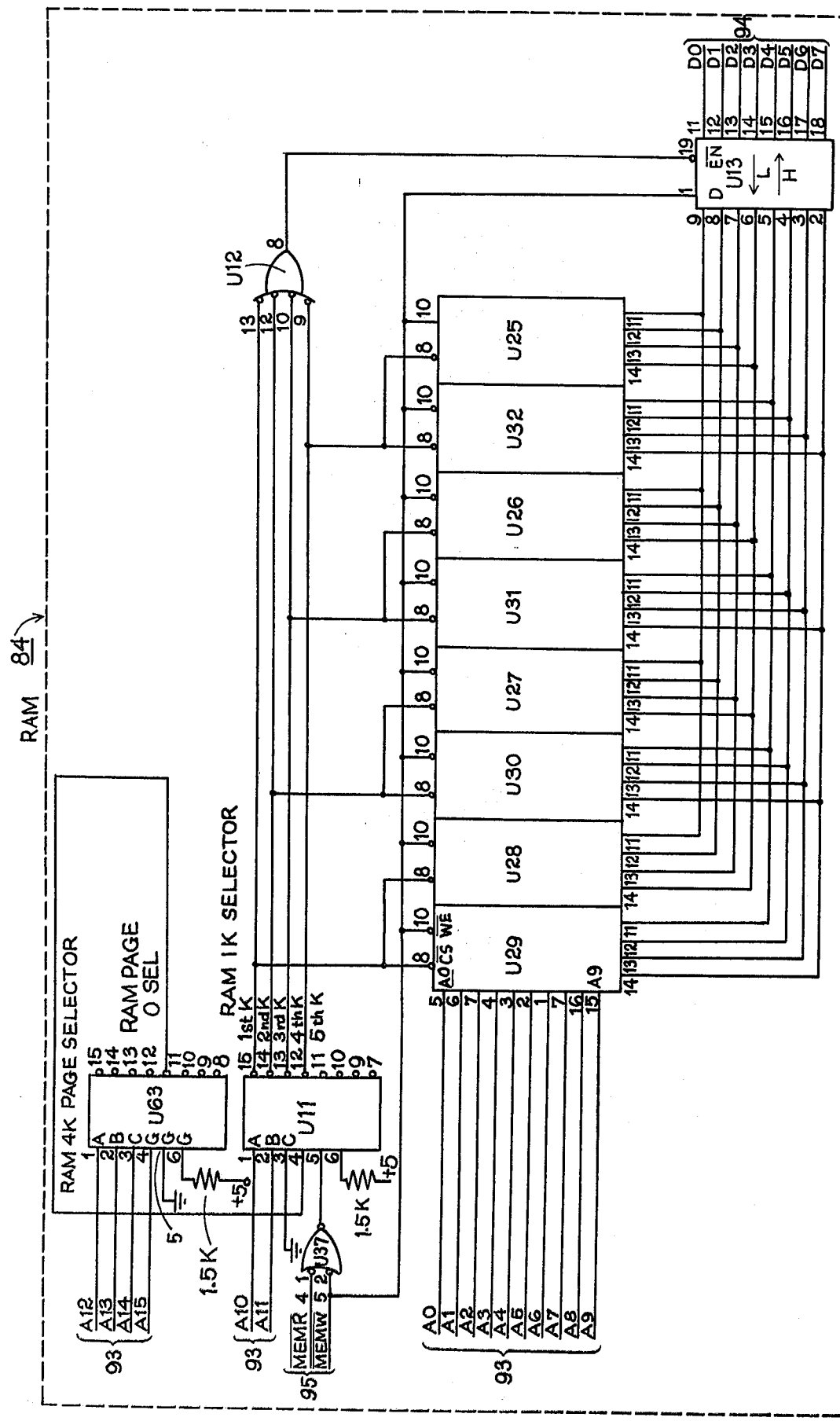
FIG. 7 is a detailed schematic of the random access memory (RAM) module of the local unit shown in FIG. 1.

As seen in FIG. 7, the random access memory module 84 comprises random access memory chips U25-U33 whose addresses are selected through address bus 93. Data is read from and written into memory chips U25-U32 via data bus 94 through buffer U13. A random access memory page selector U63 is used in conjunction with random access memory selector U11 to select the particular random access memory chip U24-U33 in association with logic gates U12. Address lines A12-A15 are associated with random access memory page selector U63 while address lines A10 and A11 are associated with random access memory selector U11, which also receives commands $\overline{MEMR}$ and $\overline{MEMW}$ from CPU 80.

In order to have enough random access memory for 200 test programs, a second RAM board can be piggybacked onto the first using the same number of RAM chips U25-U29. This portion of memory has pin 10 instead of pin 11 of U63 connected to U11. Otherwise the accessing and data lines are the same as shown in FIG. 7.

The overall modules described above combine to form the local unit 22 and operate in a fashion as previously described. Although not shown in detail, a power supply of conventional design supplies the +5 VDC, −12 VDC and +12 VDC voltages used throughout the circuitry shown for local unit 22.

The tone responders 24 as seen in FIGS. 1, 1B, 1C, and 1D comprise the detailed circuitry shown in FIG. 13. The tone responder connects to the remote TIP and RING telephone lines 66' and 67' in a manner analogous to the way that the LOOP START interface 68 of the local unit connects to the TIP and RING lines 66 and 67 (see FIG. 1). The tone responder in one embodiment as shown in FIG. 13 incorporates a fullwave rectifier bridge 122, optical isolator 123 and off hook flip-flop U71.

In operation, when the tone responder is accessed, the off hook flip-flop changes state which in turn causes relay coil 124 to be energized, closing contacts 125. A DTMF signal is then generated by switch array 126 in conjunction with crystal controlled oscillator U82.

As shown for the test steps of Table 1, once the DTMF signal has been received at the local unit, the tone responder produces an approximately 941 hertz signal onto the TIP and RING line 66' and 67' by amplifier U78 and associated circuitry. The tone responder incorporates a power supply 128 of conventional design for supplying the necessary DC voltages.

The tone responder 24 may be modified in a manner as shown in FIG. 13A in order to be used with an off premise extension test facility as shown in FIG. 1D. The lower portion 130 of FIG. 13A is connected to the same TIP and RING lines 66' and 67' as the tone responder circuitry shown in FIG. 13. Circuit 130 is connected in parallel with the circuitry shown in the upper left-hand portion of FIG. 13 encompassing the full-wave bridge 122, the optical isolator 123, up to insertion point X2. An in series circuit 132 is spliced into and between points X1 and X2 of FIG. 13. This particular embodiment of the tone responder can be directly accessed by an extension number while allowing a telephone 64 to be used in parallel with the tone responder. In order to achieve this result, the tone responder must only become active and generate a responsive tone when a DTMF signal equal to the letters A, B, C, or D (see Table 3) is received from the local unit. The interconnected telephone 64 (see FIG. 1D) is unresponsive to such a DTMF signal. Until the proper DTMF signal is received by the tone responder, the circuitry shown in FIG. 13A will provide in association with that in FIG. 13, a high impedance loop that will not degrade the signals received and transmitted from telephone 64.

It is therefore seen that the circuitry shown in FIGS. 1 and 1D for the local unit and tone responders as detailed in FIGS. 2-13A provide the basis for performing the telephone line tests previously described when provided with the instructions stored in PROM module 82 and user test instructions stored in RAM module 84. The details of the instructions contained in PROM module 82 are presented below.

Overall Operation of the Computer Instructions

FIG. 14 in conjunction with the program listing contained in Table 6 illustrates the state of operations performed by the central processing unit 80 in conjunction with PROM 82 and RAM 84 (see FIG. 1). There are, as shown in FIG. 14, five main states associated with the local unit; namely, the POWER UP state, the MAIN state, the PROGRAM state, the PROGRAM ENTRY state, and PROGRAM RUN state.

The POWER UP state 133 initializes the state of the machine. It sets the local unit into a quiescent state and establishes a known state for the memory. Upon POWER UP, the system does a limited self test by checking the memory with what is known as a 10 test. It tests the printer 44 and printer interface 90 (see FIG. 1) by attempting to print out a known line. It tests the display 34 and display driver 33 by displaying the number "8" for each segment of the display. Although the measurement unit 74, DTMF encoder 51 and DTMF decoder 76 are not initially tested, such diagnostic tests could be performed if desired upon POWER UP.

After POWER UP, the machine enters the MAIN state 134. In this state, it waits for receipt of appropriate signals to change to some other state. A single interrupt system is used (no polling) which is based upon an interrupt after every forty millisecond period. During each interrupt, the microprocessor and associated circuitry keeps track of time by counting the number of forty millisecond periods that have elapsed to determine the second, minute, hour, day, month, and year for the current calendar. It also corrects for the number of days per month so that tests which are to be performed during certain days are automatically cycled.

The system during interrupt also scans the input keyboard 28 and looks for keyboard input. The system corrects for debounce and waits for an input to go away before it will recognize another key in order to protect against key rollover. The CPU also checks for all run times and decides when the system should start performing tests as described earlier. There are two bases upon which a test is performed. One is an override maximum priorty test function and whenever such a time occurs, everything else is dropped and the priority test initiated. Such a test would be an early morning test in which all designated lines are tested for attenuation and echo return loss. Another time in which a test is performed is an interval test which is initiated upon user demand.

The interrupt system operates rapidly to pass information that is necessary for processing back to the state which is interested in the information. For instance, the interrupt does not interpret keyboard functions but simply determines whether there is a depressed key and transfers this information to whatever portion of the user program requesting that information. In the interrupt level, a stop is interpreted as a request to end the job that the CPU is executing and to return to a quiescent state. The particular quiescent state entered depends upon the state of the CPU prior to the interrupt.

From the MAIN state 134, the user can execute the RUN/PROGRAM command 139 (see key shown in FIG. 1A). This command takes the CPU to the PROGRAM state 135. The PROGRAM state is the only state in which the internal configuration of the local unit can be changed. In this state particular telephone lines to be tested can be entered, the date can be set, and the time at which a program is to be executed can be stated. Indeed all user instructions for storage in RAM 84 are presented when in this state. The user when in the PROGRAM state can specify the execution times stored in the system as well as the printout the user program specifying the time to be tested.

A portion of the PROGRAM state is a subset state known as the PROGRAM ENTRY 136. This state is entered via the "GTO *" key sequence (see FIG. 1A). In this state, every permissible keystroke is entered into the program space (RAM 84) of the system with the CPU diagnosing the information to insure that it is valid. Any invalid input is ignored. For any valid input entered by the keyboard, a beep is heard through speaker 38 to indicate to the user that a valid key has been recognized and accepted for input. Such a beep also occurs in other states when keyboard information is inserted.

In the PROGRAM ENTRY state, only executable functions can be entered. Therefore depressing the RUN/PROGRAM key 139 should be improper. Such a keystroke would cause nothing to occur; including no beep. While in the PROGRAM ENTRY state, all DTMF keys are recognized as well as five function keys. The FLASH key 140 (see FIG. 1A) causes the system to go ON HOOK and back OFF HOOK. It goes ON HOOK for approximately one/half second. This key is intended for use with military AUTOVON telephone networks where a switch hook "flash" is required for accessing high priority lines.

Also associated with program entry is a wait function which causes the system to wait for a predetermined length of time, typically one and one/half seconds. The amount of time it waits is user selectable by the PAUSE key 141 (see FIG. 1A). Other functions which can be inserted for each test are the measure and print of detect (MPD) (Key 142), the measure and print immediate (MPI) (Key 143), the end of test (EOT) (Key 144). The end of test function is an indicator that the user has reached the end of a sequence of steps to be performed in a given test.

The PROGRAM state 135 thus allows the user to instruct the entry of user test programs into predetermined locations ranging from 00-199. Program entry can be initiated at any of the 200 program locations and if this program location has been previously used, the earlier information is erased and replaced with the new program steps.

There are thus 200 possible test program locations, each of which can contain up to 32 program steps. Any of the 200 test programs can be printed while in the program mode. The printout can be of all the test programs or any selected range of programs as designated by the user. A typical test program printout is given in Table 3F. To go from the program mode 135 to the program entry mode 136, a GTO* command is entered via keyboard 28.

As a visual annunciator of the CPU state, display 34 displays the letter P (see FIG. 1A) over the word MODE whenever the user is in the PROGRAM state or PROGRAM ENTRY substate. The test program location (varying from 00-199) is then displayed over the phrase "Test No.".

During test program execution, the hour, minute and second are shown in display 34. As shown in FIG. 1A, by depressing PRINT key 145 of keyboard 28, any program location specified after the PRINT key is printed onto paper 42. The print state thus forms part of the program state 135.

Referring again to the MAIN state 134, the only keys which are recognized are the STOP key 146, the RUN/PROGRAM key 139, and the GTO key 147. The GTO key transfers the CPU to the PROGRAM RUN state 137. The PROGRAM RUN state may also be automatically reached without user intervention when a preprogrammed run time has been obtained. In this situation, the INTERRUPT causes transfer from the MAIN state 134 to the PROGRAM RUN state 137. Indeed, the selected test programs can be set to run after some designated time and to repeat the test programs every so many minutes or hours thereafter. Thus a great deal of flexibility is allowed in establishing the desired test programs to be executed.

The RUN/PROGRAM mode 137 executes the instructions that are entered in the PROGRAM ENTRY mode. During program execution, the measurements obtained from the measurement unit 74 can be any one of four different levels (see previous discussion on measurement unit). The four scales overlap to provide sufficient hysteresis so that only one scale of the four permissible scales is utilized for successive measurements. In operation, four successive measurements are made and if all four are in the same scale, their average value is taken and presented to printer 44. If the four successive measurements are not in the same scale, additional measurements are taken until four measurements are within the same scale. if this does not occur within some predetermined number of measurement tries (such as 50), it is assumed that there is something intermittently wrong with the measured line and this finding is so indicated on the printer.

Similarly the echo return level test is performed when the CPU is in the PROGRAM RUN state. Indeed all line tests described earlier are run in the state. The details of the test execution is given in Table 6.

Thus the overall operation of the CPU through the modules forming local unit 20 is performed under control of the instructions contained in PROM 82 and user test programs contained in RAM 84. The local unit thereby provides entry of user test programs, execution of those test programs at designated times and under designated conditions, and printout and display of line test measurements and of test program entry.

It will thus be appreciated that the present invention provides the capability of automatically measuring the integrity of telephone voice network lines including tie trunk lines, outgoing WATS lines, foreign exchang lines, and off-premise extension lines. The testing can be done automatically without user intervention and the results printed for later analysis. By so doing, a user's entire voice network system can be easily monitored so that down time of the telephone lines can be minimized and faulty lines detected to be eliminated from the network until corrected.

It will thus be appreciated that the objects set forth above among those made apparent from the preceding description are efficiently attained, and since certain changes may be made in the above description and drawings without departing from the scope of the invention, it is intended that all matter contained in the above description or shown in the accompanying drawings shall be interpreted as illustrative and not in a limiting sense.

It is also to be understood that the following claims are intended to cover all the generic and specific features of the invention described, and all statements of the scope of the invention which, as a matter of language, might be said to fall therebetween.

Having described the invention, what is claimed is:

1. A telephone line analyzer for use with telephone lines having a telephone line selectable private branch exchange (PBX) connected to the lines at one end, comprising:
   (A) a local unit having
      1. means for interfacing with the telephone line selectable PBX and for instructing the PBX to select one of the interconnected telephone lines,
      2. means for encoding and sending a dual tone multiple frequency (DTMF) signal on the selected telephone line,
      3. means for decoding a received DTMF signal on the selected telephone line,
      4. means for measuring the voltage of a received signal on the selected telephone line,
      5. means for printing the value of a received signal as determined by the measurement means,
      6. central processing means for controlling the interaction of the interfacing means, the DTMF encoder, the DTMF decoder, the measurement means and the printer means so that any of the plurality of telephone lines connected to the PBX can be tested at desired times,
      7. means for entering telephone line test programs for desired telephone lines to be tested, the test programs including the desired times for selected lines to be tested and the type of test to be executed, and
      8. means for interconnecting the PBX interface means, the DTMF encoder means, the DTMF decoder means, the measurement means, the printer means, the control means, and the test program entering means; and
   (B) a tone responder, communicable with the telephone line at its second end, the tone responder comprising means for encoding and sending a DTMF signal to the selected telephone line at the telephone line's second end upon selection of this line by the PBX.

2. A telephone line analyzer as defined in claim 1, further comprising a keyboard interface connected to the interconnecting means and a keyboard connected to the keyboard interface for entering the telephone line test program.

3. A telephone line analyzer as defined in claim 2, further comprising a display interface connected to the interconnecting means and a display connected to the display interface for visually annunciating the mode of operation of the local unit, the particular test program being entered or monitored at the local unit, and the time at which one or more telephone lines are to be tested.

4. A telephone line analyzer as defined in claim 3, further comprising an audio receiver amplifier connected to the interfacing means and the DTMF encoder means for aurally annunciating the signals encoded and received at the local unit.

5. A telephone line analyzer as defined in claim 1, wherein the central processing means comprises a central processing unit and clock, a programmable read only memory (PROM) module for storage of instructions for execution by the central processing unit, and a random access memory (RAM) module for storage of the telephone line test programs.

6. A telephone line analyzer as defined in claim 5, wherein the telephone line is connected to a second PBX at its second end, with the tone responder accessible by a particular extension of the remote PBX; wherein the local unit encoding and sending means further comprises means for generating a tone burst of a predetermined frequency, wherein a dummy load is connectible to the encoding and sending means for receipt of the tone burst, wherein the tone responder further comprises means for generating a tone burst; and wherein the central processing means causes the following steps to be executed by the local unit and tone responder as indicated:
   1. the local unit generates a tone burst of said predetermined frequency into the dummy load to measure the decibel level of the tone into the dummy load for calibration purposes,
   2. the local unit encodes and sends DTMF signals to instruct the interfaced PBX to access a particular telephone line,
   3. the local unit waits a first predetermined length of time to insure access of the particular telephone line,
   4. the local unit encodes and sends DTMF signals to access the particular extension of the remote PBX at which the tone responder is accessible,
   5. the tone responder generates a DTMF signal for a second predetermined length of time,
   6. the local unit decodes the received DTMF signal from the tone responder and prints the results so as to verify whether the desired tone responder has been accessed,
   7. the local unit waits a third predetermined length of time while the tone responder simultaneously generates its tone burst for a fourth predetermined length of time greater than the third predetermined length of time,
   8. the local unit executes a measure and print detect operation by measuring the level of the received tone burst from the tone responder and printing the results,
   9. the tone responder generates a DTMF signal for a predetermined length of time,
   10. the local unit in response to the received DTMF signal generates another tone burst of said predetermined frequency to the tone responder and simultaneously measures the decibel level of the signal on the telephone line, 11. the local unit calculates an echo return level as equal to the telephone line decibel level measurement minus the dummy load decibel level measurement, 12. the tone responder goes "On Hook" approximately one second following termination of its tone burst, and 13. the local unit executes its next test program if any remaining test programs are to be executed.

7. A telephone line analyzer as defined in claim 6, wherein the central processing means further comprises means for designating and executing the telephone line test programs starting at a preselected time and further comprises means for executing designated test programs.

8. A telephone line analyzer for use with telephone lines having a telephone line selectable private branch exchange (PBX) connected to the lines at one end, comprising:
(A) means for interfacing with the telephone line selectable PBX,
(B) means for encoding and sending a DTMF signal to instruct the interconnected PBX to access a particular telephone line,
(C) means for executing a measure and print immediate operation by measuring and printing the level of the telephone line, and
(D) a central processing means for controlling the interaction of the DTMF encoder, the measurement means and the printer means so that any one of the plurality of telephone lines connected to the PBX can be tested at desired times, and further to cause the measure and print means to measure and print the level of the selected telephone line upon receipt of a dial tone, for causing the DTMF encoder to generate a DTMF signal to break dial tone after a measure and print immediate operation has been executed and further to cause the measure and print means to perform a second measure and print immediate operation by measuring the level of the selected telephone line without dial tone and printing the result;

whereby the integrity of a selected telephone line is ascertained through measurement of its dial tone and off-hook levels.

9. A telephone line analyzer for use with a telephone line selectable private branch exchange (PBX) connected to a plurality of lines at one end, comprising:
A. a local unit having,
 1. means for interfacing with the telephone line selectable PBX and for instructing the PBX to select one of the interconnected telephone lines;
 2. means for receiving a signal transmitted on the selected telephone line,
 3. means interconnected to the receiving means, for measuring at least one parameter of a received signal on the selected telephone line; and
 4. means interconnected to the measuring means, for displaying at least one of the measured parameters of the received signal; and
B. a tone responder, communicable with the selected telephone line at its second end, the tone responder comprising means for generating a signal to the selected telephone line at the telephone line's second end, whereby upon instruction from the telephone line analyzer the PBX selects one of the telephone lines connected to the PBX and causes a remote tone responder to generate a signal at the second end of the telephone line for measurement by the local unit and thereby selectively testing telephone lines connected to a PBX through use of the telephone line selectable PBX.

10. A telephone line analyzer as defined in claim 9, wherein the selected telephone line is connected to a second PBX at its second end, with the tone responder accessible at a particular extension of the remote PBX; wherein the local unit further comprises means for generating a tone burst of a predetermined frequency, and also comprises a dummy load connectible to the tone burst generating means for receipt of the tone burst; and further wherein the tone responder also comprises means for generating a tone burst; wherein the local unit measuring means comprises means for measuring the decibel level of tone bursts applied to the dummy load and received from the tone responder, and further wherein the local unit comprises a central processing means for controlling the PBX interfacing and instructing means and the measuring means, wherein the central processing means causes the following steps to be executed by the local unit and tone responder:

1. the local unit generates a tone burst of a predetermined frequency into the dummy load to measure the decibel level of the tone into the dummy load for calibration purposes;
2. the local unit generates a signal to instruct the interfaced PBX to access a particular telephone line;
3. the local unit waits a first predetermined length of time to insure access of the particular telephone line;
4. the local unit generates a signal to access the particular extension of the remote PBX where the tone responder is accessible;
5. the tone responder generates a signal for a second predetermined length of time;
6. the local unit decodes the received signal from the tone responder;
7. the local unit waits a third predetermined length of time while the tone responder simultaneously generates a tone burst for a fourth predetermined length of time greater than the third predetermined length of time;
8. the local unit executes a measure operation by measuring the decibel level of the received tone burst from the tone responder;
9. the tone responder generates a signal for a predetermined length of time;
10. the local unit in response to the received signal generates another tone burst of said predetermined frequency to the tone responder and simultaneously measures the decibel level of the signal on the telephone line;
11. the local unit calculates an echo return level as equal to the telephone line decibel level measurement minus a dummy load decibel level measurement; and
12. a tone responder goes "on hook" approximately one second following termination of its tone burst.

11. A telephone line analyzer as defined in claim 9, wherein the local unit further comprises means for annunciating the value of a received signal as determined by the measurement means.

12. A telephone line analyzer as defined in claim 9, further comprising means for entering telephone line test programs for desired telephone lines to be tested, and also comprising a central processing means interconnected to the interfacing and instructing means, the measuring means, the displaying means, and the program entering means, for controlling the interaction of said means including the execution of desired test programs.

13. A telephone line analyzer as defined in claim 12, wherein the means for entering telephone line test programs includes a keyboard.

14. A telephone line analyzer as defined in claim 13, wherein the display means includes means for visually annunciating the mode of operation of the local unit and the particular test program being entered or executed at the local unit.

15. A telephone line analyzer as defined in claim 14, wherein the local unit further comprises an audio amplifier connected to the signal receiving means for aurally annunicating the signals received at the local unit.

16. A telephone line analyzer as defined in claim 12, wherein the central processing means comprises a central processing unit and clock, a programmable read only memory (PROM), a module for storage of instructions for execution by the central processing unit, and a random access memory (RAM) module for storage of telephone line test programs.

17. A telephone line analyzer as defined in claim 16, wherein the central processing means further comprises means for executing the telephone line test programs at a preselected time.

18. A method of measuring the quality of a telephone line connected to a telephone line selectable private branch exchange (PBX) to which a plurality of telephone lines are connected comprising the steps of:
 1. generating a first signal to the private branch exchange so as to select one of the plurality of telephone lines connected to the private branch exchange for testing thereof;
 2. generating a second signal at the PBX end of the telephone line so as to cause the generation of a third signal at the other end of the telephone line;
 3. receiving and measuring at the PBX end of the selected telephone line the third signal generated at the other end of the telehone line; and
 4. controlling the operation of steps 1, 2 and 3 so as to perform multiple telephone line tests.

19. A method of analyzing telephone lines as defined in claim 18, wherein the second end of each telephone line tested is connected to a remote PBX and wherein the following substeps are performed during the testing operation:
 (a) upon receipt of the second signal from the PBX end of the telephone line, decoding this signal and selecting an extension of the remote PBX to which a tone responder is connected, and
 (b) upon selection by the remote PBX, the tone responder generating the third signal for measurement at the PBX end of the telephone line.

20. A method of analyzing telephone lines as defined in claim 19, wherein the steps performed at the PBX end of the telephone line are generated via a local unit connected to the PBX and wherein this local unit and the tone responder further generate the following steps:
 1. the local unit generates a tone burst of a predetermined frequency into the dummy load to measure the decibel level of the tone into the dummy load for calibration purposes;
 2. the local unit generates the first signal to instruct the interfaced PBX to access a particular telephone line;
 3. the local unit generates the second signal to access the particular extension of the remote PBX at which time the tone responder is accessible;
 4. the local unit waits a second predetermined length of time while the tone responder generates the third signal as a tone burst for a third predetermined length of time greater than the second predetermined length of time;
 5. the local unit executes a line level measurement by measuring the level of the received tone burst from the tone responder;
 6. the tone responder generates a fourth signal for a predetermined length of time;
 7. the local unit in response to the received fourth signal from the tone responder generates another tone burst of said predetermined frequency to the tone responder and simultaneously measures the decibel level of the signal on the telephone line; and
 8. the local unit calculates an echo return level as equal to the telephone line decibel level measurement minus a dummy load decibel level measurement.

21. A method of analyzing telephone lines as defined in claim 20, further comprising the steps of
 (a) the tone responder generates a fifth signal after it has been accessed by the local unit, and
 (b) the local unit decodes the received fifth signal from the tone responder so as to determine if the desired tone responder has been accessed by the local unit.

22. A method of analyzing telephone lines as defined in claim 21, wherein the tone responder generates a DTMF signal as said fifth signal so as to facilitate positive identification by the local unit upon decoding this DTMF signal.

23. A method of analyzing telephone lines as defined in claim 21, further comprising the step of the tone responder going "on hook" approximately one second after its generation of a tone burst.

24. A method of analyzing telephone lines as defined in claim 19, wherein the tone responder generates a DTMF signal after it has been accessed by the local unit and wherein the local unit decodes this DTMF signal so as to determine if the desired tone responder has been accessed by the local unit.

25. A method of analyzing telephone lines connected to a telephone line selectable private branch exchange (PBX) to which a plurality of telephone lines are connected, comprising the steps of:
 1. generating a first signal to the PBX so as to select one of the plurality of telephone lines connected to the PBX for testing thereof;
 2. determining receipt of a dial tone from the selected telephone line;
 3. executing a measure and print immediate operation by measuring and printing the level of the telephone line upon receipt of a dial tone;
 4. generating a second signal to break dial tone on the selected telephone line; and
 5. measuring and printing the level of the telephone line upon dial tone being broken.

* * * * *